(12) United States Patent
Song et al.

(10) Patent No.: US 11,858,309 B2
(45) Date of Patent: Jan. 2, 2024

(54) VEHICLE THERMAL MANAGEMENT SYSTEM

(71) Applicants: Hyundai Motor Company, Seoul (KR); Kia Corporation, Seoul (KR); DOOWON CLIMATE CONTROL CO., LTD, Chungcheongnam-do (KR)

(72) Inventors: Jae Hyun Song, Seoul (KR); Tae Han Kim, Seoul (KR); Hong Rok Shim, Gyeonggi-Do (KR); Chul Min Kim, Chungcheongnam-Do (KR); Gang Jong Lee, Chungcheongnam-Do (KR)

(73) Assignees: Hyundai Motor Company, Seoul (KR); Kia Corporation, Seoul (KR); DOOWON CLIMATE CONTROL CO., LTD, Asan-si (KR)

( * ) Notice: Subject to any disclaimer, the term of this patent is extended or adjusted under 35 U.S.C. 154(b) by 0 days.

(21) Appl. No.: 17/719,152

(22) Filed: Apr. 12, 2022

(65) Prior Publication Data
US 2023/0040535 A1 Feb. 9, 2023

(30) Foreign Application Priority Data
Aug. 3, 2021 (KR) .......................... 10-2021-0102192

(51) Int. Cl.
*B60H 1/00* (2006.01)
*B60K 11/02* (2006.01)
(Continued)

(52) U.S. Cl.
CPC ..... *B60H 1/00278* (2013.01); *B60H 1/00328* (2013.01); *B60H 1/3204* (2013.01);
(Continued)

(58) Field of Classification Search
CPC ................ B60H 1/00278; B60H 1/323; B60H 1/00328; B60H 1/3204; H01M 10/625; H01M 10/6568; B60K 11/02
See application file for complete search history.

(56) References Cited

U.S. PATENT DOCUMENTS

| 8,516,847 B2 * | 8/2013 | Koh ........................ F25B 13/00 62/182 |
| 10,118,460 B1 * | 11/2018 | Blatchley ........... B60H 1/00428 |

(Continued)

*Primary Examiner* — Tho V Duong
*Assistant Examiner* — Raheena R Malik
(74) *Attorney, Agent, or Firm* — MORGAN, LEWIS & BOCKIUS LLP

(57) ABSTRACT

A vehicle thermal management system, may include an HVAC subsystem including a first compressor and a first refrigeration cycle including a first refrigerant loop fluidly connected to the first compressor; a battery cooling subsystem including a battery coolant loop fluidly connected to a battery pack; a powertrain cooling subsystem including a powertrain coolant loop fluidly connected to a powertrain component; a second refrigeration cycle including a second compressor, a condenser located on the downstream side of the second compressor, and a second refrigerant loop fluidly connected to the condenser; a refrigerant chiller mounted between the first refrigeration cycle and the second refrigeration cycle and configured to transfer heat between the first refrigeration cycle and the second refrigeration cycle; and a battery chiller mounted between the second refrigeration cycle and the battery coolant loop and configured to transfer heat between the second refrigeration cycle and the battery coolant loop. The condenser of the second refrigeration cycle is thermally connected to at least one of the battery coolant loop and the powertrain coolant loop.

19 Claims, 30 Drawing Sheets

(51) Int. Cl.
    *H01M 10/6568*    (2014.01)
    *B60H 1/32*    (2006.01)
    *H01M 10/625*    (2014.01)

(52) U.S. Cl.
    CPC ........... *B60K 11/02* (2013.01); *H01M 10/625* (2015.04); *H01M 10/6568* (2015.04)

(56) References Cited

U.S. PATENT DOCUMENTS

| | | | | |
|---|---|---|---|---|
| 10,343,483 | B2* | 7/2019 | Kim | B60H 1/32284 |
| 10,562,367 | B2* | 2/2020 | Oh | B60H 1/323 |
| 10,605,161 | B2* | 3/2020 | Banker | F02B 37/04 |
| 10,875,382 | B2* | 12/2020 | Ben Ahmed | B60H 1/143 |
| 11,338,647 | B1* | 5/2022 | Johnston | B60H 1/00278 |
| 11,618,344 | B2* | 4/2023 | Szkrybalo | B60L 58/26 429/62 |
| 2005/0257545 | A1* | 11/2005 | Ziehr | F25B 41/00 62/236 |
| 2012/0247716 | A1* | 10/2012 | Galtz | B60L 50/16 165/41 |
| 2013/0269911 | A1* | 10/2013 | Carpenter | B60H 1/004 165/104.19 |
| 2018/0264913 | A1* | 9/2018 | Enomoto | B60H 1/32284 |
| 2018/0334954 | A1* | 11/2018 | Banker | F02B 39/10 |
| 2019/0168570 | A1* | 6/2019 | Lee | B60H 1/00278 |
| 2020/0391570 | A1* | 12/2020 | Lee | B60R 16/04 |
| 2021/0146753 | A1* | 5/2021 | Lee | B60H 1/00921 |
| 2021/0221199 | A1* | 7/2021 | Lee | B60H 1/32284 |
| 2021/0283978 | A1* | 9/2021 | Bray | B60H 1/3213 |
| 2021/0283979 | A1* | 9/2021 | Bray | B60H 1/32281 |
| 2022/0097487 | A1* | 3/2022 | Jin | H01M 10/6556 |
| 2022/0274463 | A1* | 9/2022 | Koo | B60H 1/00885 |
| 2022/0324294 | A1* | 10/2022 | Kim | B60H 1/143 |
| 2022/0324295 | A1* | 10/2022 | Kim | B60H 1/3213 |
| 2023/0019811 | A1* | 1/2023 | Yahia | F25B 5/02 |
| 2023/0040535 | A1* | 2/2023 | Song | B60H 1/143 |

\* cited by examiner

VEHICLE THERMAL MANAGEMENT SYSTEM

CROSS-REFERENCE TO RELATED APPLICATION

The present application claims priority to Korean Patent Application No. 10-2021-0102192, filed on Aug. 3, 2021, the entire contents of which is incorporated herein for all purposes by this reference.

BACKGROUND OF THE INVENTION

Field of the Invention

The present disclosure relates to a vehicle thermal management system, and more particularly, to a vehicle thermal management system capable of improving battery cooling performance.

Description of Related Art

With a growing interest in energy efficiency and environmental issues, there is a demand for development of eco-friendly vehicles that can replace internal combustion engine vehicles. Such eco-friendly vehicles include electric vehicles which are driven by use of fuel cells or electricity as a power source and hybrid vehicles which are driven by use of an engine and a battery system.

Existing electric vehicles and hybrid vehicles have employed an air-cooled battery cooling system using internal cold air. In recent years, research is underway on a water-cooled battery cooling system that cools the battery by water cooling to extend all electric range (AER) to 300 km (200 miles) or more. Energy density may be increased by adopting a structure that cools the battery in a water-cooled manner using a heating, ventilation, and air conditioning (HVAC) system, a radiator, and the like. Furthermore, the water-cooled battery cooling system may make the battery system compact by reducing gaps between battery cells, and improve battery performance and durability by maintaining a uniform temperature between the battery cells.

To implement the above-described water-cooled battery cooling system, research is being conducted on a vehicle thermal management system integrated with a powertrain cooling subsystem for cooling an electric motor and electric/electronic components, a battery cooling subsystem for cooling a battery, and a heating, ventilation, and air conditioning (HVAC) subsystem for heating or cooling air in a passenger compartment.

The vehicle thermal management system includes a battery chiller configured to transfer heat between a refrigeration cycle of the HVAC subsystem and a battery coolant loop. The battery cooling subsystem may adopt an indirect cooling system in which the battery chiller cools a battery-side coolant using the refrigeration cycle, and the battery-side coolant cooled by the battery chiller cools the battery.

A vehicle thermal management system according to the related art may be configured to cool the battery after air conditioning of the HVAC subsystem is running stably. In recent years, the battery thermal management becomes more important because the heat generated from the battery relatively increases due to fast charging of electric vehicles, the development of high-performance electric vehicles, and the like.

However, the related art vehicle thermal management system has relatively low performance for cooling the battery-side coolant by the refrigeration cycle and the battery chiller, resulting in low battery cooling performance.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present disclosure are directed to providing a vehicle thermal management system configured for improving battery cooling performance by increasing cooling performance of a battery-side coolant circulating in a battery coolant loop using a second refrigeration cycle fluidly separated from a first refrigeration cycle of a heating, ventilation, and air conditioning (HVAC) subsystem.

According to an aspect of the present disclosure, a vehicle thermal management system may include: a heating, ventilation, and air conditioning (HVAC) subsystem including a first compressor and a first refrigeration cycle including a first refrigerant loop fluidly connected to the first compressor; a battery cooling subsystem including a battery coolant loop fluidly connected to a battery pack; a powertrain cooling subsystem including a powertrain coolant loop fluidly connected to a powertrain component; a second refrigeration cycle including a second compressor, a condenser located on the downstream side of the second compressor, and a second refrigerant loop fluidly connected to the condenser; a refrigerant chiller mounted between the first refrigeration cycle and the second refrigeration cycle and configured to transfer heat between the first refrigeration cycle and the second refrigeration cycle; and a battery chiller mounted between the second refrigeration cycle and the battery coolant loop and configured to transfer heat between the second refrigeration cycle and the battery coolant loop. The condenser of the second refrigeration cycle may be thermally connected to at least one of the battery coolant loop and the powertrain coolant loop.

The first refrigeration cycle may be thermally connected to the second refrigeration cycle through the refrigerant chiller, and the second refrigeration cycle may be thermally connected to the battery coolant loop through the battery chiller. The condenser of the second refrigeration cycle may be condensed by a battery-side coolant or a powertrain-side coolant. Accordingly, the efficiency of the condenser and the performance of the second refrigeration cycle may be improved, and thus the cooling of the battery pack may be significantly improved.

The first refrigeration cycle may include an internal condenser located on the downstream side of the first compressor, an external heat exchanger located on the downstream side of the internal condenser, a cooling-side expansion valve located on the downstream side of the external heat exchanger, and an evaporator located on the downstream side of the cooling-side expansion valve. The refrigerant chiller and the evaporator may be connected in parallel between the external heat exchanger and the first compressor.

Accordingly, a first refrigerant may be selectively distributed to the refrigerant chiller and the evaporator.

The first refrigeration cycle may further include a branch conduit branching off from the first refrigerant loop, and the refrigerant chiller may be configured to transfer heat between the branch conduit and the second refrigerant loop.

The refrigerant chiller may include a first passage fluidly connected to the branch conduit, and a second passage fluidly connected to the second refrigerant loop.

Accordingly, the refrigerant chiller may transfer heat between the first refrigerant passing through the first passage and a second refrigerant passing through the second passage. Because the temperature of the second refrigerant passing through the second passage is higher than the temperature of the first refrigerant passing through the first passage, the heat may be transferred from the second refrigerant passing through the second passage to the first refrigerant passing through the first passage, and accordingly the second refrigerant passing through the second passage of the refrigerant chiller may be cooled and condensed, and the first refrigerant passing through the first passage of the refrigerant chiller may be evaporated (vaporized). The first passage of the refrigerant chiller is configured as an evaporator in the first refrigeration cycle, and the second passage of the refrigerant chiller is configured as a condenser in the second refrigeration cycle. Thus, the refrigerant chiller may be an integrated structure of the evaporator for evaporating the first refrigerant and the condenser for condensing the second refrigerant.

The first refrigeration cycle may include a first chiller-side expansion valve located on the upstream side of the refrigerant chiller.

Accordingly, a portion of the first refrigerant may be directed toward the evaporator through the cooling-side expansion valve, and a remaining portion of the first refrigerant may be directed toward the refrigerant chiller through the first chiller-side expansion valve.

The vehicle thermal management system may further include a water-cooled heat exchanger fluidically connected to the first refrigerant loop, the battery coolant loop and the powertrain coolant loop and configured to transfer heat among the first refrigerant loop of the HVAC subsystem, the battery coolant loop of the battery cooling subsystem, and the powertrain coolant loop of the powertrain cooling subsystem.

The water-cooled heat exchanger may include a first passage fluidly connected to the first refrigerant loop, a second passage fluidly connected to the battery coolant loop, and a third passage fluidly connected to the powertrain coolant loop. The first refrigeration cycle may include a heating-side expansion valve located on the upstream side of the first passage of the water-cooled heat exchanger.

Accordingly, the first refrigerant circulating in the first refrigerant loop may exchange heat with the battery-side coolant circulating in the battery coolant loop of the battery cooling subsystem and the powertrain-side coolant circulating in the powertrain coolant loop of the powertrain cooling subsystem. During a heating operation of the HVAC subsystem, the water-cooled heat exchanger may be configured to evaporate the refrigerant received from the internal condenser using the heat received from the battery cooling subsystem and the powertrain cooling subsystem. During a cooling operation of the HVAC subsystem, the water-cooled heat exchanger may be configured to condense the refrigerant received from the internal condenser.

The battery chiller may include a first passage fluidly connected to the battery coolant loop, and a second passage fluidly connected to the second refrigerant loop. The first passage may be located on the downstream side of the battery pack in the battery coolant loop, and the second passage may be located on the downstream side of the refrigerant chiller in the second refrigerant loop.

Accordingly, the second passage of the battery chiller may receive the second refrigerant from the second passage of the refrigerant chiller. Because the temperature of the second refrigerant passing through the second passage of the battery chiller is lower than the temperature of the battery-side coolant passing through the first passage of the battery chiller, the battery-side coolant may be cooled by the battery chiller. The battery-side coolant cooled by the battery chiller may flow into a coolant passage of the battery pack by a first battery-side pump so that the battery pack may be optimally cooled.

The second refrigeration cycle may include a second chiller-side expansion valve located on the upstream side of the second passage of the battery chiller.

The second chiller-side expansion valve may adjust the flow of the second refrigerant or the flow rate of the second refrigerant into the second passage of the battery chiller, and the second chiller-side expansion valve may expand the refrigerant received from the refrigerant chiller.

The condenser may include a first passage fluidly connected to the battery coolant loop, and a second passage fluidly connected to the second refrigerant loop.

Accordingly, the condenser may cool and condense the second refrigerant received from the second compressor using the battery-side coolant, and condensation efficiency of the condenser may be significantly improved.

The first passage of the condenser may be located on the upstream side of the second passage of the water-cooled heat exchanger in the battery coolant loop.

As the first passage of the condenser is located on the upstream side of the second passage of the water-cooled heat exchanger, the battery-side coolant heated in the condenser may be provided as a heat source for vaporizing the first refrigerant in the water-cooled heat exchanger. Accordingly, during the heating operation of the HVAC subsystem, the heat source for heating may be sufficiently secured.

The battery cooling subsystem may include the battery chiller located on the downstream side of the battery pack, a battery radiator located on the downstream side of the battery chiller, a first battery bypass conduit allowing the battery-side coolant to bypass the battery radiator, a second battery bypass conduit allowing the battery-side coolant to bypass the battery pack and the battery chiller, and a three-way valve adjusting a flow direction of the battery-side coolant.

The first passage of the condenser may be fluidly connected to the second battery bypass conduit.

As the battery-side coolant exchanging heat with the ambient air through the battery radiator passes through the first passage of the condenser, the second refrigerant passing through the second passage of the condenser may be cooled and condensed by the battery-side coolant.

The first passage of the condenser may be located on the downstream side of the second passage of the water-cooled heat exchanger in the battery coolant loop.

The first passage of the condenser may be located between the battery radiator and the second passage of the water-cooled heat exchanger in the battery coolant loop.

As the second passage of the water-cooled heat exchanger is located on the upstream side of the condenser of the second refrigeration cycle in the battery coolant loop of the battery cooling subsystem, condensation or evaporation (vaporization) of the first refrigerant by the water-cooled heat exchanger may occur prior to condensation of the second refrigerant by the condenser.

The condenser may include a first passage fluidly connected to the powertrain coolant loop, and a second passage fluidly connected to the second refrigerant loop.

Accordingly, the condenser may cool and condense the second refrigerant received from the second compressor using the powertrain-side coolant, and condensation efficiency of the condenser may be significantly improved.

The first passage of the condenser may be located on the upstream side of the third passage of the water-cooled heat exchanger in the powertrain coolant loop.

The first passage of the condenser may be located between the powertrain component and the third passage of the water-cooled heat exchanger in the powertrain coolant loop.

As the first passage of the condenser is located on the upstream side of the third passage of the water-cooled heat exchanger, the powertrain-side coolant heated in the condenser may be provided as a heat source for vaporizing the first refrigerant in the water-cooled heat exchanger. Accordingly, during the heating operation of the HVAC subsystem, the heat source for heating may be sufficiently secured.

The first passage of the condenser may be located on the downstream side of the third passage of the water-cooled heat exchanger in the powertrain coolant loop.

The first passage of the condenser may be located between a powertrain radiator and the third passage of the water-cooled heat exchanger in the powertrain coolant loop.

As the third passage of the water-cooled heat exchanger is located on the upstream side of the condenser of the second refrigeration cycle in the powertrain coolant loop, condensation or evaporation (vaporization) of the first refrigerant by the water-cooled heat exchanger may occur prior to condensation of the second refrigerant by the condenser.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
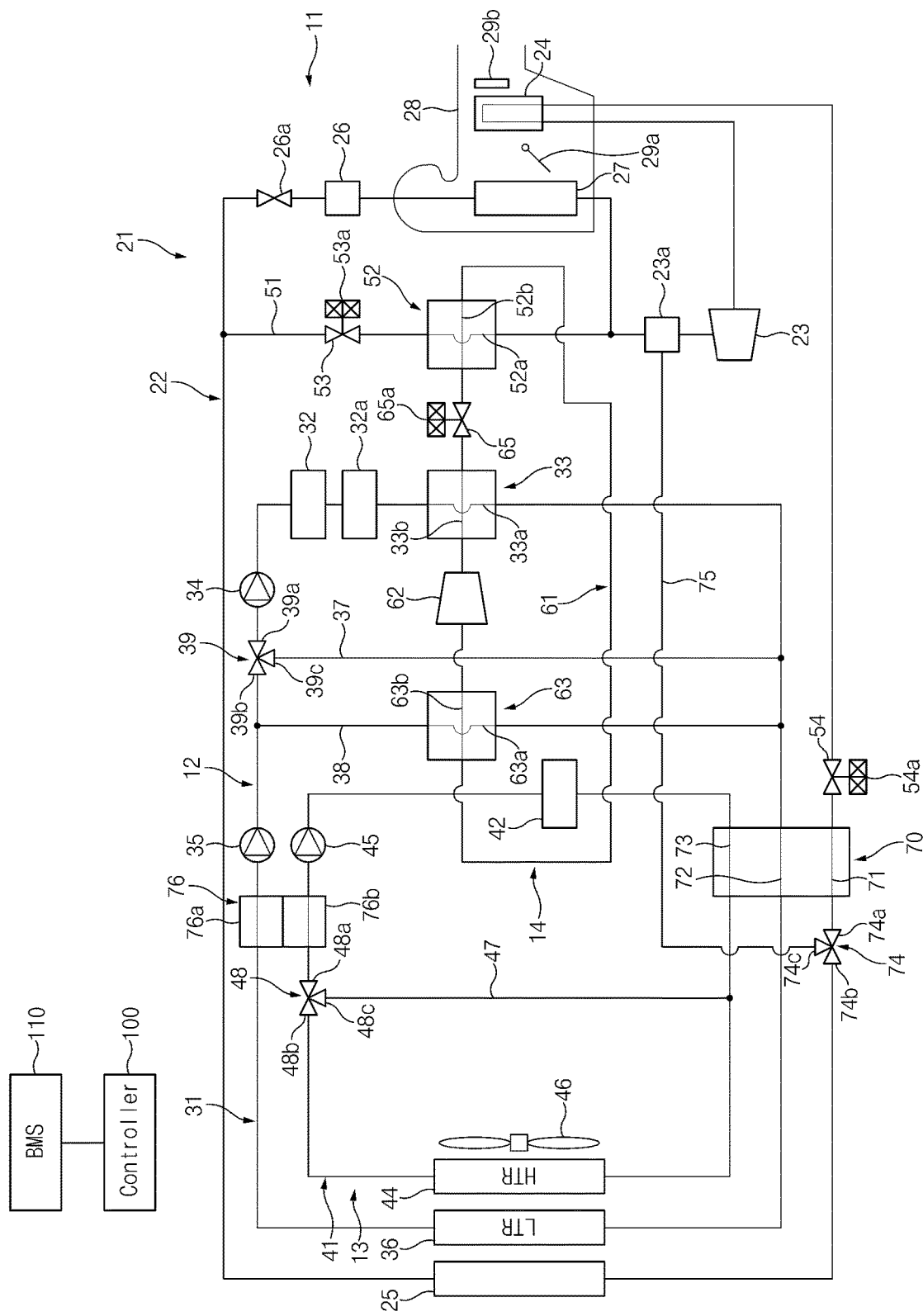
FIG. 1 illustrates a vehicle thermal management system according to an exemplary embodiment of the present disclosure.

It may be understood that the appended drawings are not necessarily to scale, presenting a somewhat simplified representation of various features illustrative of the basic principles of the invention. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the invention(s) will be described in conjunction with exemplary embodiments of the present disclosure, it will be understood that the present description is not intended to limit the invention(s) to those exemplary embodiments. On the other hand, the invention(s) is/are intended to cover not only the exemplary embodiments of the present disclosure, but also various alternatives, modifications, equivalents and other embodiments, which may be included within the spirit and scope of the invention as defined by the appended claims.

Hereinafter, various exemplary embodiments of the present disclosure will be described in detail with reference to the accompanying drawings. In the drawings, the same reference numerals will be used throughout to designate the same or equivalent elements. Furthermore, a detailed description of well-known techniques associated with the present disclosure will be ruled out in order not to unnecessarily obscure the gist of the present disclosure.

Terms such as first, second, A, B, (a), and (b) may be used to describe the elements in exemplary embodiments of the present disclosure. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, a vehicle thermal management system according to an exemplary embodiment of the present disclosure may include a heating, ventilation, and air conditioning (HVAC) subsystem 11 including a first refrigerant loop 22 through which a first refrigerant circulates, a battery cooling subsystem 12 including a battery coolant loop 31 through which a battery-side coolant for cooling a battery pack 32 circulates, and a powertrain cooling subsystem 13 including a powertrain coolant loop 41 through which a powertrain-side coolant for cooling powertrain components (an electric motor and electric/electronic components) circulates.

The HVAC subsystem 11 may include a first refrigeration cycle 21 and an HVAC duct 28. The first refrigeration cycle 21 may include the first refrigerant loop 22 through which the first refrigerant circulates. The first refrigerant loop 22 may be fluidly connected to a first compressor 23, an internal condenser 24, a heating-side expansion valve 54, a water-cooled heat exchanger 70, an external heat exchanger 25, a cooling-side expansion valve 26, and an evaporator 27. The first refrigerant may sequentially pass through the first compressor 23, the internal condenser 24, the heating-side expansion valve 54, the water-cooled heat exchanger 70, the external heat exchanger 25, the cooling-side expansion valve 26, and the evaporator 27 in the first refrigerant loop 22.

The first compressor 23 may compress the first refrigerant. The first compressor 23 may be configured to compress the refrigerant received from the evaporator 27 and/or a refrigerant chiller 52. According to an exemplary embodiment of the present disclosure, the first compressor 23 may be an electric compressor which is driven by electrical energy.

The HVAC subsystem 11 may further include an accumulator 23*a* located on the upstream side of the first compressor 23 in the first refrigerant loop 22. The accumulator 23*a* may be located between the evaporator 27 and the first compressor 23. The accumulator 23*a* may separate a liquid refrigerant from the refrigerant which is received from the evaporator 27, preventing the liquid refrigerant from flowing into the first compressor 23.

The internal condenser 24 may be disposed inside the HVAC duct 28. The internal condenser 24 may be configured to condense the first refrigerant received from the first compressor 23, and accordingly the air passing through the internal condenser 24 may be heated by the internal condenser 24.

The water-cooled heat exchanger 70 may transfer heat among the first refrigerant loop 22 of the HVAC subsystem 11, the battery coolant loop 31 of the battery cooling subsystem 12, and the powertrain coolant loop 41 of the powertrain cooling subsystem 13. Accordingly, the first refrigerant circulating in the first refrigerant loop 22 may exchange heat with the battery-side coolant circulating in the battery coolant loop 31 of the battery cooling subsystem 12 and the powertrain-side coolant circulating in the powertrain coolant loop 41 of the powertrain cooling subsystem 13. The water-cooled heat exchanger 70 may be disposed between the internal condenser 24 and the external heat exchanger 25 in the first refrigerant loop 22. The water-cooled heat exchanger 70 may include a first passage 71 fluidly connected to the first refrigerant loop 22, a second passage 72 fluidly connected to the battery coolant loop 31, and a third passage 73 fluidly connected to the powertrain coolant loop 41.

During a heating operation of the HVAC subsystem 11, the water-cooled heat exchanger 70 may be configured to evaporate the refrigerant which is received from the internal condenser 24 using the heat which is received from the battery cooling subsystem 12 and the powertrain cooling subsystem 13. That is, during the heating operation of the HVAC subsystem 11, the water-cooled heat exchanger 70 is configured as an evaporator that evaporates the refrigerant by recovering waste heat from the battery cooling subsystem 12 and a powertrain component 42 of the powertrain cooling subsystem 13.

During a cooling operation of the HVAC subsystem 11, the water-cooled heat exchanger 70 may be configured to condense the refrigerant received from the internal condenser 24. The water-cooled heat exchanger 70 is configured as a condenser that condenses the refrigerant by cooling the refrigerant using the battery-side coolant circulating in the battery coolant loop 31 and the powertrain-side coolant circulating in the powertrain coolant loop 41.

The HVAC subsystem 11 may further include a bypass conduit 75 connecting a downstream point of the first passage 71 of the water-cooled heat exchanger 70 and the accumulator 23*a*. An inlet of the bypass conduit 75 may be connected to the downstream point of the water-cooled heat exchanger 70, and an outlet of the bypass conduit 75 may be connected to the accumulator 23*a*. The inlet of the bypass conduit 75 may be connected to a point between the water-cooled heat exchanger 70 and the external heat exchanger 25, and the outlet of the bypass conduit 75 may be connected to the accumulator 23*a*. A three-way valve 74 may be disposed at a junction between the inlet of the bypass conduit 75 and the first refrigerant loop 22. The three-way valve 74 may include a first port 74*a* fluidly connected to the first passage 71 of the water-cooled heat exchanger 70, a second port 74*b* fluidly connected to the external heat exchanger 25, and a third port 74*c* fluidly connected to the inlet of the bypass conduit 75. The three-way valve 74 may be switched to allow any one of the second port 74*b* and the third port 74*c* to selectively communicate with the first port 74*a*. For example, when the three-way valve 74 is switched to allow the third port 74*c* to communicate with the first port 74*a* (that is, when the three-way valve 74 is switched to open the inlet of the bypass conduit 75), the refrigerant that has passed through the first passage 71 of the water-cooled heat exchanger 70 may be directed into the first compressor 23 through the bypass conduit 75. That is, when the inlet of the bypass conduit 75 is opened by the switching of the three-way valve 74, the refrigerant may bypass the external heat exchanger 25. When the three-way valve 74 is switched to allow the second port 74*b* to communicate with the first port 74*a* (that is, when the three-way valve 74 is switched to close the inlet of the bypass conduit 75), the refrigerant that has passed through the first passage 71 of the water-cooled heat exchanger 70 may not pass through the bypass conduit 75, and may be directed into the external heat exchanger 25.

The heating-side expansion valve 54 may be located on the upstream side of the water-cooled heat exchanger 70 in the first refrigerant loop 22. The heating-side expansion valve 54 may be disposed between the internal condenser 24 and the water-cooled heat exchanger 70. During the heating operation of the HVAC subsystem 11, the heating-side expansion valve 54 may adjust the flow of the refrigerant or the flow rate of the refrigerant into the first passage 71 of the water-cooled heat exchanger 70. The heating-side expansion valve 54 may be configured to expand the refrigerant received from the internal condenser 24 during the heating operation of the HVAC subsystem 11.

According to an exemplary embodiment of the present disclosure, the heating-side expansion valve 54 may be an electronic expansion valve (EXV) including a drive motor 54*a*. The drive motor 54*a* may have a shaft which is movable to open or close an orifice defined in a valve body of the heating-side expansion valve 54, and the position of the shaft may be varied depending on the rotation direction, rotation degree, and the like of the drive motor 54*a*, and thus the opening amount of the orifice of the heating-side expansion valve 54 may be varied. A controller 100 may control the operation of the drive motor 54*a*. The heating-side expansion valve 54 may be a full open type EXV. The opening amount of the heating-side expansion valve 54 may be varied by the controller 100. As the opening amount of the heating-side expansion valve 54 is varied, the flow rate of the first refrigerant into the first passage 71 may be varied. The heating-side expansion valve 54 may be controlled by the controller 100 during the heating operation of the HVAC subsystem 11.

The external heat exchanger 25 may be disposed outside the HVAC duct 28, and the external heat exchanger 25 may be configured to secondarily condense the refrigerant received from the internal condenser 24. The external heat exchanger 25 may be adjacent to a front grille of the vehicle. Because the external heat exchanger 25 is exposed to the outside, heat may be transferred between the external heat exchanger 25 and the ambient air. An active air flap may be provided to open or close the front grille of the vehicle. The external heat exchanger 25 may exchange heat with the ambient air forcibly blown by a cooling fan 46 so that a heat transfer rate between the external heat exchanger 25 and the ambient air may be further increased. During the cooling operation of the HVAC subsystem 11, the external heat exchanger 25 may be configured to condense the refrigerant received from the internal condenser 24. That is, the external heat exchanger 25 is configured as an external condenser that condenses the refrigerant by transferring heat to the ambient air during the cooling operation of the HVAC subsystem 11. The external heat exchanger 25 may be configured to evaporate the refrigerant received from the first passage 71 of the water-cooled heat exchanger 70 during the heating operation of the HVAC subsystem 11. That is, the external heat exchanger 25 is configured as an external evaporator that evaporates the refrigerant by absorbing heat from the ambient air during the heating operation of the HVAC subsystem 11.

Figure 3:
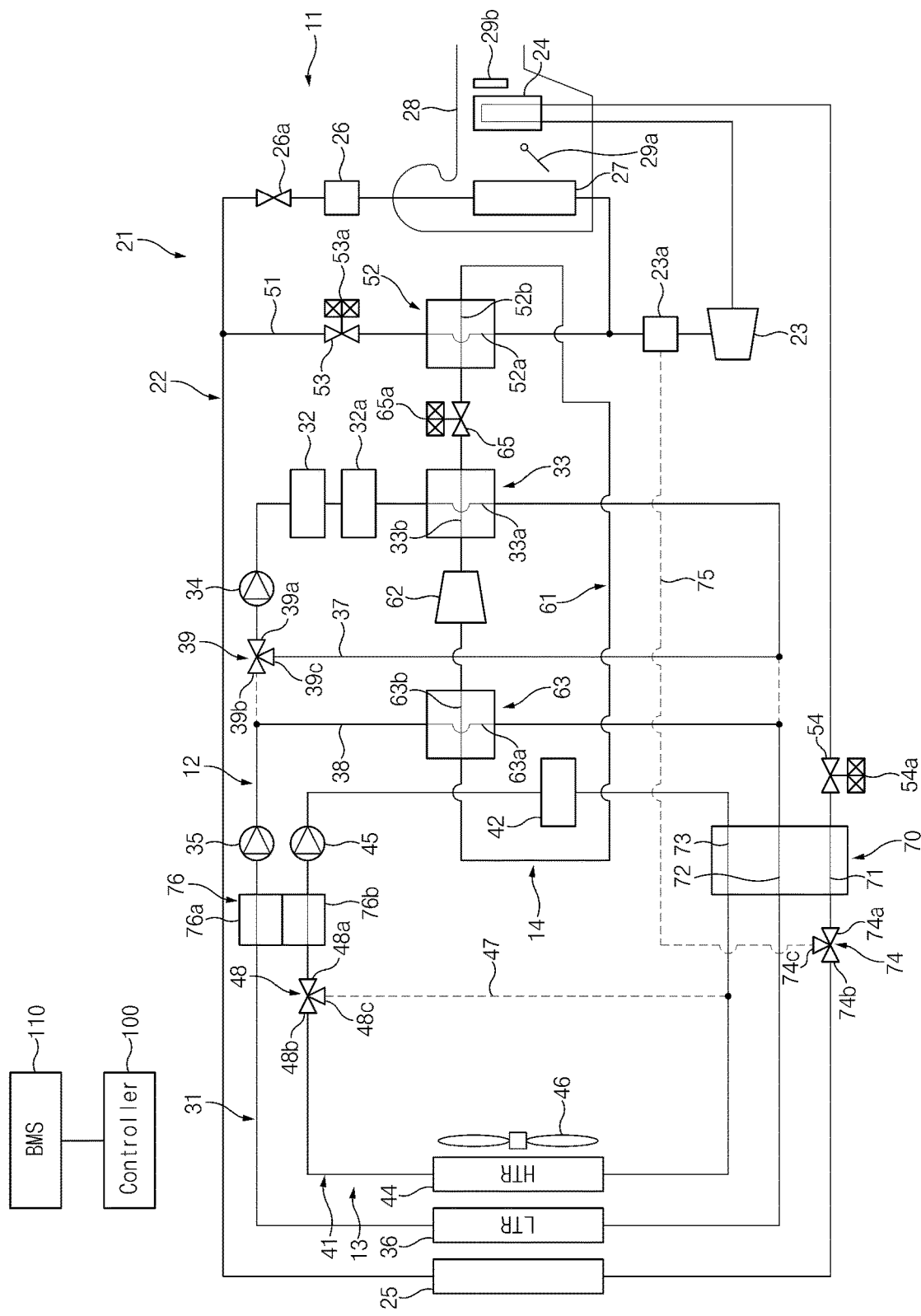
FIG. 3 illustrates a case in which a battery pack is cooled by a first refrigeration cycle of an HVAC subsystem, a second refrigeration cycle, and a battery cooling subsystem when the HVAC subsystem operates in a cooling mode in the vehicle thermal management system of FIG. 1.

The first refrigerant passing through the internal condenser 24 may be cooled and condensed by the air passing through the HVAC duct 28. Because a temperature difference between the first refrigerant and the air is relatively low, condensation efficiency of the first refrigerant by the internal condenser 24 may be insignificant. Meanwhile, the first refrigerant passing through the first passage 71 of the water-cooled heat exchanger 70 may be cooled and condensed by the battery-side coolant and the powertrain-side coolant, and the first refrigerant passing through the external heat exchanger 25 may be cooled and condensed by the ambient air. As illustrated in FIG. 3, most of the first refrigerant may be condensed by the water-cooled heat exchanger 70 and the external heat exchanger 25.

The cooling-side expansion valve 26 may be disposed between the external heat exchanger 25 and the evaporator 27 in the first refrigerant loop 21. As the cooling-side expansion valve 26 is located on the upstream side of the evaporator 27, the cooling-side expansion valve 26 may adjust the flow of the refrigerant or the flow rate of the refrigerant into the evaporator 27, and the cooling-side expansion valve 26 may be configured to expand the refrigerant received from the external heat exchanger 25.

According to an exemplary embodiment of the present disclosure, the cooling-side expansion valve 26 may be a thermal expansion valve (TXV) which detects the temperature and/or pressure of the refrigerant and adjusts the opening amount of the cooling-side expansion valve 26. The cooling-side expansion valve 26 may be a TXV including a shut-off valve 26a selectively blocking the flow of the refrigerant toward an internal passage of the cooling-side expansion valve 26, and the shut-off valve 26a may be a solenoid valve. The shut-off valve 26a may be opened or closed by the controller 100, blocking or unblocking the flow of the refrigerant toward the cooling-side expansion valve 26. When the shut-off valve 26a is opened, the refrigerant may be allowed to flow into the cooling-side expansion valve 26, and when the shut-off valve 26a is closed, the refrigerant may be blocked from flowing into the cooling-side expansion valve 26. According to an exemplary embodiment of the present disclosure, the shut-off valve 26a may be mounted in the inside of a valve body of the cooling-side expansion valve 26, opening or closing the internal passage of the cooling-side expansion valve 26. According to another exemplary embodiment of the present disclosure, the shut-off valve 26a may be located on the upstream side of the cooling-side expansion valve 26, selectively opening or closing an inlet of the cooling-side expansion valve 26.

The evaporator 27 may be located on the downstream side of the cooling-side expansion valve 26, and may receive the first refrigerant expanded by the cooling-side expansion valve 26. The evaporator 27 may be configured to cool the air using the refrigerant received from the cooling-side expansion valve 26.

The HVAC duct 28 may be configured to blow the air into a passenger compartment of the vehicle, and the internal condenser 24 and the evaporator 27 may be disposed inside the HVAC duct 28. An air mixing door 29a may be disposed between the evaporator 27 and the internal condenser 24. The internal condenser 24 may be located on the downstream side of the evaporator 27. A positive temperature coefficient (PTC) heater 29b may be located on the downstream side of the internal condenser 24.

When the shut-off valve 26a is closed, the flow of the first refrigerant to the cooling-side expansion valve 26 may be blocked, and accordingly the first refrigerant may only be directed into the refrigerant chiller 52 to be described below without flowing into the cooling-side expansion valve 26 and the evaporator 27. That is, when the shut-off valve 26a is closed, the cooling operation of the HVAC subsystem 11 may not be performed. When the shut-off valve 26a is opened, the first refrigerant may be directed into the cooling-side expansion valve 26 and the evaporator 27. That is, when the shut-off valve 26a is opened, the cooling operation of the HVAC subsystem 11 may be performed.

When the HVAC subsystem 11 operates in a cooling mode, the shut-off valve 26a of the cooling-side expansion valve 26 may be opened, and the refrigerant may sequentially circulate through the first compressor 23, the internal condenser 24, the first passage 71 of the water-cooled heat exchanger 70, the external heat exchanger 25, the cooling-side expansion valve 26, and the evaporator 27.

When the HVAC subsystem 11 operates in a heating mode, the shut-off valve 26a of the cooling-side expansion valve 26 may be closed, and the inlet of the bypass conduit 75 may be opened by the switching of the three-way valve 74, and accordingly the refrigerant may sequentially circulate through the first compressor 23, the internal condenser 24, the heating-side expansion valve 54, the first passage 71 of the water-cooled heat exchanger 70, and the bypass conduit 75.

The battery cooling subsystem 12 may include the battery coolant loop 31 through which the battery-side coolant circulates. The battery coolant loop 31 may be fluidly connected to the battery pack 32, a battery chiller 33, the second passage 72 of the water-cooled heat exchanger 70, a battery radiator 36, a first battery-side pump 34, and a second battery-side pump 35. In FIG. 1, the battery-side coolant may sequentially pass through the battery pack 32, the battery chiller 33, the second passage 72 of the water-cooled heat exchanger 70, and the battery radiator 36 through the battery coolant loop 31.

The battery pack 32 may have a coolant passage provided inside or outside thereof, and the battery-side coolant may pass through the coolant passage. The battery coolant loop 31 may be fluidly connected to the coolant passage of the battery pack 32.

The battery chiller 33 may be located on the downstream side of the battery pack 32 in the battery coolant loop 31, and the battery chiller 33 may be configured to cool the coolant received from the coolant passage of the battery pack 32 using a second refrigerant circulating in a second refrigeration cycle 14 to be described below. The battery chiller 33 may be located on the upstream side of the second passage 72 of the water-cooled heat exchanger 70.

A heater 32a may be located between the battery pack 32 and the battery chiller 33 in the battery coolant loop 31, and the heater 32a may be an electric heater such as a PTC heater. When it is necessary to increase the temperature of the battery pack 32, the heater 32a may operate, and accordingly the temperature of the battery-side coolant may be relatively increased by the heater 32a. As a result, the temperature of the battery pack 32 may be increased.

The battery radiator 36 may be adjacent to the front grille of the vehicle, and the battery-side coolant passing through the battery radiator 36 may be cooled by the ambient air. The battery radiator 36 may exchange heat with the ambient air forcibly blown by the cooling fan 46 so that a heat transfer rate between the battery radiator 36 and the ambient air may be further increased.

The battery radiator 36, a powertrain radiator 44, and the external heat exchanger 25 may be disposed adjacent to each other on the front of the vehicle, forming a cooling module on the front of the vehicle. The cooling fan 46 may be disposed behind the external heat exchanger 25, the battery radiator 36, and the powertrain radiator 44.

The first battery-side pump 34 and the second battery-side pump 35 may be disposed between the battery radiator 36 and the battery pack 32 in the battery coolant loop 31, and the first battery-side pump 34 and the second battery-side pump 35 may be electric pumps causing the battery-side coolant to circulate. The first battery-side pump 34 may be adjacent to the battery pack 32, and the second battery-side pump 35 may be adjacent to the battery radiator 36.

The battery cooling subsystem 12 may include a battery reservoir 76a located on the downstream side of the battery radiator 36. The battery reservoir 76a may be located between the battery radiator 36 and the second battery-side pump 35. The battery reservoir 76a may be configured to temporarily store and replenish the battery-side coolant so that the flow rate of the battery-side coolant circulating in the battery coolant loop 31 may be kept constant.

The battery cooling subsystem 12 may further include a first battery bypass conduit 37 allowing the battery-side coolant to bypass the battery radiator 36. The first battery bypass conduit 37 may directly connect an upstream point of the battery radiator 36 and a downstream point of the battery radiator 36 in the battery coolant loop 31.

An inlet of the first battery bypass conduit 37 may be connected to a point between the battery chiller 33 and an inlet of the battery radiator 36 in the battery coolant loop 31. An outlet of the first battery bypass conduit 37 may be connected to a point between the battery pack 32 and an outlet of the battery radiator 36 in the battery coolant loop 31. The outlet of the first battery bypass conduit 37 may be connected to a point between an outlet of the second battery-side pump 35 and an inlet of the first battery-side pump 34 in the battery coolant loop 31.

As the battery-side coolant flows from the downstream side of the battery chiller 33 toward the upstream side of the first battery-side pump 34 through the first battery bypass conduit 37, the battery-side coolant may bypass the second battery-side pump 35, the second passage 72 of the water-cooled heat exchanger 70, and the battery radiator 36, and accordingly the battery-side coolant passing through the first battery bypass conduit 37 may sequentially flow through the battery pack 32 and the battery chiller 33 by the first battery-side pump 34.

The battery cooling subsystem 12 may further include a second battery bypass conduit 38 allowing the battery-side coolant to bypass the battery pack 32 and the battery chiller 33. The second battery bypass conduit 38 may directly connect a downstream point of the battery chiller 33 and an upstream point of the battery pack 32 in the battery coolant loop 31.

An inlet of the second battery bypass conduit 38 may be connected to a point between the outlet of the first battery bypass conduit 37 and the outlet of the battery radiator 36 in the battery coolant loop 22. The inlet of the second battery bypass conduit 38 may be connected to a point between the outlet of the first battery bypass conduit 37 and the outlet of the second battery-side pump 35 in the battery coolant loop 31.

An outlet of the second battery bypass conduit 38 may be connected to a point between the inlet of the first battery bypass conduit 37 and the inlet of the battery radiator 36 in the battery coolant loop 31.

As the battery-side coolant flows from the downstream side of the battery radiator 36 toward the upstream side of the battery radiator 36 through the second battery bypass conduit 38, the battery-side coolant may bypass the battery pack 32 and the battery chiller 33, and accordingly the battery-side coolant passing through the second battery bypass conduit 38 may sequentially flow through the second passage 72 of the water-cooled heat exchanger 70 and the battery radiator 36 by the second battery-side pump 35.

The first battery bypass conduit 37 and the second battery bypass conduit 38 may be parallel to each other.

The battery cooling subsystem 12 may further include a three-way valve 39 adjusting the flow direction of the battery-side coolant, and the three-way valve 39 may be disposed at the outlet of the first battery bypass conduit 37. That is, the three-way valve 39 may be disposed at a junction between the outlet of the first battery bypass conduit 37 and the battery coolant loop 31. The three-way valve 39 may include a first port 39a fluidly connected to the first battery-side pump 34, a second port 39b fluidly connected to the second battery-side pump 35, and a third port 39c fluidly connected to the first battery bypass conduit 37. The three-way valve 39 may be switched to allow at least two of the first port 39a, the second port 39b, and the third port 39c to selectively communicate with each other, or to close all of the first port 39a, the second port 39b, and the third port 39c.

When the three-way valve 39 is switched to allow the second port 39b to communicate with the first port 39a (that is, the three-way valve 39 is switched to close the outlet of the first battery bypass conduit 37), the battery-side coolant may not pass through the first battery bypass conduit 37 and the second battery bypass conduit 38, and may sequentially flow through the battery pack 32, the battery chiller 33, the second passage 72 of the water-cooled heat exchanger 70, and the battery radiator 36.

When the three-way valve 39 is switched to allow the third port 39c to communicate with the first port 39a (that is, the three-way valve 39 is switched to open the outlet of the first battery bypass conduit 37), a portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70 and the battery radiator 36 by the second battery-side pump 35.

When the three-way valve 39 is switched to close all of the first port 39a, the second port 39b, and the third port 39c, the battery-side coolant may not pass through the first battery bypass conduit 37, the battery pack 32, and the battery chiller 33.

As described above, the three-way valve 39 may adjust the flow of the battery-side coolant in the battery coolant loop 31, and the first battery-side pump 34 and the second battery-side pump 35 may selectively operate according to the switching operation of the three-way valve 39.

The powertrain cooling subsystem 13 may include the powertrain coolant loop 41 through which the powertrain-side coolant circulates. The powertrain coolant loop 41 may be fluidly connected to the powertrain component 42, the powertrain radiator 44, and a powertrain-side pump 45. In FIG. 1, the powertrain-side coolant may sequentially pass through the powertrain component 42, the third passage 73 of the water-cooled heat exchanger 70, the powertrain radiator 44, and the powertrain-side pump 45 in the powertrain coolant loop 41.

The powertrain component 42 may be at least one of an electric motor, an inverter, an on-board charger (OBC), and a low DC-DC converter (LDC) forming an electric powertrain system of an electric vehicle. The powertrain component 42 may have a coolant passage provided inside or outside thereof, and the powertrain-side coolant may pass through the coolant passage. The powertrain coolant loop 41 may be fluidly connected to the coolant passage of the powertrain component 42. The powertrain component 42 may be located on the upstream side of the third passage 73 of the water-cooled heat exchanger 70 in the powertrain coolant loop 41, and the third passage 73 of the water-cooled heat exchanger 70 may be located between an inlet of the powertrain radiator 44 and the powertrain component 42 in the powertrain coolant loop 41.

The powertrain radiator 44 may be adjacent to the front grille of the vehicle, and the powertrain-side coolant passing through the powertrain radiator 44 may be cooled by the ambient air. The powertrain radiator 44 may exchange heat with the ambient air forcibly blown by the cooling fan 46 so that a heat transfer rate between the powertrain radiator 44 and the ambient air may be further increased.

The powertrain-side pump 45 may be located on the upstream side of the powertrain component 42, and the powertrain-side pump 45 may be an electric pump causing the powertrain-side coolant to circulate in the powertrain coolant loop 41. The operation of the powertrain-side pump 45 may be controlled by the controller 100.

The powertrain cooling subsystem 13 may further include a powertrain reservoir 76b located on the downstream side of the powertrain radiator 44. The powertrain reservoir 76b may be located between the powertrain radiator 44 and the powertrain-side pump 45. The powertrain reservoir 76b may be configured to temporarily store and replenish the powertrain-side coolant so that the flow rate of the powertrain-side coolant circulating in the powertrain coolant loop 41 may be kept constant.

The powertrain cooling subsystem 13 may further include a powertrain bypass conduit 47 allowing the powertrain-side coolant to bypass the powertrain radiator 44. The powertrain bypass conduit 47 may directly connect an upstream point of the powertrain radiator 44 and a downstream point of the powertrain radiator 44 in the powertrain coolant loop 41.

An inlet of the powertrain bypass conduit 47 may be connected to a point between the powertrain component 42 and the inlet of the powertrain radiator 44 in the powertrain coolant loop 41. An outlet of the powertrain bypass conduit 47 may be connected to a point between the powertrain component 42 and an outlet of the powertrain radiator 44 in the powertrain coolant loop 41. The outlet of the powertrain bypass conduit 47 may be connected to a point between the outlet of the powertrain radiator 44 and an inlet of the powertrain-side pump 45 in the powertrain coolant loop 41.

As the powertrain-side coolant flows from the downstream side of the powertrain component 42 toward the upstream side of the powertrain-side pump 45 through the powertrain bypass conduit 47, the powertrain-side coolant may bypass the powertrain radiator 44, and accordingly the powertrain-side coolant passing through the powertrain bypass conduit 47 may sequentially flow through the powertrain component 42 and the third passage 73 of the water-cooled heat exchanger 70 by the powertrain-side pump 45.

The powertrain cooling subsystem 13 may further include a three-way valve 48 disposed at the outlet of the powertrain bypass conduit 47. That is, the three-way valve 48 may be disposed at a junction between the outlet of the powertrain bypass conduit 47 and the powertrain coolant loop 41. The three-way valve 48 may include a first port 48a fluidly connected to the powertrain-side pump 45, a second port 48b fluidly connected to the powertrain radiator 44, and a third port 48c fluidly connected to the powertrain bypass conduit 47. The three-way valve 48 may be switched to allow at least two of the first port 48a, the second port 48b, and the third port 48c to selectively communicate with each other, or to close all of the first port 48a, the second port 48b, and the third port 48c. For example, when the three-way valve 48 is switched to allow the second port 48b to communicate with the first port 48a (that is, the three-way valve 48 is switched to close the outlet of the powertrain bypass conduit 47), the powertrain-side coolant may not pass through the powertrain bypass conduit 47, and may sequentially flow through the powertrain component 42, the third passage 73 of the water-cooled heat exchanger 70, and the powertrain radiator 44. When the three-way valve 48 is switched to allow the third port 48c to communicate with the first port 48a (that is, the three-way valve 39 is switched to open the outlet of the powertrain bypass conduit 47), the powertrain-side coolant may pass through the powertrain bypass conduit 47 so that it may sequentially flow through the powertrain-side pump 45, the powertrain component 42, and the third passage 73 of the water-cooled heat exchanger 70. When the three-way valve 48 is switched to close all of the first port 48a, the second port 48b, the third port 48c, the powertrain-side coolant may not circulate through the powertrain coolant loop 41. As described above, the three-way valve 48 may adjust the flow of the powertrain-side coolant in the powertrain coolant loop 41.

According to an exemplary embodiment of the present disclosure, the battery reservoir 76a and the powertrain reservoir 76b may be joined to form an integrated reservoir 76, and the battery reservoir 76a and the powertrain reservoir 76b may be fluidly separated from each other by a partition or the like.

According to another exemplary embodiment of the present disclosure, the battery reservoir 76a and the powertrain reservoir 76b may be fluidly connected in the integrated reservoir 76, and accordingly the battery-side coolant and the powertrain-side coolant may be mixed in the integrated reservoir 76.

The vehicle thermal management system according to an exemplary embodiment of the present disclosure may further include the second refrigeration cycle 14 thermally connected to the HVAC subsystem 11. The second refrigeration cycle 14 may include a second refrigerant loop 61 through which the second refrigerant circulates. The second refrigerant loop 61 may be fluidly connected to a second compressor 62, a condenser 63, the refrigerant chiller 52, and the battery chiller 33. The second refrigerant may sequentially pass through the second compressor 62, the condenser 63, the refrigerant chiller 52, and the battery chiller 33 in the second refrigerant loop 61.

The second compressor 62 may be configured to compress the second refrigerant. According to an exemplary embodiment of the present disclosure, the second compressor 62 may be an electric compressor which is driven by electrical energy.

The condenser 63 may be located on the downstream side of the second compressor 62 in the second refrigerant loop 61, and be configured to condense the second refrigerant received from the second compressor 62.

According to the exemplary embodiment illustrated in FIG. 1, the condenser 63 may be thermally connected to the battery cooling subsystem 12. Accordingly, the second refrigerant may exchange heat with the battery-side coolant circulating in the battery cooling subsystem 12 through the condenser 63 so that it may be cooled and condensed. The condenser 63 may be configured to transfer heat between the battery-side coolant cooled by the ambient air through the battery radiator 36 and the second refrigerant received from the second compressor 62, and accordingly the second refrigerant may be cooled and condensed by the battery-side coolant in the condenser 63, and the temperature of the battery-side coolant may be increased by the second refrigerant in the condenser 63. The condenser 63 may include a first passage 63a fluidly connected to the battery coolant loop 31 of the battery cooling subsystem 12, and a second passage 63b fluidly connected to the second refrigerant loop 61 of the second refrigeration cycle 14.

Referring to FIG. 1, the first passage 63a of the condenser 63 may be located on the upstream side of the second passage 72 of the water-cooled heat exchanger 70 in the battery coolant loop 31. The second passage 72 of the water-cooled heat exchanger 70 may be located between the inlet of the battery radiator 36 and the outlet of the second battery bypass conduit 38, and accordingly the second passage 72 of the water-cooled heat exchanger 70 may be located on the downstream side of the second battery bypass conduit 38. As the condenser 63 is located in the second battery bypass conduit 38 of the battery coolant loop 31, the first passage 63a of the condenser 63 may be located on the upstream side of the second passage 72 of the water-cooled heat exchanger 70. The second refrigerant may be cooled and condensed by the battery-side coolant passing through the second battery bypass conduit 38 in the condenser 63. The first passage 63a may be fluidly connected to the second battery bypass conduit 38, and the second passage 63b may be fluidly connected to the second refrigerant loop 61 of the second refrigeration cycle 14. When the three-way valve 39 is switched to allow the third port 39c to communicate with the first port 39a (that is, the three-way valve 39 is switched to open the outlet of the first battery bypass conduit 37), a portion of the battery-side coolant may be directed toward the first battery bypass conduit 37 so that it may bypass the second battery-side pump 35, the battery radiator 36, and the second passage 72 of the water-cooled heat exchanger 70, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70 and the battery radiator 36 by the second battery-side pump 35. As the battery-side coolant passing through the second battery bypass conduit 38 exchanges heat with the ambient air through the battery radiator 36, the battery-side coolant may be appropriately cooled. The cooled battery-side coolant may cool the second refrigerant in the condenser 63, and accordingly the second refrigerant may be condensed in the condenser 63.

The first refrigeration cycle 21 of the HVAC subsystem 11 may further include a branch conduit 51 branching off from the first refrigerant loop 22. The branch conduit 51 may branch off from an upstream point of the shut-off valve 26a, and be connected to an upstream point of the first compressor 23. That is, the branch conduit 51 may directly connect the upstream point of the shut-off valve 26a and the upstream point of the first compressor 23, and accordingly the first refrigerant passing through the branch conduit 51 may not flow into the cooling-side expansion valve 26 and the evaporator 27. The refrigerant chiller 52 and a first chiller-side expansion valve 53 may be disposed in the branch conduit 51, and the first chiller-side expansion valve 53 may be located on the upstream side of the refrigerant chiller 52. A portion of the first refrigerant may be directed toward the evaporator 27 through the cooling-side expansion valve 26, and a remaining portion of the first refrigerant may be directed toward the refrigerant chiller 52 through the first chiller-side expansion valve 53.

The first refrigeration cycle 21 may be thermally connected to the second refrigeration cycle 14 through the refrigerant chiller 52. The refrigerant chiller 52 may be configured to transfer heat between the first refrigerant circulating in the first refrigeration cycle 21 and the second refrigerant circulating in the second refrigeration cycle 14. The refrigerant chiller 52 and the evaporator 27 may be connected in parallel between the external heat exchanger 25 and the first compressor 23, and accordingly the first refrigerant may be selectively distributed to the evaporator 27 and the refrigerant chiller 52 through the shut-off valve 26a of the cooling-side expansion valve 26 and a drive motor 53a of the first chiller-side expansion valve 53. The refrigerant chiller 52 may be configured to transfer heat between the branch conduit 51 of the first refrigeration cycle 21 and the second refrigerant loop 61 of the second refrigeration cycle 14. The refrigerant chiller 52 may be configured to transfer heat between the first refrigerant circulating in the branch conduit 51 and the second refrigerant circulating in the second refrigerant loop 61 of the second refrigeration cycle 14. The refrigerant chiller 52 may include a first passage 52a fluidly connected to the branch conduit 51, and a second passage 52b fluidly connected to the second refrigerant loop 61. The first passage 52a may be located between an outlet of the first chiller-side expansion valve 53 and an inlet of the first compressor 23 in the branch conduit 51. The second passage 52b may be located on the upstream side of the battery chiller 33 in the second refrigerant loop 61. The first passage 52a and the second passage 52b may be adjacent to or contact each other within the refrigerant chiller 52 so that the first passage 52a may be thermally connected to the second passage 52b, and the first passage 52a may be fluidly separated from the second passage 52b. Accordingly, the refrigerant chiller 52 may transfer heat between the first refrigerant passing through the first passage 52a and the second refrigerant passing through the second passage 52b. Because the temperature of the second refrigerant passing through the second passage 52b is higher than the temperature of the first refrigerant passing through the first passage 52a, the heat may be transferred from the second refrigerant passing through the second passage 52b to the first refrigerant passing through the first passage 52a, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The first passage 52a of the refrigerant chiller 52 is configured as an evaporator in the first refrigeration cycle 21, and the second passage 52b of the refrigerant chiller 52 is configured as a condenser in the second refrigeration cycle 14. Thus, the refrigerant chiller 52 may be an integrated structure of the evaporator for evaporating the first refrigerant and the condenser for condensing the second refrigerant.

The second refrigerant compressed by the second compressor 62 may be primarily condensed by the condenser 63, and be secondarily condensed by the refrigerant chiller 52, and thus cooling efficiency and condensation efficiency of the second refrigerant may be improved. The first chiller-side expansion valve 53 may be located on the upstream side of the first passage 52a of the refrigerant chiller 52 in the branch conduit 51. The first chiller-side expansion valve 53 may adjust the flow of the first refrigerant or the flow rate of the first refrigerant into the first passage 52a of the refrigerant chiller 52, and the first chiller-side expansion valve 53 may expand the refrigerant received from the external heat exchanger 25. According to an exemplary embodiment of the present disclosure, the first chiller-side expansion valve 53 may have the drive motor 53a, and the drive motor 53a may have a shaft which is movable to open or close an internal passage defined in a valve body of the first chiller-side expansion valve 53. The position of the shaft may be varied depending on the rotation direction, rotation degree, and the like of the drive motor 53a, and thus the opening amount of the internal passage of the first chiller-side expansion valve 53 may be varied. The controller 100 may control the operation of the drive motor 53a. According to an exemplary embodiment of the present disclosure, the controller 100 may be a full automatic temperature control (FATC) system.

As the opening amount of the first chiller-side expansion valve 53 is varied, the flow rate of the refrigerant into the first passage 52a of the refrigerant chiller 52 may be varied. For example, when the opening amount of the first chiller-side expansion valve 53 is greater than a reference opening amount, the flow rate of the refrigerant into the first passage 52a of the refrigerant chiller 52 may be relatively increased above a reference flow rate, and when the opening amount of the first chiller-side expansion valve 53 is less than the reference opening amount, the flow rate of the refrigerant into the first passage 52a of the refrigerant chiller 52 may be similar to the reference flow rate or be relatively lowered below the reference flow rate. As the opening amount of the first chiller-side expansion valve 53 is controlled by the controller 100, the refrigerant may be distributed to the evaporator 27 and the refrigerant chiller 52 at a predetermined ratio, and thus the cooling of the HVAC subsystem 11 and the cooling of the battery chiller 33 may be performed simultaneously or selectively.

The battery chiller 33 may be configured to transfer heat between the second refrigerant circulating in the second refrigeration cycle 14 and the battery-side coolant circulating in the battery cooling subsystem 12. The battery chiller 33 may transfer heat between the second refrigerant loop 61 of the second refrigeration cycle 14 and the battery coolant loop 31 of the battery cooling subsystem 12. The battery chiller 33 may transfer heat between the second refrigerant circulating in the second refrigerant loop 61 of the second refrigeration cycle 14 and the battery-side coolant passing through the battery coolant loop 31, and accordingly the battery chiller 33 may evaporate the second refrigerant cooled and condensed by the refrigerant chiller 52, cooling the battery-side coolant. The battery chiller 33 may include a first passage 33a fluidly connected to the battery coolant loop 31, and a second passage 33b fluidly connected to the second refrigerant loop 61 of the second refrigeration cycle 14. The first passage 33a may be located on the downstream side of the battery pack 32 in the battery coolant loop 31, and the second passage 33b may be located on the downstream side of the refrigerant chiller 52 in the second refrigerant loop 61. The first passage 33a and the second passage 33b may be adjacent to or contact each other within the battery chiller 33 so that the first passage 33a may be thermally connected to the second passage 33b, and the first passage 33a may be fluidly separated from the second passage 33b. Accordingly, the battery chiller 33 may transfer heat between the battery-side coolant passing through the first passage 33a and the second refrigerant passing through the second passage 33b.

The second passage 33b of the battery chiller 33 may be located on the downstream side of the second passage 52b of the refrigerant chiller 52 in the second refrigerant loop 61, and accordingly the second passage 33b of the battery chiller 33 may receive the second refrigerant from the second passage 52b of the refrigerant chiller 52. Because the temperature of the second refrigerant passing through the second passage 33b is lower than the temperature of the battery-side coolant passing through the first passage 33a, the battery-side coolant may be cooled by the battery chiller 33. The battery-side coolant cooled by the battery chiller 33 may flow into the coolant passage of the battery pack 32 by the first battery-side pump 34 so that the battery pack 32 may be optimally cooled.

A second chiller-side expansion valve 65 may be located on the upstream side of the second passage 33b of the battery chiller 33 in the second refrigerant loop 61. The second chiller-side expansion valve 65 may be located between the second passage 52b of the refrigerant chiller 52 and the second passage 33b of the battery chiller 33 in the second refrigerant loop 61. The second chiller-side expansion valve 65 may adjust the flow of the second refrigerant or the flow rate of the second refrigerant into the second passage 33b of the battery chiller 33, and the second chiller-side expansion valve 65 may be configured to expand the refrigerant received from the refrigerant chiller 52.

According to an exemplary embodiment of the present disclosure, the second chiller-side expansion valve 65 may have a drive motor 65a, and the drive motor 65a may have a shaft which is movable to open or close an internal passage defined in a valve body of the second chiller-side expansion valve 65. The position of the shaft may be varied depending on the rotation direction, rotation degree, and the like of the drive motor 65a, and thus the opening amount of the internal passage of the second chiller-side expansion valve 65 may be varied. The controller 100 may control the operation of the drive motor 65a.

According to another exemplary embodiment of the present disclosure, the second chiller-side expansion valve 65 may be a TXV. When only the cooling operation of the battery pack 32 is performed, the second chiller-side expansion valve 65 may adjust the flow rate of the second refrigerant into the second passage 33b of the battery chiller 33, and adjust the overheating degree of the second refrigerant flowing out from the second passage 33b of the battery chiller 33 to a predetermined value.

The first refrigerant may cool the second refrigerant in the refrigerant chiller 52, and the cooled second refrigerant may cool the battery-side coolant in the battery chiller 33, and the cooled battery-side coolant may cool the battery pack 32. As described above, the second refrigeration cycle 14 may be thermally connected to the first refrigeration cycle 21 of the HVAC subsystem 11 through the refrigerant chiller 52, and be thermally connected to the battery cooling subsystem 12 through the battery chiller 33, and thus the first refrigeration cycle 21, the second refrigeration cycle 14, and the battery cooling subsystem 12 may form a cascade refrigeration cycle.

The overall operations of the HVAC subsystem 11, the battery cooling subsystem 12, the powertrain cooling subsystem 13, and the second refrigeration cycle 14 may be controlled by the controller 100. For example, the controller 100 may control the operations of the shut-off valve 26a of the cooling-side expansion valve 26, the PTC heater 29b, the air mixing door 29a, the first compressor 23, the cooling fan 46, the drive motor 53a of the first chiller-side expansion valve 53, the drive motor 54a of the heating-side expansion valve 54, the drive motor 65a of the second chiller-side expansion valve 65, the second compressor 62, the first battery-side pump 34, the second battery-side pump 35, the powertrain-side pump 45, and the three-way valves 39, 48, and 74, so that the cooling and heating of the passenger compartment, the cooling of the battery pack 32, and the cooling of the powertrain component 42 may be performed appropriately. According to an exemplary embodiment of the present disclosure, the controller 100 may be a full automatic temperature control (FATC) system.

The battery cooling subsystem 12 may be controlled by a battery management system 110. The battery management system 110 may monitor the state of the battery pack 32, and perform the cooling of the battery pack 32 when the temperature of the battery pack 32 is higher than or equal to a predetermined temperature. The battery management system 110 may transmit an instruction for the cooling of the battery pack 32 to the controller 100, and accordingly the controller 100 may control the operation of the second compressor 62 and the opening amounts of the expansion valves 53 and 65.

According to an exemplary embodiment of the present disclosure, the first refrigerant and the second refrigerant may be different refrigerants. For example, the first refrigerant may be R1234yf (hydrofluoroolefin (HFO) refrigerant), and the second refrigerant may be a natural refrigerant such as R290. Thus, efficiency of the first refrigeration cycle 21 and efficiency of the second refrigeration cycle 14 may be improved independently.

According to another exemplary embodiment of the present disclosure, the first refrigerant may be the same as the second refrigerant.

Because the vehicle thermal management system according to an exemplary embodiment of the present disclosure includes two compressors 23 and 62, a capacity of each of the compressors 23 and 62 may be significantly less than that of a compressor in a thermal management system according to the related art. For example, while the capacity of the compressor in the thermal management system according to the related art is 45 cc, the capacity of the first compressor 23 and the capacity of the second compressor 62 may be reduced to 30 cc or less. Furthermore, as the two compressors 23 and 62 are used, the compression efficiency of each refrigerant may be improved., as the capacity of the first compressor 23 decreases, the capacity of the evaporator 27 may decrease.

According to an exemplary embodiment of the present disclosure, the capacity of the first compressor 23 may be different from the capacity of the second compressor 62. The first compressor 23 may be configured to compress the first refrigerant received from the refrigerant chiller 52 and the evaporator 27, and the second compressor 62 may be configured to compress the second refrigerant received from the battery chiller 33. Accordingly, the capacity of the first compressor 23 may be greater than the capacity of the second compressor 62. For example, the capacity of the first compressor 23 may be 27 cc, and the capacity of the second compressor 62 may be 20 cc.

According to another exemplary embodiment of the present disclosure, the capacity of the first compressor 23 may be the same as the capacity of the second compressor 62.

Figure 2:
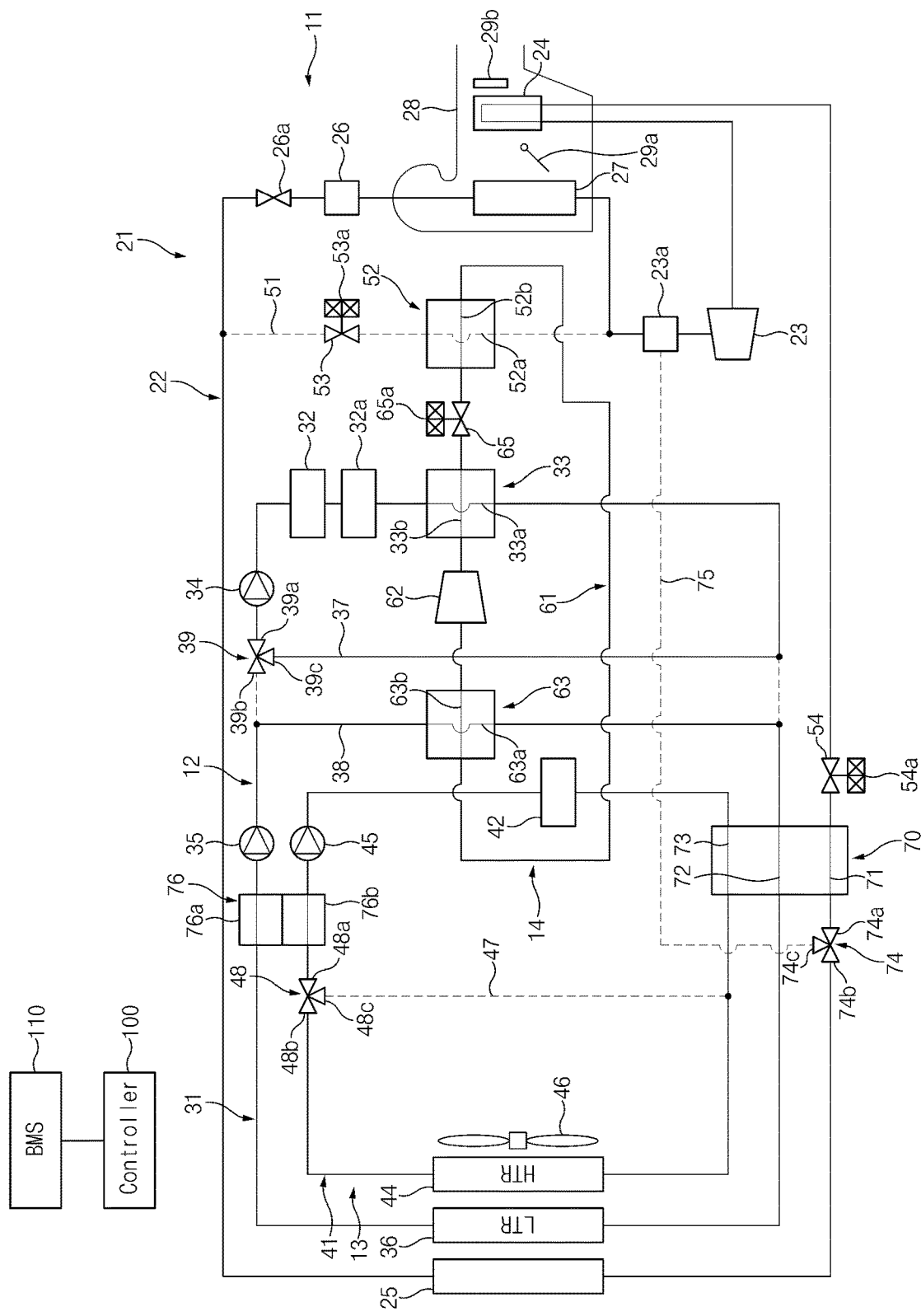
FIG. 2 illustrates a case in which a battery pack is cooled by a second refrigeration cycle and a battery cooling subsystem when a heating, ventilation, and air conditioning (HVAC) subsystem operates in a cooling mode in the vehicle thermal management system of FIG. 1.

FIG. 2 shows that when the HVAC subsystem 11 operates in the cooling mode, the battery pack 32 may be cooled by the second refrigeration cycle 14 and the battery cooling subsystem 12, and the cooling of the battery pack 32 may be performed independently of the HVAC subsystem 11.

Referring to FIG. 2, the three-way valve 48 of the powertrain cooling subsystem 13 may be switched to close the third port 48c, and accordingly the powertrain-side coolant may circulate through the powertrain coolant loop 41. The three-way valve 74 of the HVAC subsystem 11 may be switched to close the third port 74c, and the opening amount of the heating-side expansion valve 54 may be completely opened to 100% so that the first refrigerant may not be expanded by the heating-side expansion valve 54. The first chiller-side expansion valve 53 may be closed, and accordingly the first refrigerant may not pass through the first passage 52a of the refrigerant chiller 52. Thus, the second refrigerant may not exchange heat with the first refrigerant in the refrigerant chiller 52. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the condenser 63, the second passage 72 of the water-cooled heat exchanger 70, and the battery radiator 36, and may sequentially pass through the battery pack 32 and the first passage 33a of the battery chiller 33 by the first battery-side pump 34. A remaining portion of the battery-side coolant may be directed toward the second battery bypass conduit 38 so that it may bypass the first battery-side pump 34, the battery pack 32, and the first passage 33a of the battery chiller 33, and may sequentially pass through the first passage 63a of the condenser 63, the second passage 72 of the water-cooled heat exchanger 70, and the battery radiator 36 by the second battery-side pump 35. The condenser 63 may cool and condense the second refrigerant received from the second compressor 62 using the battery-side coolant passing through the second battery bypass conduit 38. The second refrigerant cooled and condensed by the condenser 63 may be expanded by the second chiller-side expansion valve 65. As the expanded second refrigerant passes through the second passage 33b of the battery chiller 33, the second refrigerant may cool the battery-side coolant in the battery chiller 33, and the cooled battery-side coolant may cool the battery pack 32.

FIG. 3 shows that when the HVAC subsystem 11 operates in the cooling mode, the battery pack 32 may be cooled by the first refrigeration cycle 21 of the HVAC subsystem 11, the second refrigeration cycle 14, and the battery cooling subsystem 12.

Referring to FIG. 3, the three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the condenser 63, the second passage 72 of the water-cooled heat exchanger 70, and the battery radiator 36, and may sequentially pass through the battery pack 32 and the first passage 33a of the battery chiller 33 by the first battery-side pump 34. A remaining portion of the battery-side coolant may be directed toward the second battery bypass conduit 38 so that it may bypass the first battery-side pump 34, the battery pack 32, and the first passage 33a of the battery chiller 33, and may sequentially pass through the first passage 63a of the condenser 63, the second passage 72 of the water-cooled heat exchanger 70, and the battery radiator 36 by the second battery-side pump 35. The condenser 63 may cool and condense the second refrigerant received from the second compressor 62 using the battery-side coolant passing through the second battery bypass conduit 38. The three-way valve 48 of the powertrain cooling subsystem 13 may be switched to close the third port 48c, and accordingly the powertrain-side coolant may circulate through the powertrain coolant loop 41. The three-way valve 74 of the HVAC subsystem 11 may be switched to close the third port 74c, and the opening amount of the heating-side expansion valve 54 may be completely opened to 100% so that the first refrigerant may not be expanded by the heating-side expansion valve 54. The first chiller-side expansion valve 53 may be opened to a predetermined degree. As the first refrigerant passes through the first passage 52a of the refrigerant chiller 52, the second refrigerant may exchange heat with the first refrigerant in the refrigerant chiller 52. Because the temperature of the second refrigerant passing through the second passage 52b of the refrigerant chiller 52 is higher than the temperature of the first refrigerant passing through the first passage 52a of the refrigerant chiller 52, the heat may be transferred from the second refrigerant to the first refrigerant, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The second refrigerant cooled and condensed by the refrigerant chiller 52 may be expanded by the second chiller-side expansion valve 65. As the expanded second refrigerant passes through the second passage 33b of the battery chiller 33, the second refrigerant may cool the battery-side coolant in the battery chiller 33, and the cooled battery-side coolant may cool the battery pack 32.

Figure 30:
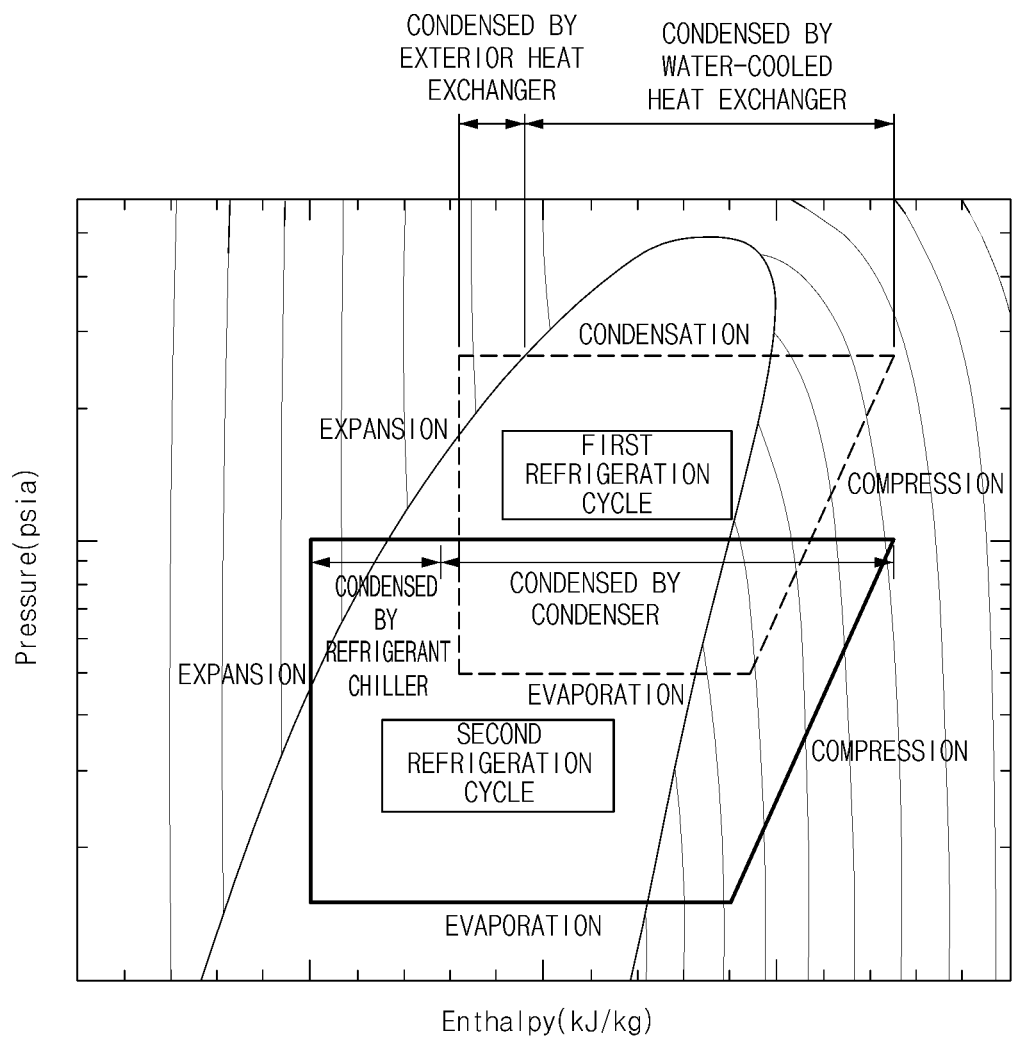
FIG. 30 illustrates a ph diagram of a vehicle thermal management system according to an exemplary embodiment of the present disclosure.

Referring to FIGS. 3 and 30, the first refrigerant may be compressed by the first compressor 23 in the first refrigeration cycle 21 of the HVAC subsystem 11. The compressed first refrigerant may be primarily condensed by the water-cooled heat exchanger 70, and be secondarily condensed by the external heat exchanger 25. The condensed first refrigerant may be expanded by the cooling-side expansion valve 26, and the expanded first refrigerant may be vaporized by the evaporator 27. The second refrigerant may be compressed by the second compressor 62 in the second refrigeration cycle 14. The compressed second refrigerant may be primarily condensed by the condenser 63, and be secondarily condensed by the refrigerant chiller 52. The condensed second refrigerant may be expanded by the second chiller-side expansion valve 65, and the expanded second refrigerant may be vaporized by the battery chiller 33. Accordingly, the first refrigerant may cool the second refrigerant through the refrigerant chiller 52, and the cooled second refrigerant may cool the battery-side coolant through the battery chiller 33. As the cooled battery-side coolant cools the battery pack 32, the battery-side coolant's performance may be significantly improved, and thus the cooling of the battery pack 32 may be significantly improved.

Figure 4:
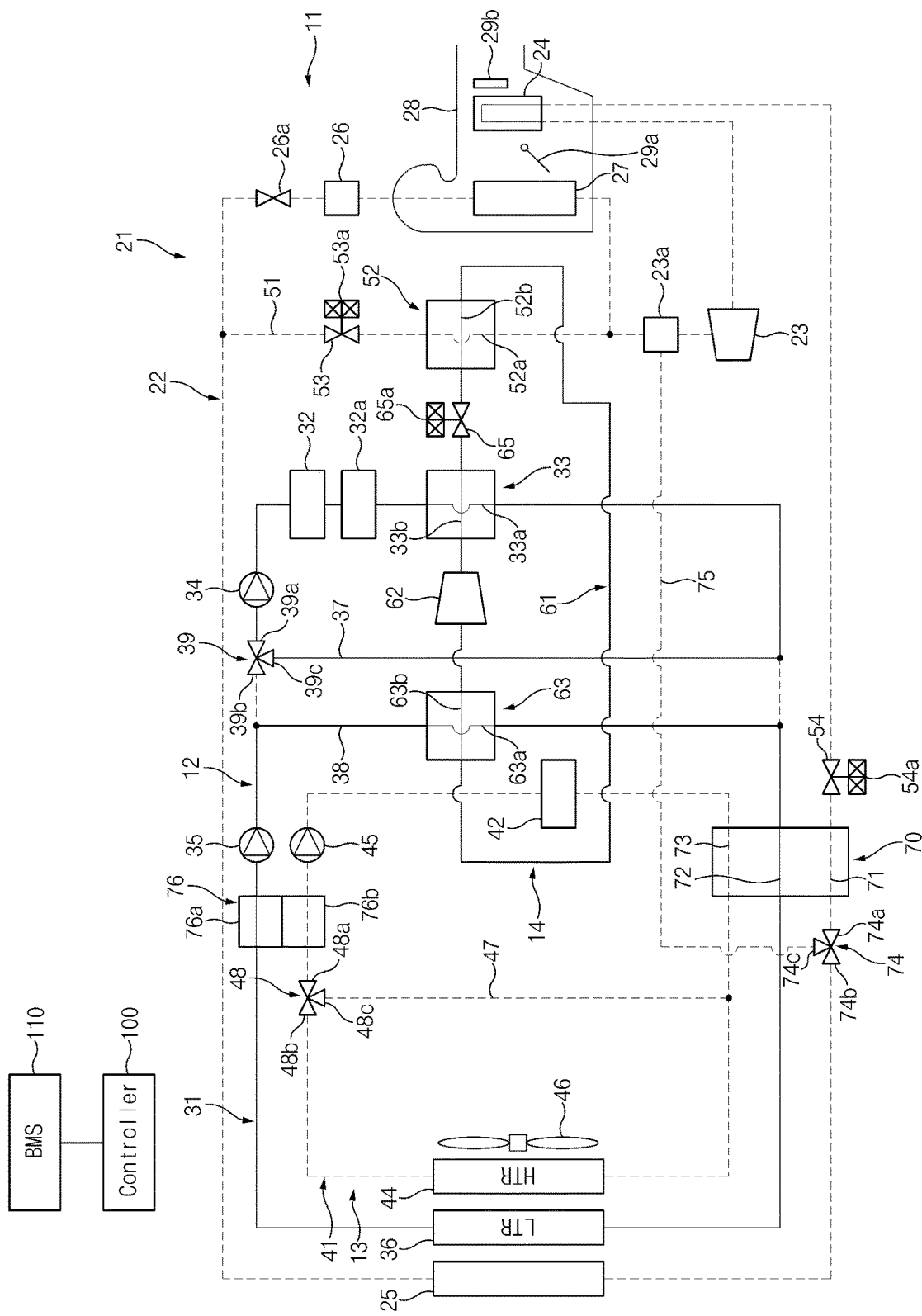
FIG. 4 illustrates a case in which a battery pack is cooled by a second refrigeration cycle and a battery cooling subsystem when a first compressor of an HVAC subsystem does not operate in the vehicle thermal management system of FIG. 1.

FIG. 4 shows that when the first compressor 23 of the HVAC subsystem 11 does not operate, the battery pack 32 may be cooled by the battery cooling subsystem 12 and the second refrigeration cycle 14.

Referring to FIG. 4, the three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the condenser 63, the second passage 72 of the water-cooled heat exchanger 70, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the first passage 63a of the condenser 63, the second passage 72 of the water-cooled heat exchanger 70, and the battery radiator 36 by the second battery-side pump 35. The second refrigerant in the condenser 63 may be cooled and condensed by the battery-side coolant passing through the second battery bypass conduit 38. As the first compressor 23 of the HVAC subsystem 11 is stopped, the first refrigerant may not circulate through the first refrigerant loop 22 of the first refrigeration cycle 21. Furthermore, as the powertrain-side pump 45 of the powertrain cooling subsystem 13 is stopped, the powertrain-side coolant may not circulate through the powertrain coolant loop 41. As the second compressor 62 of the second refrigeration cycle 14 operates, the second refrigerant may cool the battery-side coolant in the battery chiller 33, and the cooled battery-side coolant may cool the battery pack 32.

Figure 5:
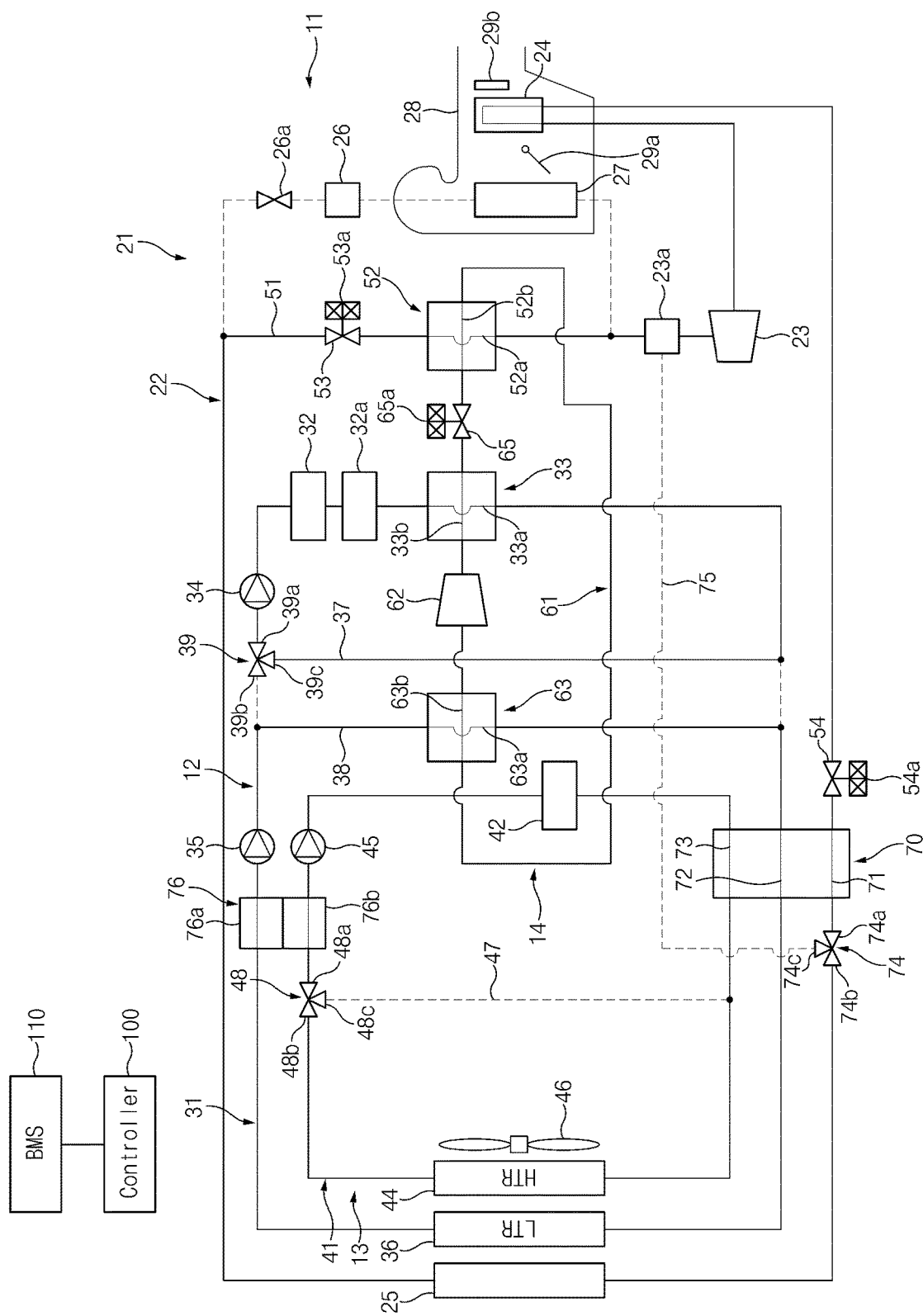
FIG. 5 illustrates a case in which a battery pack is cooled by a first refrigeration cycle of an HVAC subsystem, a second refrigeration cycle, and a battery cooling subsystem when the HVAC subsystem does not operate in a cooling mode and a heating mode in the vehicle thermal management system of FIG. 1.

FIG. 5 shows that when the HVAC subsystem 11 does not operate in the cooling mode and the heating mode, the battery pack 32 may be cooled by the first refrigeration cycle 21 of the HVAC subsystem 11, the second refrigeration cycle 14, and the battery cooling subsystem 12.

Referring to FIG. 5, as the shut-off valve 26a of the cooling-side expansion valve 26 is closed, the first refrigerant may not flow into the evaporator 27, and may only flow into the first chiller-side expansion valve 53 and the refrigerant chiller 52 through the branch conduit 51. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the condenser 63, the second passage 72 of the water-cooled heat exchanger 70, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the first passage 63a of the condenser 63, the second passage 72 of the water-cooled heat exchanger 70, and the battery radiator 36 by the second battery-side pump 35. The second refrigerant in the condenser 63 may be cooled and condensed by the battery-side coolant passing through the second battery bypass conduit 38. The first chiller-side expansion valve 53 may be opened to a predetermined degree. As the first refrigerant passes through the first passage 52a of the refrigerant chiller 52, the second refrigerant may exchange heat with the first refrigerant in the refrigerant chiller 52. Because the temperature of the second refrigerant passing through the second passage 52b of the refrigerant chiller 52 is higher than the temperature of the first refrigerant passing through the first passage 52a of the refrigerant chiller 52, the heat may be transferred from the second refrigerant to the first refrigerant, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The second refrigerant cooled and condensed by the refrigerant chiller 52 may cool the battery-side coolant in the battery chiller 33, and the cooled battery-side coolant may cool the battery pack 32.

Figure 6:
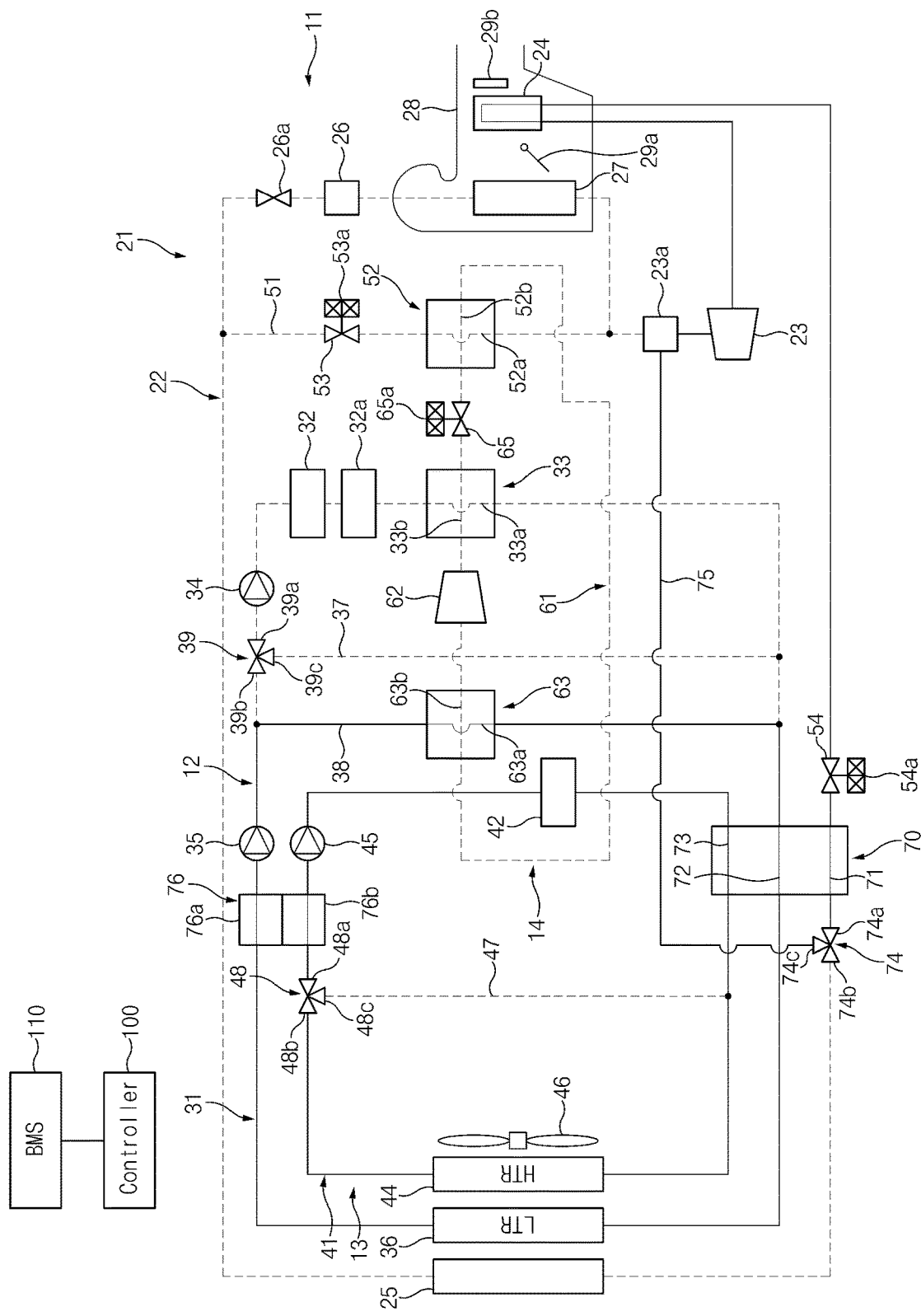
FIG. 6 illustrates a case in which a battery pack is not cooled when an HVAC subsystem operates in a heating mode in the vehicle thermal management system of FIG. 1.

FIG. 6 shows that when the HVAC subsystem 11 operates in the heating mode, the battery pack 32 may not be cooled.

Referring to FIG. 6, the three-way valve 74 of the HVAC subsystem 11 may be switched to open the third port 74c, and the opening amount of the heating-side expansion valve 54 may be adjusted to a predetermined degree. The first refrigerant may be compressed by the first compressor 23 in the first refrigeration cycle 21 of the HVAC subsystem 11, and the compressed first refrigerant may be condensed by the internal condenser 24. As the air passing through the internal condenser 24 is heated, the heating of the passenger compartment may be performed. As the opening amount of the heating-side expansion valve 54 is adjusted, the first refrigerant may be expanded by the heating-side expansion valve 54, and the expanded first refrigerant may be vaporized by the water-cooled heat exchanger 70. The vaporized first refrigerant may be directed into the first compressor 23 through the accumulator 23a. The three-way valve 39 of the battery cooling subsystem 12 may be switched to close all of the first port 39a, the second port 39b, and the third port 39c. As the first battery-side pump 34 is stopped, and the second battery-side pump 35 operates, the battery-side coolant may be directed toward the second battery bypass conduit 38 so that it may bypass the first battery-side pump 34, the battery pack 32, and the battery chiller 33, and may sequentially pass through the first passage 63a of the condenser 63, the second passage 72 of the water-cooled heat exchanger 70, and the battery radiator 36 by the second battery-side pump 35. As the powertrain-side pump 45 of the powertrain cooling subsystem 13 operates, the powertrain-side coolant may circulate through the powertrain coolant loop 41. As the second compressor 62 is stopped, the second refrigerant may not circulate through the second refrigerant loop 61 of the second refrigeration cycle 14.

Figure 7:
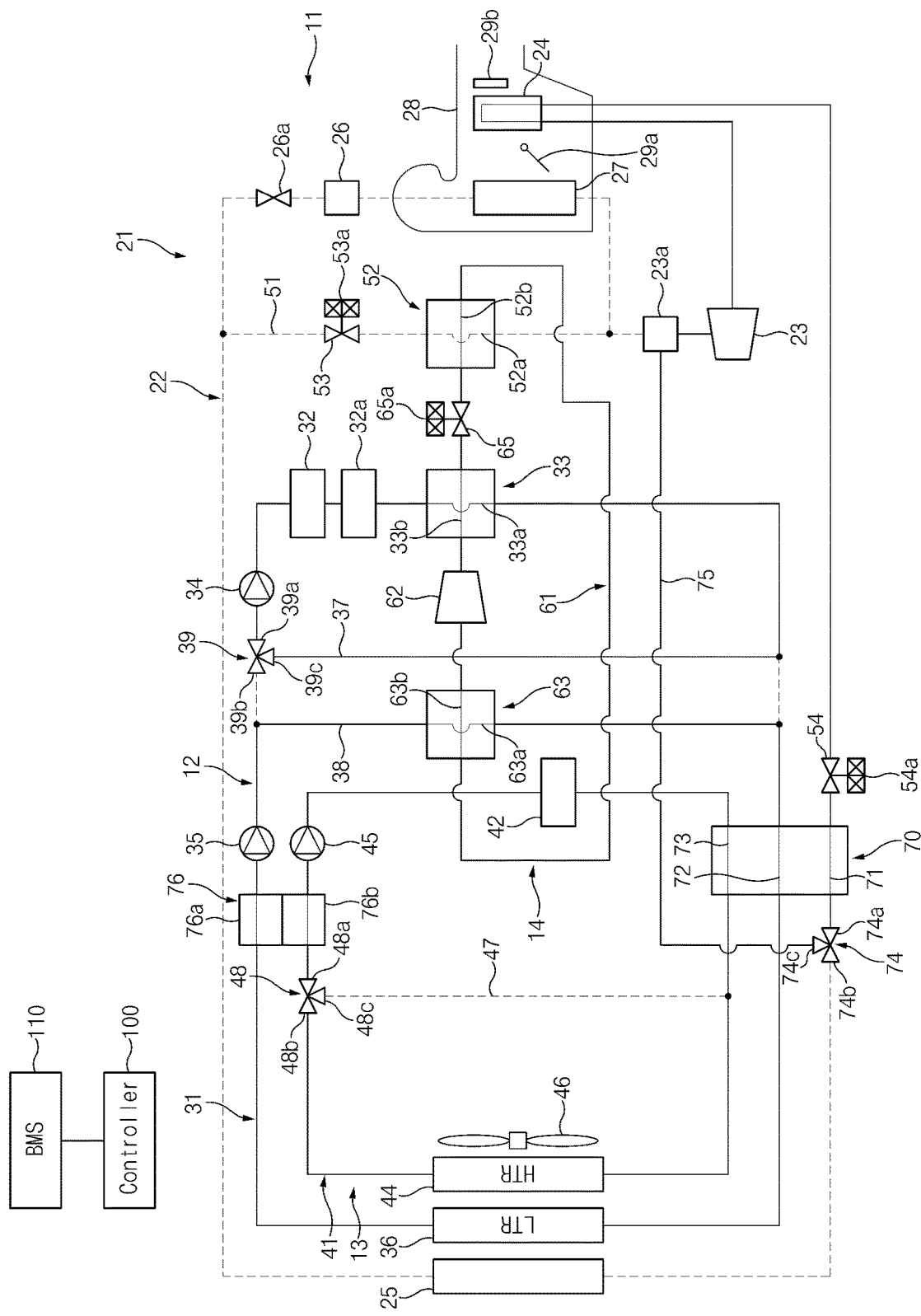
FIG. 7 illustrates a case in which a battery pack is cooled by a battery cooling subsystem and a second refrigeration cycle when an HVAC subsystem operates in a heating mode in the vehicle thermal management system of FIG. 1.

FIG. 7 shows that when the HVAC subsystem 11 operates in the heating mode, the battery pack 32 may be cooled by the battery cooling subsystem 12 and the second refrigeration cycle 14.

Referring to FIG. 7, the three-way valve 74 of the HVAC subsystem 11 may be switched to open the third port 74c, and the opening amount of the heating-side expansion valve 54 may be adjusted to a predetermined degree. The first refrigerant may be compressed by the first compressor 23 in the first refrigeration cycle 21 of the HVAC subsystem 11, and the compressed first refrigerant may be condensed by the internal condenser 24. As the air passing through the internal condenser 24 is heated, the heating of the passenger compartment may be performed. As the opening amount of the heating-side expansion valve 54 is adjusted, the first refrigerant may be expanded by the heating-side expansion valve 54, and the expanded first refrigerant may be vaporized by the water-cooled heat exchanger 70. The vaporized first refrigerant may be directed into the first compressor 23 through the accumulator 23a. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the condenser 63, the second passage 72 of the water-cooled heat exchanger 70, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the first passage 63a of the condenser 63, the second passage 72 of the water-cooled heat exchanger 70, and the battery radiator 36 by the second battery-side pump 35. The second refrigerant may be vaporized by the battery-side coolant in the battery chiller 33, and the battery-side coolant may be cooled by the second refrigerant in the battery chiller 33. The cooled battery-side coolant may cool the battery pack 32. The second refrigerant may be cooled and condensed by the battery-side coolant passing through the second battery bypass conduit 38 in the condenser 63. As the powertrain-side pump 45 of the powertrain cooling subsystem 13 operates, the powertrain-side coolant may circulate through the powertrain coolant loop 41.

As described above, when the HVAC subsystem 11 operates in the heating mode, the water-cooled heat exchanger 70 is configured as an evaporator that vaporizes the first refrigerant. As the first passage 63a of the condenser 63 is located on the upstream side of the second passage 72 of the water-cooled heat exchanger 70, and the powertrain component 42 is located on the upstream side of the third passage 73 of the water-cooled heat exchanger 70, the battery-side coolant heated in the condenser 63 and the powertrain-side coolant heated by the powertrain component 42 may be provided as heat sources for vaporizing the first refrigerant in the water-cooled heat exchanger 70. Accordingly, during the heating operation of the HVAC subsystem 11, the heat sources for heating may be sufficiently secured.

FIGS. 8 to 14 illustrate a vehicle thermal management system according to another exemplary embodiment of the present disclosure.

Figure 8:
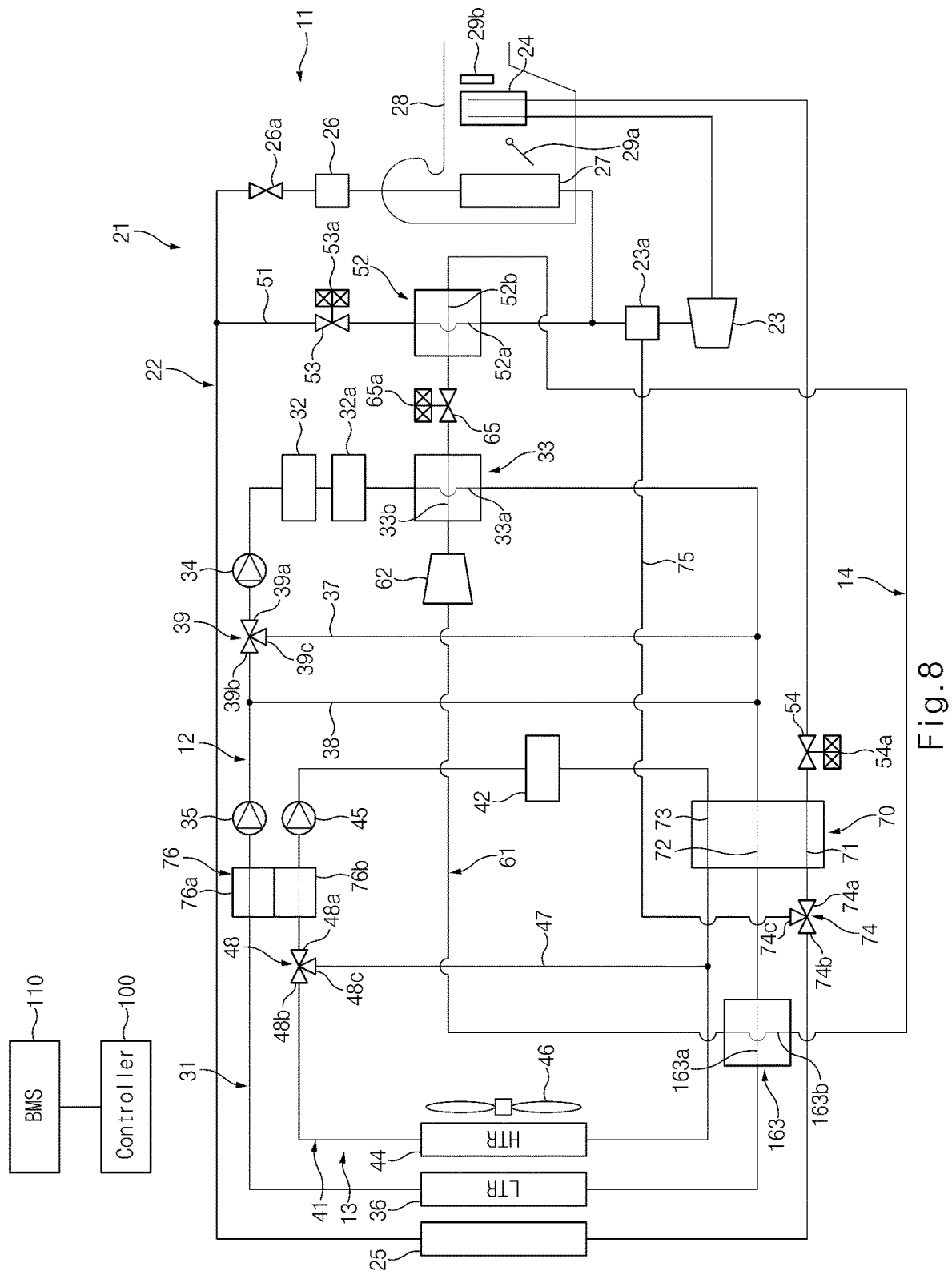
FIG. 8 illustrates a vehicle thermal management system according to another exemplary embodiment of the present disclosure.

Referring to FIG. 8, in a vehicle thermal management system according to another exemplary embodiment of the present disclosure, a condenser 163 of the second refrigeration cycle 14 may be located on the downstream side of the second passage 72 of the water-cooled heat exchanger 70 in the battery coolant loop 31. Because the second passage 72 of the water-cooled heat exchanger 70 is located on the upstream side of the condenser 163 of the second refrigeration cycle 14 in the battery coolant loop 31 of the battery cooling subsystem 12, condensation or evaporation (vaporization) of the first refrigerant by the water-cooled heat exchanger 70 may occur prior to condensation of the second refrigerant by the condenser 163. According to a predetermined exemplary embodiment of the present disclosure, the condenser 163 of the second refrigeration cycle 14 may be located between the battery radiator 36 and the second passage 72 of the water-cooled heat exchanger 70 in the battery coolant loop 31 of the battery cooling subsystem 12. The condenser 163 may include a first passage 163a fluidly connected to the battery coolant loop 31 of the battery cooling subsystem 12, and a second passage 163b fluidly connected to the second refrigerant loop 61 of the second refrigeration cycle 14. The first passage 163a may be located between the battery radiator 36 and the second passage 72 of the water-cooled heat exchanger 70 in the battery coolant loop 31 of the battery cooling subsystem 12, and accordingly the first passage 163a may be located on the downstream side of the second passage 72 of the water-cooled heat exchanger 70. The second passage 163b may be located on the downstream side of the second compressor 62 in the second refrigerant loop 61. The battery-side coolant may be received from the second passage 72 of the water-cooled heat exchanger 70 to the first passage 163a of the condenser 163, and the second refrigerant may pass through the second passage 163b of the condenser 163 so that the second refrigerant may be cooled and condensed by the battery-side coolant in the condenser 163.

Figure 9:
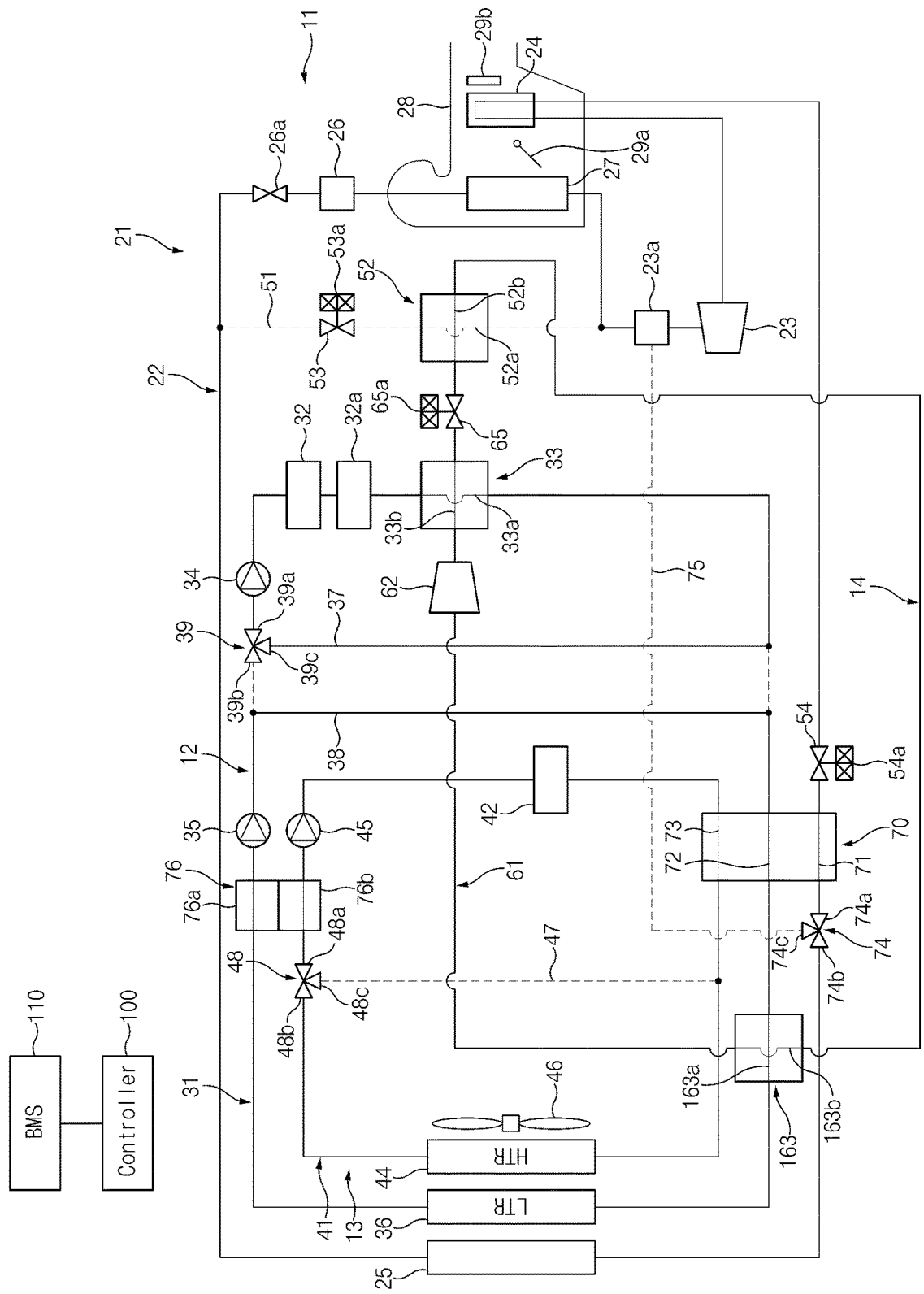
FIG. 9 illustrates a case in which a battery pack is cooled by a second refrigeration cycle and a battery cooling subsystem when an HVAC subsystem operates in a cooling mode in the vehicle thermal management system of FIG. 8.

FIG. 9 shows that when the HVAC subsystem 11 operates in the cooling mode, the battery pack 32 may be cooled by the second refrigeration cycle 14 and the battery cooling subsystem 12, and the cooling of the battery pack 32 may be performed independently of the HVAC subsystem 11.

Referring to FIG. 9, the three-way valve 48 of the powertrain cooling subsystem 13 may be switched to close the third port 48c, and accordingly the powertrain-side coolant may circulate through the powertrain coolant loop 41. The three-way valve 74 of the HVAC subsystem 11 may be switched to close the third port 74c, and the opening amount of the heating-side expansion valve 54 may be completely opened to 100% so that the first refrigerant may not be expanded by the heating-side expansion valve 54. The first chiller-side expansion valve 53 may be closed, and accordingly the first refrigerant may not pass through the first passage 52a of the refrigerant chiller 52. Thus, the second refrigerant may not exchange heat with the first refrigerant in the refrigerant chiller 52. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, the first passage 163a of the condenser 163, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70, the first passage 163a of the condenser 163, and the battery radiator 36 by the second battery-side pump 35. The condenser 163 may cool and condense the second refrigerant received from the second compressor 62 using the battery-side coolant received from the second passage 72 of the water-cooled heat exchanger 70. The second refrigerant cooled and condensed by the condenser 163 may be expanded by the second chiller-side expansion valve 65. As the expanded second refrigerant passes through the second passage 33b of the battery chiller 33, the second refrigerant may cool the battery-side coolant in the battery chiller 33, and the cooled battery-side coolant may cool the battery pack 32.

Figure 10:
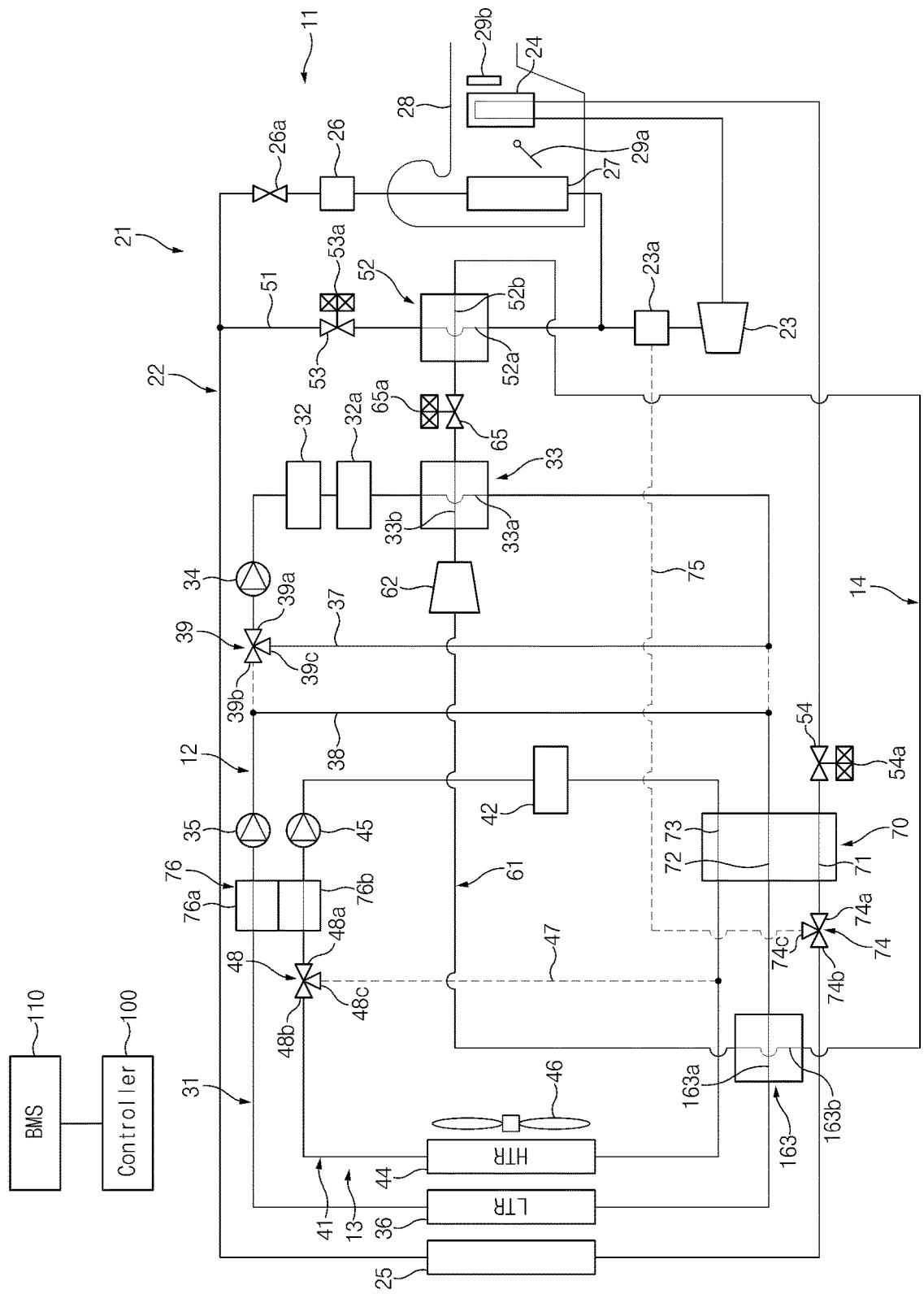
FIG. 10 illustrates a case in which a battery pack is cooled by a first refrigeration cycle of an HVAC subsystem, a second refrigeration cycle, and a battery cooling subsystem when the HVAC subsystem operates in a cooling mode in the vehicle thermal management system of FIG. 8.

FIG. 10 shows that when the HVAC subsystem 11 operates in the cooling mode, the battery pack 32 may be cooled by the first refrigeration cycle 21 of the HVAC subsystem 11, the second refrigeration cycle 14, and the battery cooling subsystem 12.

Referring to FIG. 10, the three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, the condenser 163, and the battery radiator 36, and may sequentially pass through the battery pack 32 and the first passage 33a of the battery chiller 33 by the first battery-side pump 34. A remaining portion of the battery-side coolant may be directed toward the second battery bypass conduit 38 so that it may bypass the first battery-side pump 34, the battery pack 32, and the first passage 33a of the battery chiller 33, and may sequentially pass through the second passage 72 of the water-cooled heat exchanger 70, the first passage 163a of the condenser 163, and the battery radiator 36 by the second battery-side pump 35. The condenser 163 may cool and condense the second refrigerant received from the second compressor 62 using the battery-side coolant received from the second passage 72 of the water-cooled heat exchanger 70. The three-way valve 48 of the powertrain cooling subsystem 13 may be switched to close the third port 48c, and accordingly the powertrain-side coolant may circulate through the powertrain coolant loop 41. The three-way valve 74 of the HVAC subsystem 11 may be switched to close the third port 74c, and the opening amount of the heating-side expansion valve 54 may be completely opened to 100% so that the first refrigerant may not be expanded by the heating-side expansion valve 54. The first chiller-side expansion valve 53 may be opened to a predetermined degree. As the first refrigerant passes through the first passage 52a of the refrigerant chiller 52, the second refrigerant may exchange heat with the first refrigerant in the refrigerant chiller 52. Because the temperature of the second refrigerant passing through the second passage 52b of the refrigerant chiller 52 is higher than the temperature of the first refrigerant passing through the first passage 52a of the refrigerant chiller 52, the heat may be transferred from the second refrigerant to the first refrigerant, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The second refrigerant cooled and condensed by the refrigerant chiller 52 may be expanded by the second chiller-side expansion valve 65. As the expanded second refrigerant passes through the second passage 33b of the battery chiller 33, the second refrigerant may cool the battery-side coolant in the battery chiller 33, and the cooled battery-side coolant may cool the battery pack 32.

Referring to FIGS. 10 and 30, the first refrigerant may be compressed by the first compressor 23 in the first refrigeration cycle 21 of the HVAC subsystem 11. The compressed first refrigerant may be primarily condensed by the water-cooled heat exchanger 70, and be secondarily condensed by the external heat exchanger 25. The condensed first refrigerant may be expanded by the cooling-side expansion valve 26, and the expanded first refrigerant may be vaporized by the evaporator 27. The second refrigerant may be compressed by the second compressor 62 in the second refrigeration cycle 14. The compressed second refrigerant may be primarily condensed by the condenser 163, and be secondarily condensed by the refrigerant chiller 52. The condensed second refrigerant may be expanded by the second chiller-side expansion valve 65, and the expanded second refrigerant may be vaporized by the battery chiller 33. Accordingly, the first refrigerant may cool the second refrigerant through the refrigerant chiller 52, and the cooled second refrigerant may cool the battery-side coolant through the battery chiller 33. As the cooled battery-side coolant cools the battery pack 32, the battery-side coolant's performance may be significantly improved, and thus the cooling of the battery pack 32 may be significantly improved.

Figure 11:
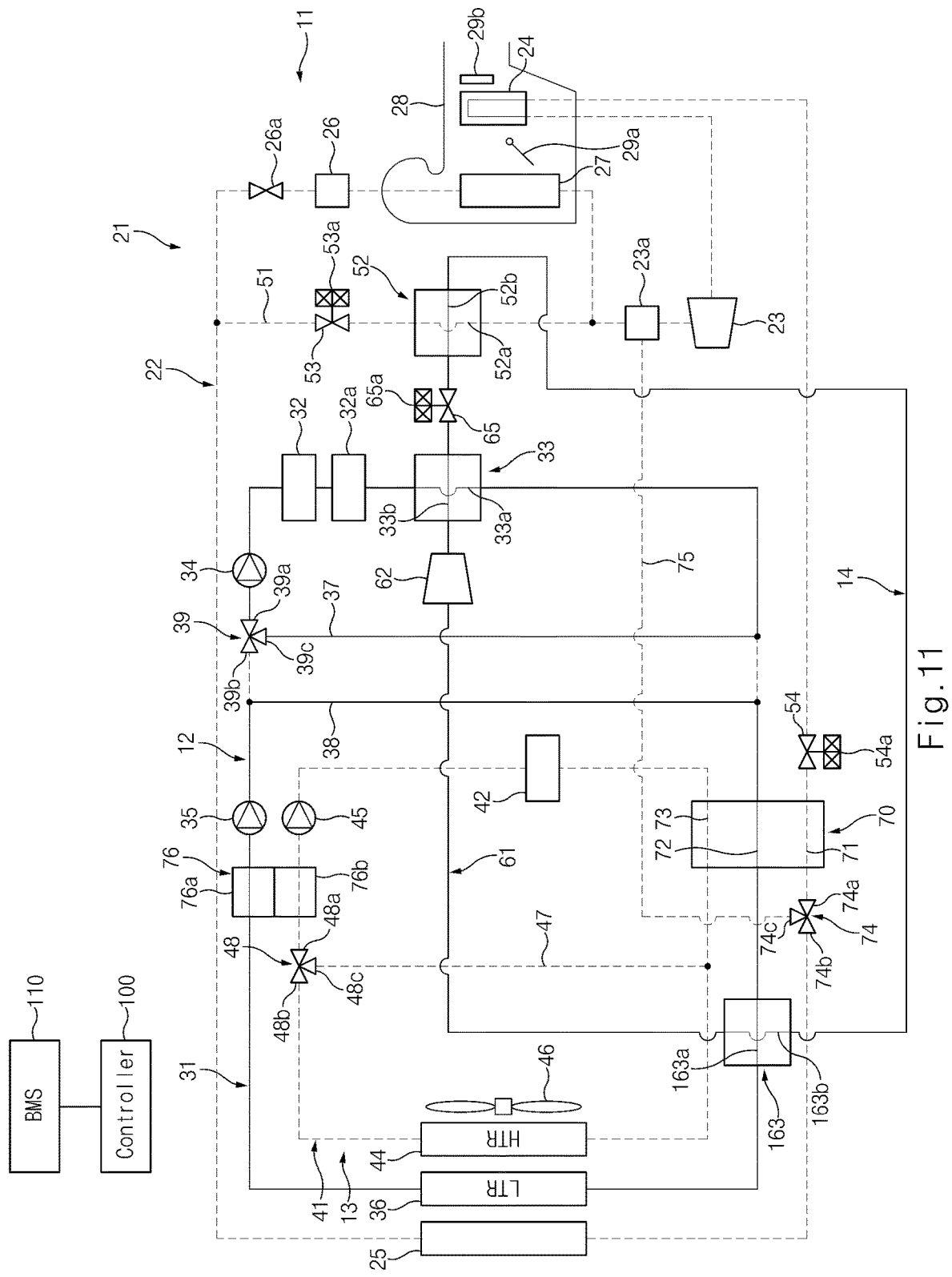
FIG. 11 illustrates a case in which a battery pack is cooled by a second refrigeration cycle and a battery cooling subsystem when a first compressor of an HVAC subsystem does not operate in the vehicle thermal management system of FIG. 8.

FIG. 11 shows that when the first compressor 23 of the HVAC subsystem 11 does not operate, the battery pack 32 may be cooled by the battery cooling subsystem 12 and the second refrigeration cycle 14.

Referring to FIG. 11, the three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, the first passage 163a of the condenser 163, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70, the first passage 163a of the condenser 163, and the battery radiator 36 by the second battery-side pump 35. The second refrigerant in the condenser 163 may be cooled and condensed by the battery-side coolant received from the second passage 72 of the water-cooled heat exchanger 70. As the first compressor 23 of the HVAC subsystem 11 is stopped, the first refrigerant may not circulate through the first refrigerant loop 22 of the first refrigeration cycle 21. Furthermore, as the powertrain-side pump 45 of the powertrain cooling subsystem 13 is stopped, the powertrain-side coolant may not circulate through the powertrain coolant loop 41. As the second compressor 62 of the second refrigeration cycle 14 operates, the second refrigerant may cool the battery-side coolant in the battery chiller 33, and the cooled battery-side coolant may cool the battery pack 32.

Figure 12:
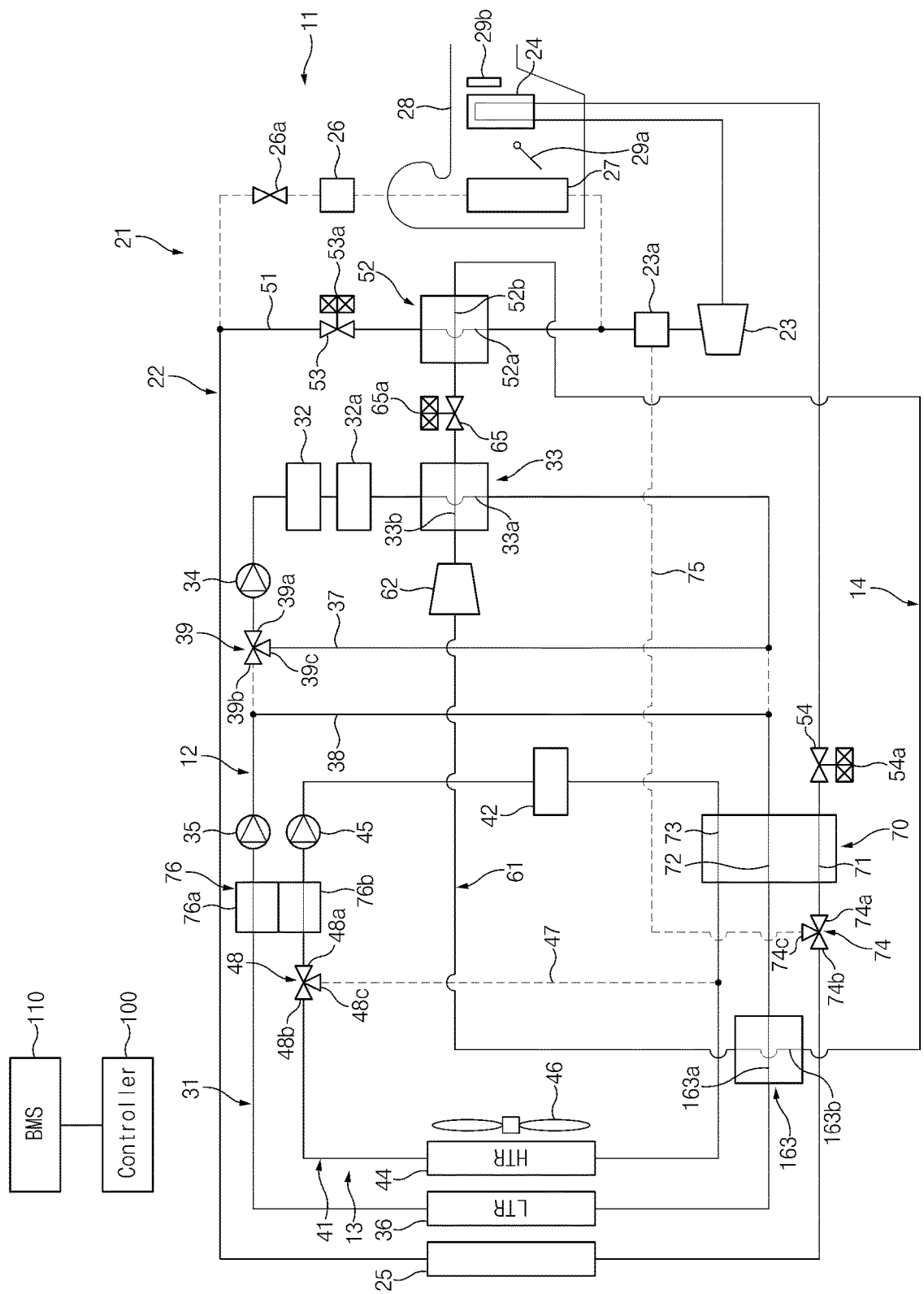
FIG. 12 illustrates a case in which a battery pack is cooled by a first refrigeration cycle of an HVAC subsystem, a second refrigeration cycle, and a battery cooling subsystem when the HVAC subsystem does not operate in a cooling mode and a heating mode in the vehicle thermal management system of FIG. 8.

FIG. 12 shows that when the HVAC subsystem 11 does not operate in the cooling mode and the heating mode, the battery pack 32 may be cooled by the first refrigeration cycle 21 of the HVAC subsystem 11, the second refrigeration cycle 14, and the battery cooling subsystem 12.

Referring to FIG. 12, as the shut-off valve 26a of the cooling-side expansion valve 26 is closed, the first refrigerant may not flow into the evaporator 27, and may only flow into the first chiller-side expansion valve 53 and the refrigerant chiller 52 through the branch conduit 51. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, the first passage 163a of the condenser 163, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70, the first passage 163a of the condenser 163, and the battery radiator 36 by the second battery-side pump 35. The second refrigerant in the condenser 163 may be cooled and condensed by the battery-side coolant received from the second passage 72 of the water-cooled heat exchanger 70. The first chiller-side expansion valve 53 may be opened to a predetermined degree. As the first refrigerant passes through the first passage 52a of the refrigerant chiller 52, the second refrigerant may exchange heat with the first refrigerant in the refrigerant chiller 52. Because the temperature of the second refrigerant passing through the second passage 52b of the refrigerant chiller 52 is higher than the temperature of the first refrigerant passing through the first passage 52a of the refrigerant chiller 52, the heat may be transferred from the second refrigerant to the first refrigerant, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The second refrigerant cooled and condensed by the refrigerant chiller 52 may cool the battery-side coolant in the battery chiller 33, and the cooled battery-side coolant may cool the battery pack 32.

Figure 13:
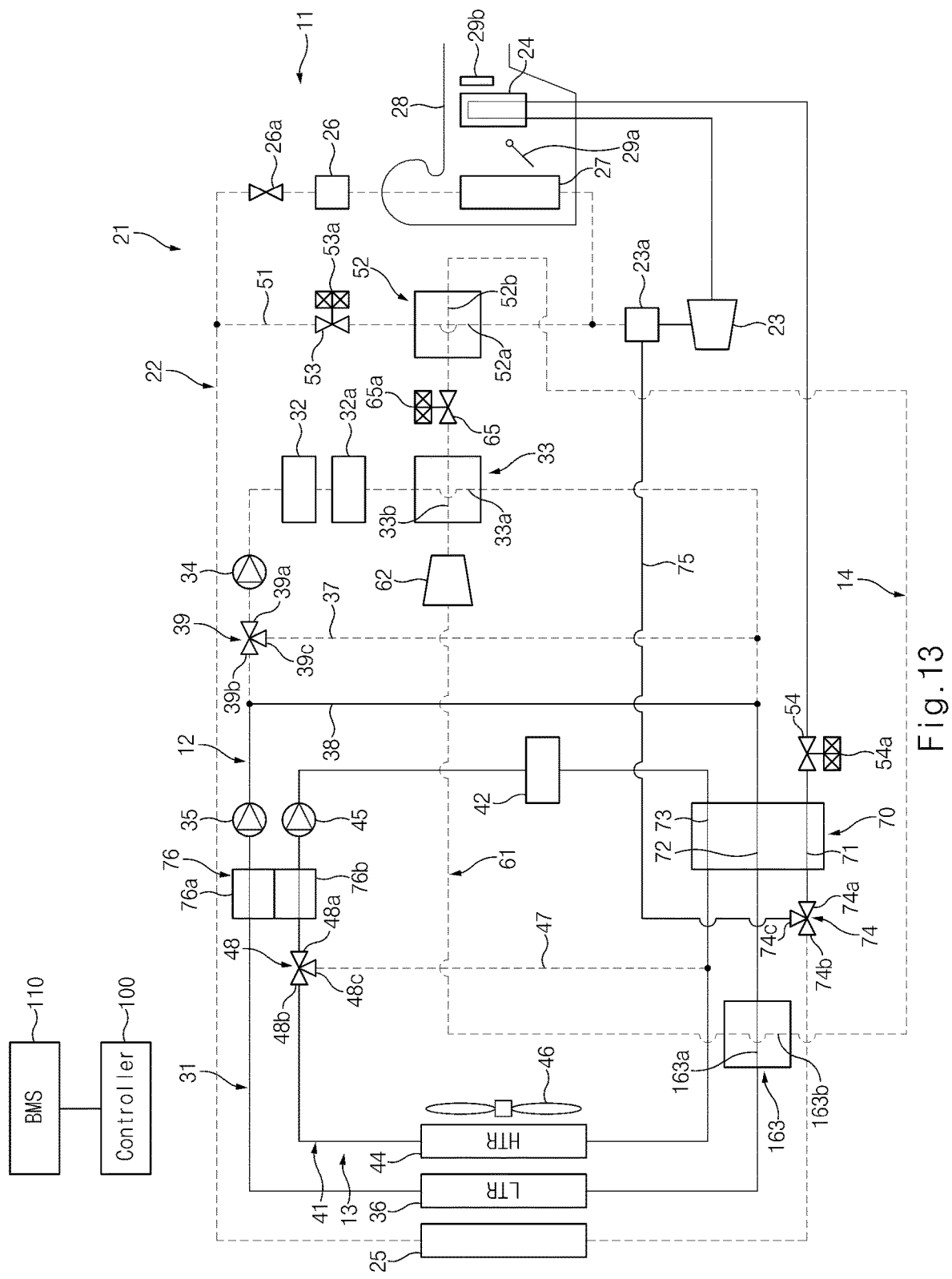
FIG. 13 illustrates a case in which a battery pack is not cooled when an HVAC subsystem operates in a heating mode in the vehicle thermal management system of FIG. 8.

FIG. 13 shows that when the HVAC subsystem 11 operates in the heating mode, the battery pack 32 may not be cooled.

Referring to FIG. 13, the three-way valve 74 of the HVAC subsystem 11 may be switched to open the third port 74c, and the opening amount of the heating-side expansion valve 54 may be adjusted to a predetermined degree. The first refrigerant may be compressed by the first compressor 23 in the first refrigeration cycle 21 of the HVAC subsystem 11, and the compressed first refrigerant may be condensed by the internal condenser 24. As the air passing through the internal condenser 24 is heated, the heating of the passenger compartment may be performed. As the opening amount of the heating-side expansion valve 54 is adjusted, the first refrigerant may be expanded by the heating-side expansion valve 54, and the expanded first refrigerant may be vaporized by the water-cooled heat exchanger 70. The vaporized first refrigerant may be directed into the first compressor 23 through the accumulator 23a. The three-way valve 39 of the battery cooling subsystem 12 may be switched to close all of the first port 39a, the second port 39b, and the third port 39c. As the first battery-side pump 34 is stopped, and the second battery-side pump 35 operates, the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70, the first passage 163a of the condenser 163, and the battery radiator 36 by the second battery-side pump 35. As the powertrain-side pump 45 of the powertrain cooling subsystem 13 operates, the powertrain-side coolant may circulate through the powertrain coolant loop 41. As the second compressor 62 is stopped, the second refrigerant may not circulate through the second refrigerant loop 61 of the second refrigeration cycle 14.

Figure 14:
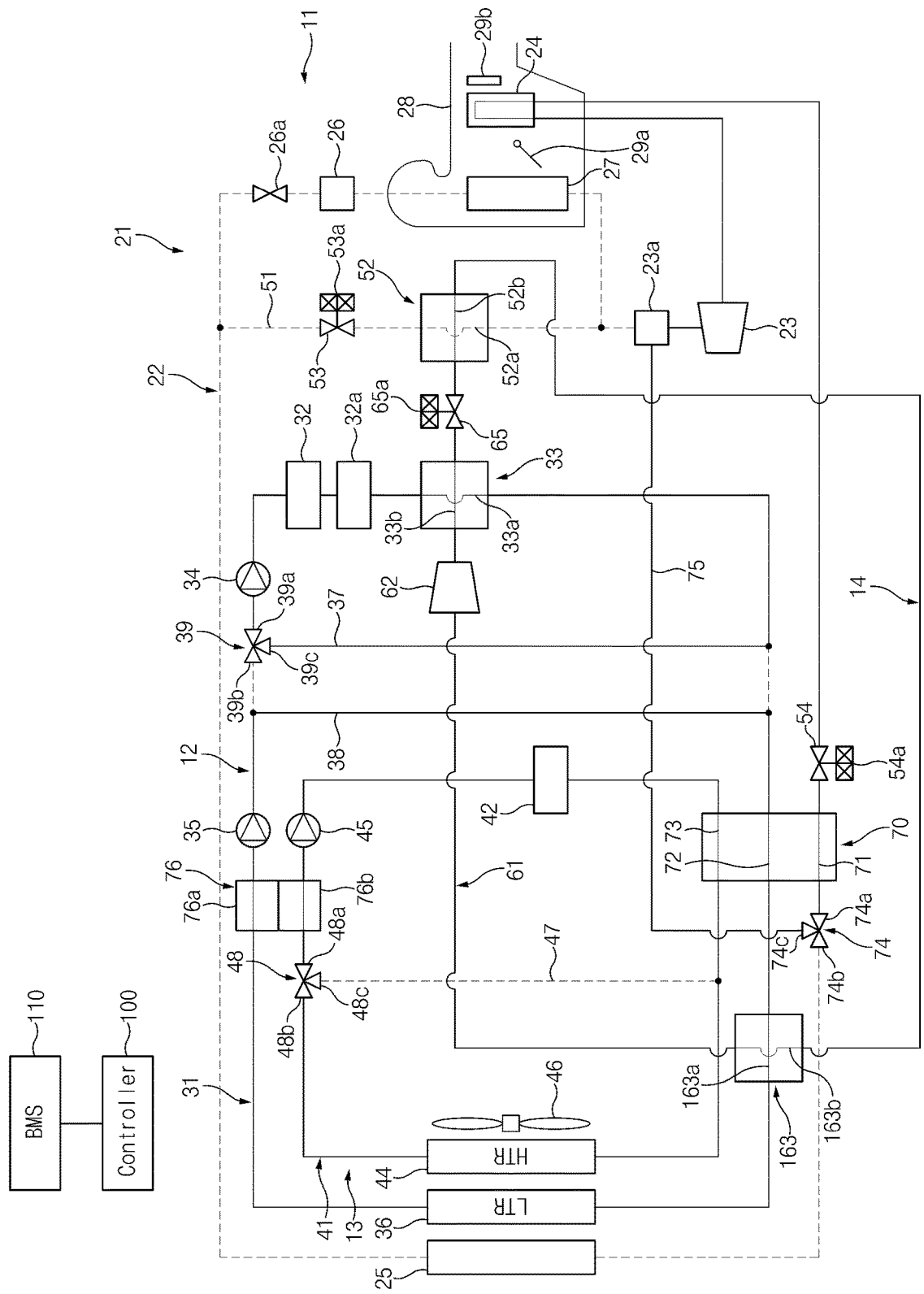
FIG. 14 illustrates a case in which a battery pack is cooled by a battery cooling subsystem and a second refrigeration cycle when an HVAC subsystem operates in a heating mode in the vehicle thermal management system of FIG. 8.

FIG. 14 shows that when the HVAC subsystem 11 operates in the heating mode, the battery pack 32 may be cooled by the battery cooling subsystem 12 and the second refrigeration cycle 14.

Referring to FIG. 14, the three-way valve 74 of the HVAC subsystem 11 may be switched to open the third port 74*c*, and the opening amount of the heating-side expansion valve 54 may be adjusted to a predetermined degree. The first refrigerant may be compressed by the first compressor 23 in the first refrigeration cycle 21 of the HVAC subsystem 11, and the compressed first refrigerant may be condensed by the internal condenser 24. As the air passing through the internal condenser 24 is heated, the heating of the passenger compartment may be performed. As the opening amount of the heating-side expansion valve 54 is adjusted, the first refrigerant may be expanded by the heating-side expansion valve 54, and the expanded first refrigerant may be vaporized by the water-cooled heat exchanger 70. The vaporized first refrigerant may be directed into the first compressor 23 through the accumulator 23*a*. The three-way valve 39 of the battery cooling subsystem 12 may be switched to close the second port 39*b* and to allow the third port 39*c* to communicate with the first port 39*a* (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, the first passage 163*a* of the condenser 163, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70, the first passage 163*a* of the condenser 163, and the battery radiator 36 by the second battery-side pump 35. The second refrigerant may be vaporized by the battery-side coolant passing through the first battery bypass conduit 37 in the battery chiller 33, and the battery-side coolant may be cooled by the second refrigerant in the battery chiller 33. The cooled battery-side coolant may cool the battery pack 32. The second refrigerant may be cooled and condensed in the condenser 63 by the battery-side coolant received from the second passage 72 of the water-cooled heat exchanger 70. As the powertrain-side pump 45 of the powertrain cooling subsystem 13 operates, the powertrain-side coolant may circulate through the powertrain coolant loop 41.

As described above, when the HVAC subsystem 11 operates in the heating mode, the water-cooled heat exchanger 70 is configured as an evaporator that vaporizes the first refrigerant. As the powertrain component 42 is located on the upstream side of the third passage 73 of the water-cooled heat exchanger 70, the powertrain-side coolant heated by the powertrain component 42 may be provided as a heat source for vaporizing the first refrigerant in the water-cooled heat exchanger 70. Accordingly, during the heating operation of the HVAC subsystem 11, the heat source for heating may be sufficiently secured.

FIGS. 15 to 21 illustrate a vehicle thermal management system according to another exemplary embodiment of the present disclosure.

Figure 15:
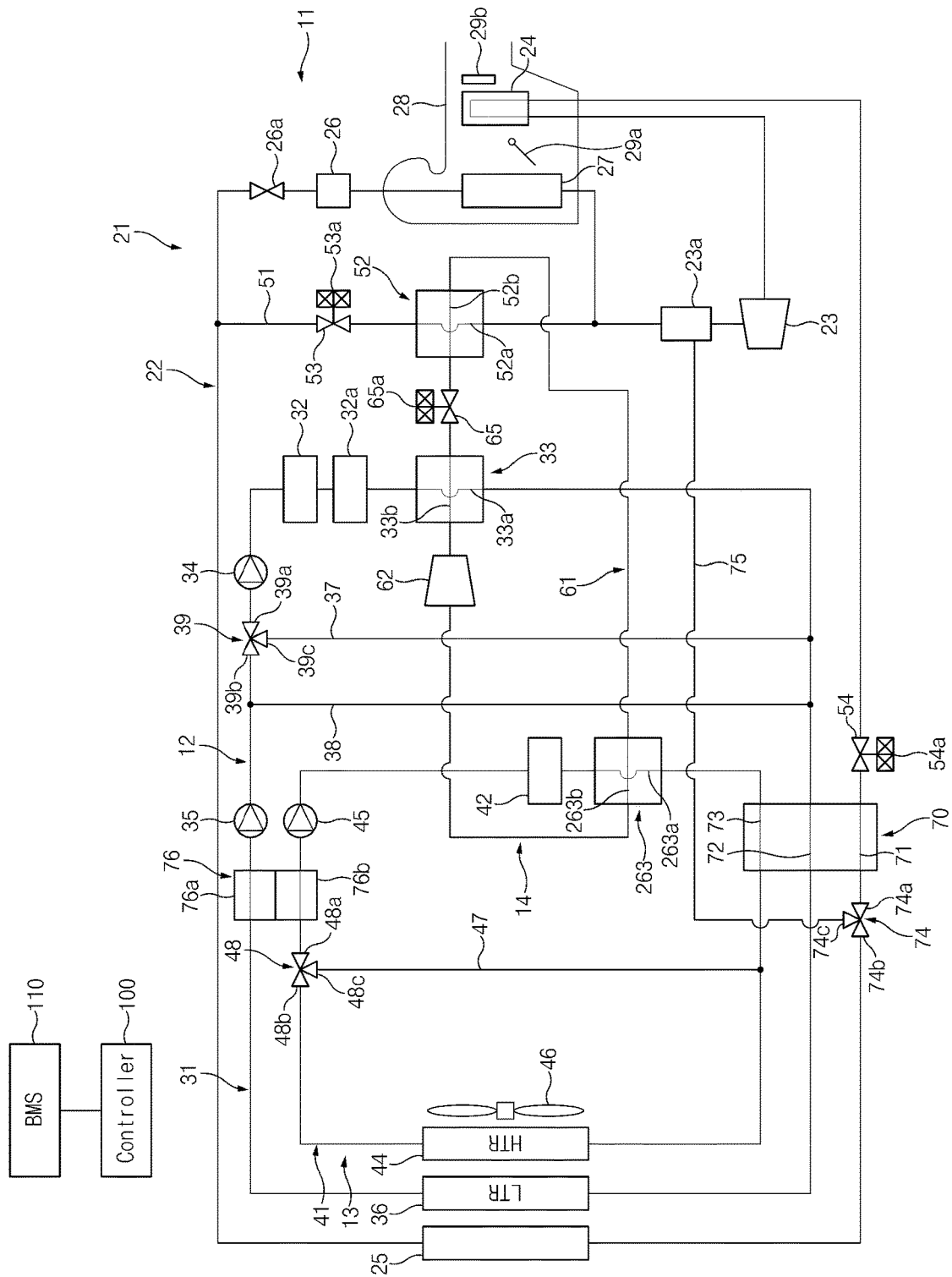
FIG. 15 illustrates a vehicle thermal management system according to another exemplary embodiment of the present disclosure.

Referring to FIG. 15, in a vehicle thermal management system according to another exemplary embodiment of the present disclosure, a condenser 263 of the second refrigeration cycle 14 may be thermally connected to the powertrain cooling subsystem 13. Accordingly, the second refrigerant may exchange heat with the powertrain-side coolant circulating in the powertrain cooling subsystem 13 through the condenser 263 so that it may be cooled and condensed. The condenser 263 may be configured to transfer heat between the powertrain-side coolant cooled by the ambient air through the powertrain radiator 44 and the second refrigerant received from the second compressor 62. Accordingly, the second refrigerant may be cooled and condensed by the powertrain-side coolant in the condenser 263, and the temperature of the powertrain-side coolant may be increased by the second refrigerant in the condenser 263. The condenser 263 may include a first passage 263*a* fluidly connected to the powertrain coolant loop 41 of the powertrain cooling subsystem 13, and a second passage 263*b* fluidly connected to the second refrigerant loop 61 of the second refrigeration cycle 14. The first passage 263*a* of the condenser 263 may be located on the upstream side of the third passage 73 of the water-cooled heat exchanger 70 in the powertrain coolant loop 41. The first passage 263*a* of the condenser 263 may be located between the powertrain component 42 and the third passage 73 of the water-cooled heat exchanger 70 in the powertrain coolant loop 41.

Figure 16:
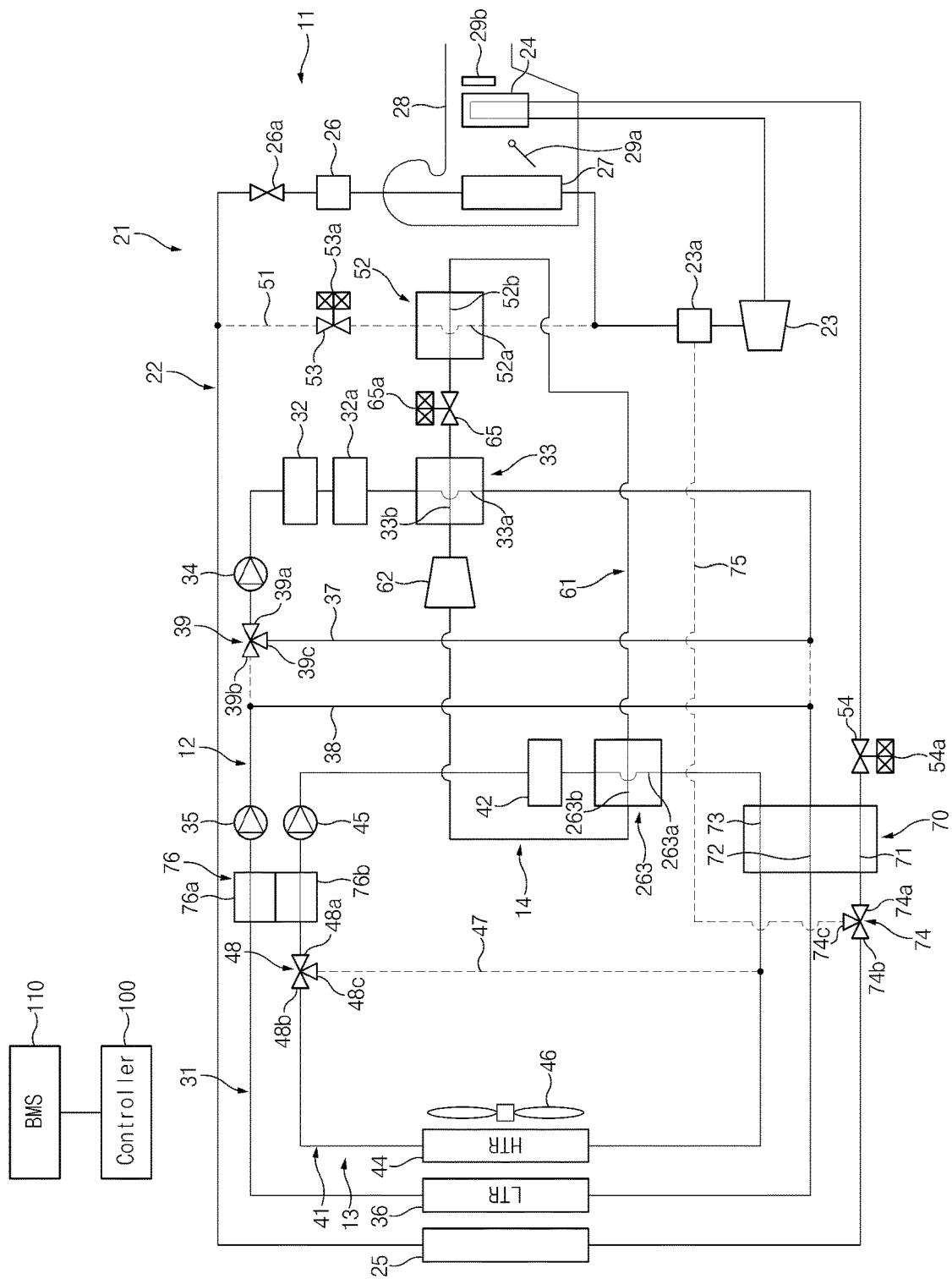
FIG. 16 illustrates a case in which a battery pack is cooled by a second refrigeration cycle, a battery cooling subsystem, and a powertrain cooling subsystem when an HVAC subsystem operates in a cooling mode in the vehicle thermal management system of FIG. 15.

FIG. 16 shows that when the HVAC subsystem 11 operates in the cooling mode, the battery pack 32 may be cooled by the second refrigeration cycle 14, the battery cooling subsystem 12, and the powertrain cooling subsystem 13, and the cooling of the battery pack 32 may be performed independently of the HVAC subsystem 11.

Referring to FIG. 16, the three-way valve 48 of the powertrain cooling subsystem 13 may be switched to close the third port 48*c*, and accordingly the powertrain-side coolant may circulate through the powertrain coolant loop 41. The three-way valve 74 of the HVAC subsystem 11 may be switched to close the third port 74*c*, and the opening amount of the heating-side expansion valve 54 may be completely opened to 100% so that the first refrigerant may not be expanded by the heating-side expansion valve 54. The first chiller-side expansion valve 53 may be closed, and accordingly the first refrigerant may not pass through the first passage 52*a* of the refrigerant chiller 52. Thus, the second refrigerant may not exchange heat with the first refrigerant in the refrigerant chiller 52. The three-way valve 39 of the battery cooling subsystem 12 may be switched to close the second port 39*b* and to allow the third port 39*c* to communicate with the first port 39*a* (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the first passage 33*a* of the battery chiller 33 by the first battery-side pump 34. A remaining portion of the battery-side coolant may be directed toward the second battery bypass conduit 38 so that it may bypass the first battery-side pump 34, the battery pack 32, and the first passage 33*a* of the battery chiller 33, and may sequentially pass through the second passage 72 of the water-cooled heat exchanger 70 and the battery radiator 36 by the second battery-side pump 35. The condenser 263 may cool and condense the second refrigerant received from the second compressor 62 using the powertrain-side coolant circulating in the powertrain coolant loop 41. The second refrigerant cooled and condensed by the condenser 263 may be expanded by the second chiller-side expansion valve 65. As the expanded second refrigerant passes through the second passage 33b of the battery chiller 33, the second refrigerant may cool the battery-side coolant in the battery chiller 33, and the cooled battery-side coolant may cool the battery pack 32.

Figure 17:
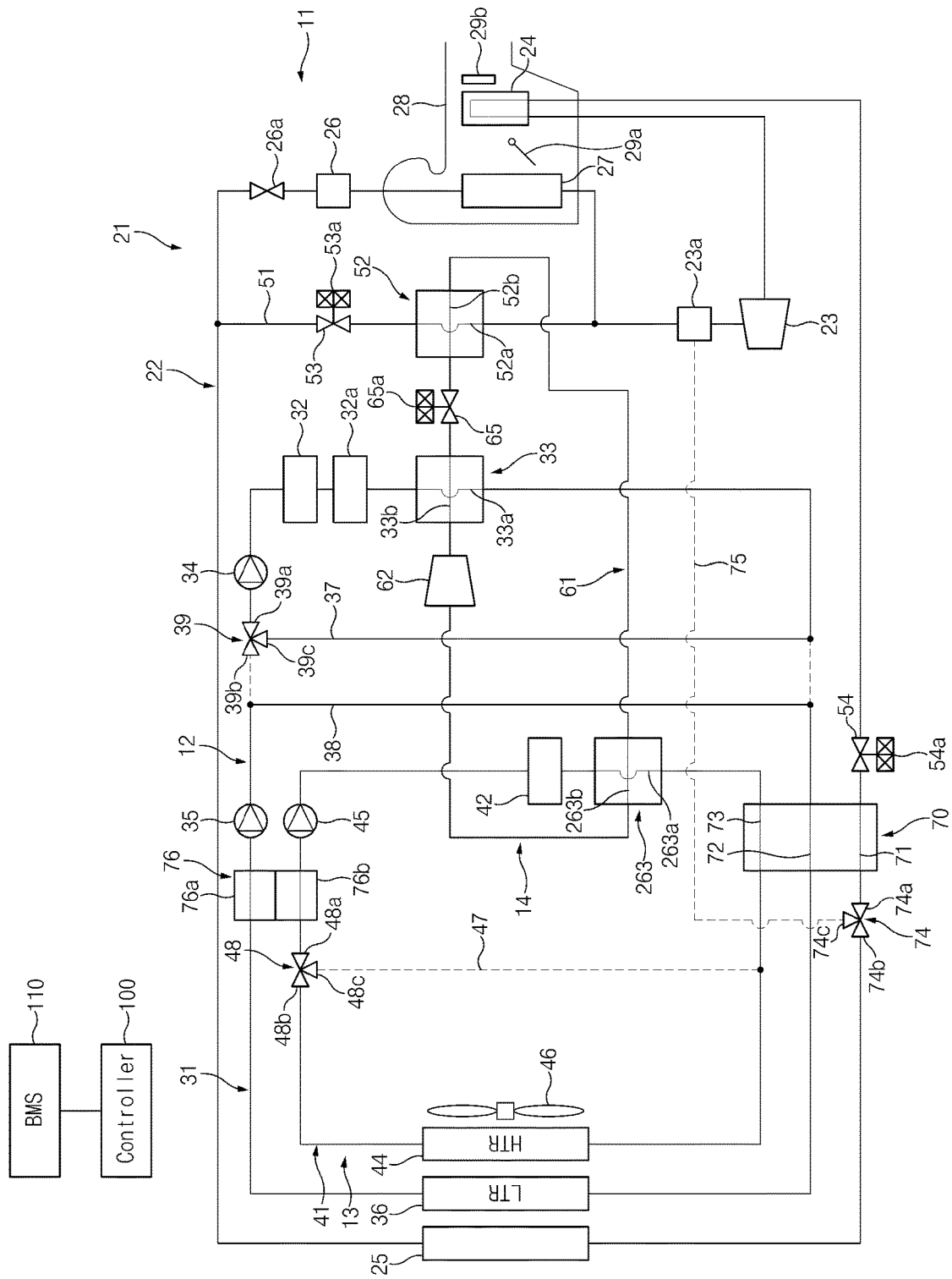
FIG. 17 illustrates a case in which a battery pack is cooled by a first refrigeration cycle of an HVAC subsystem, a second refrigeration cycle, a battery cooling subsystem, and a powertrain cooling subsystem when the HVAC subsystem operates in a cooling mode in the vehicle thermal management system of FIG. 15.

FIG. 17 shows that when the HVAC subsystem 11 operates in the cooling mode, the battery pack 32 may be cooled by the first refrigeration cycle 21 of the HVAC subsystem 11, the second refrigeration cycle 14, the battery cooling subsystem 12, and the powertrain cooling subsystem 13.

Referring to FIG. 17, the three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the first passage 33a of the battery chiller 33 by the first battery-side pump 34. A remaining portion of the battery-side coolant may be directed toward the second battery bypass conduit 38 so that it may bypass the first battery-side pump 34, the battery pack 32, and the first passage 33a of the battery chiller 33, and may sequentially pass through the second passage 72 of the water-cooled heat exchanger 70 and the battery radiator 36 by the second battery-side pump 35. The three-way valve 48 of the powertrain cooling subsystem 13 may be switched to close the third port 48c, and accordingly the powertrain-side coolant may circulate through the powertrain coolant loop 41. The condenser 263 may cool and condense the second refrigerant received from the second compressor 62 using the powertrain-side coolant circulating through the powertrain coolant loop 41. The three-way valve 74 of the HVAC subsystem 11 may be switched to close the third port 74c, and the opening amount of the heating-side expansion valve 54 may be completely opened to 100% so that the first refrigerant may not be expanded by the heating-side expansion valve 54. The first chiller-side expansion valve 53 may be opened to a predetermined degree. As the first refrigerant passes through the first passage 52a of the refrigerant chiller 52, the second refrigerant may exchange heat with the first refrigerant in the refrigerant chiller 52. Because the temperature of the second refrigerant passing through the second passage 52b of the refrigerant chiller 52 is higher than the temperature of the first refrigerant passing through the first passage 52a of the refrigerant chiller 52, the heat may be transferred from the second refrigerant to the first refrigerant, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The second refrigerant cooled and condensed by the refrigerant chiller 52 may be expanded by the second chiller-side expansion valve 65. As the expanded second refrigerant passes through the second passage 33b of the battery chiller 33, the second refrigerant may cool the battery-side coolant in the battery chiller 33, and the cooled battery-side coolant may cool the battery pack 32.

Referring to FIGS. 17 and 30, the first refrigerant may be compressed by the first compressor 23 in the first refrigeration cycle 21 of the HVAC subsystem 11. The compressed first refrigerant may be primarily condensed by the water-cooled heat exchanger 70, and be secondarily condensed by the external heat exchanger 25. The condensed first refrigerant may be expanded by the cooling-side expansion valve 26, and the expanded first refrigerant may be vaporized by the evaporator 27. The second refrigerant may be compressed by the second compressor 62 in the second refrigeration cycle 14. The compressed second refrigerant may be primarily condensed by the condenser 263, and be secondarily condensed by the refrigerant chiller 52. The condensed second refrigerant may be expanded by the second chiller-side expansion valve 65, and the expanded second refrigerant may be vaporized by the battery chiller 33. Accordingly, the first refrigerant may cool the second refrigerant through the refrigerant chiller 52, and the cooled second refrigerant may cool the battery-side coolant through the battery chiller 33. As the cooled battery-side coolant cools the battery pack 32, the battery-side coolant's performance may be significantly improved, and thus the cooling of the battery pack 32 may be significantly improved.

Figure 18:
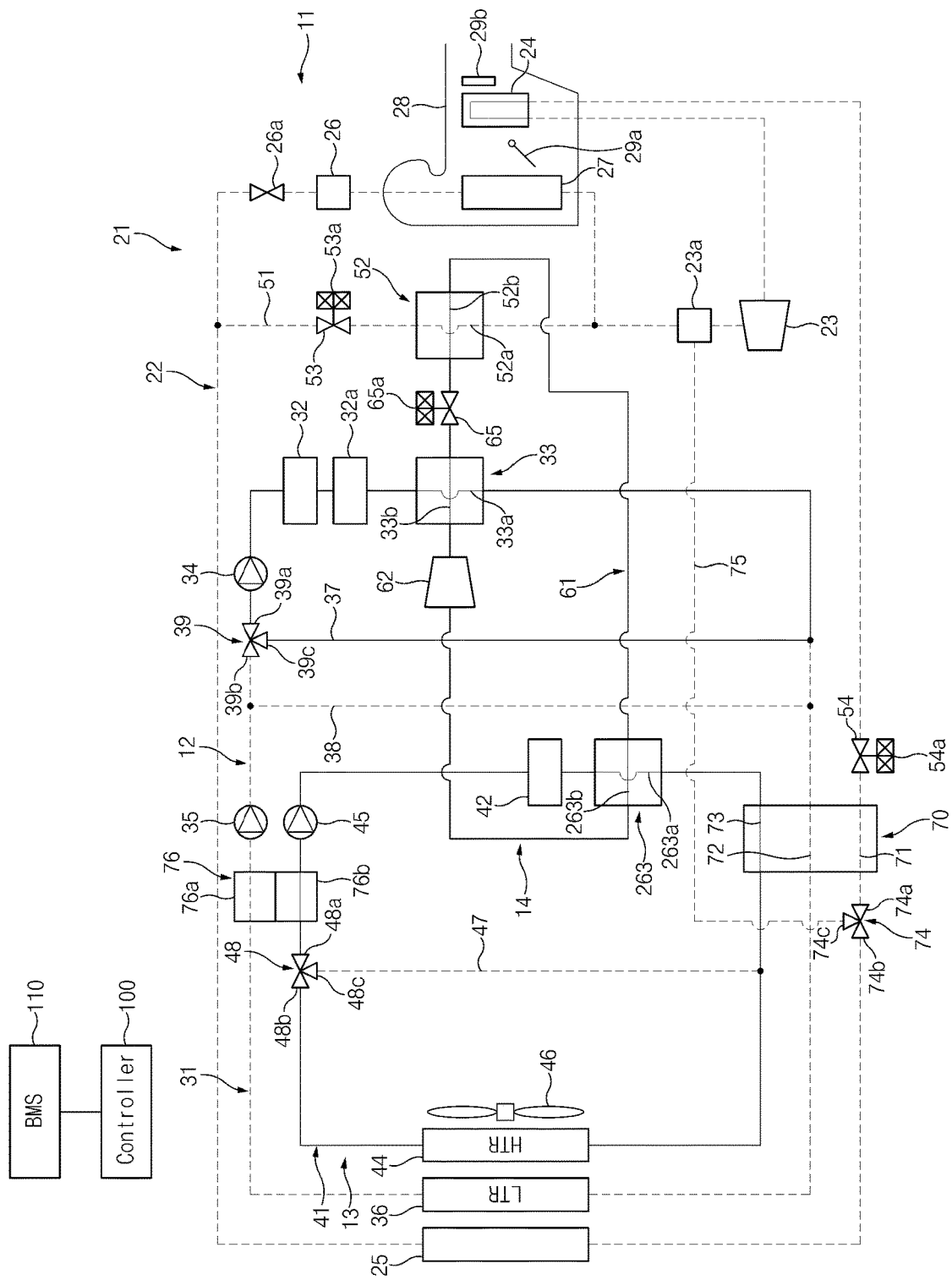
FIG. 18 illustrates a case in which a battery pack is cooled by a second refrigeration cycle, a battery cooling subsystem, and a powertrain cooling subsystem when a first compressor of an HVAC subsystem does not operate in the vehicle thermal management system of FIG. 15.

FIG. 18 shows that when the first compressor 23 of the HVAC subsystem 11 does not operate, the battery pack 32 may be cooled by the battery cooling subsystem 12, the second refrigeration cycle 14, and the powertrain cooling subsystem 13.

Referring to FIG. 18, the three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). As the first battery-side pump 34 operates, and the second battery-side pump 35 is stopped, the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the battery chiller 33 by the first battery-side pump 34. The three-way valve 48 of the powertrain cooling subsystem 13 may be switched to close the third port 48c, and accordingly the powertrain-side coolant may circulate through the powertrain coolant loop 41. The condenser 263 may cool and condense the second refrigerant received from the second compressor 62 using the powertrain-side coolant circulating in the powertrain coolant loop 41. As the first compressor 23 of the HVAC subsystem 11 is stopped, the first refrigerant may not circulate through the first refrigerant loop 22 of the first refrigeration cycle 21. As the second compressor 62 of the second refrigeration cycle 14 operates, the second refrigerant may cool the battery-side coolant in the battery chiller 33, and the cooled battery-side coolant may cool the battery pack 32.

Figure 19:
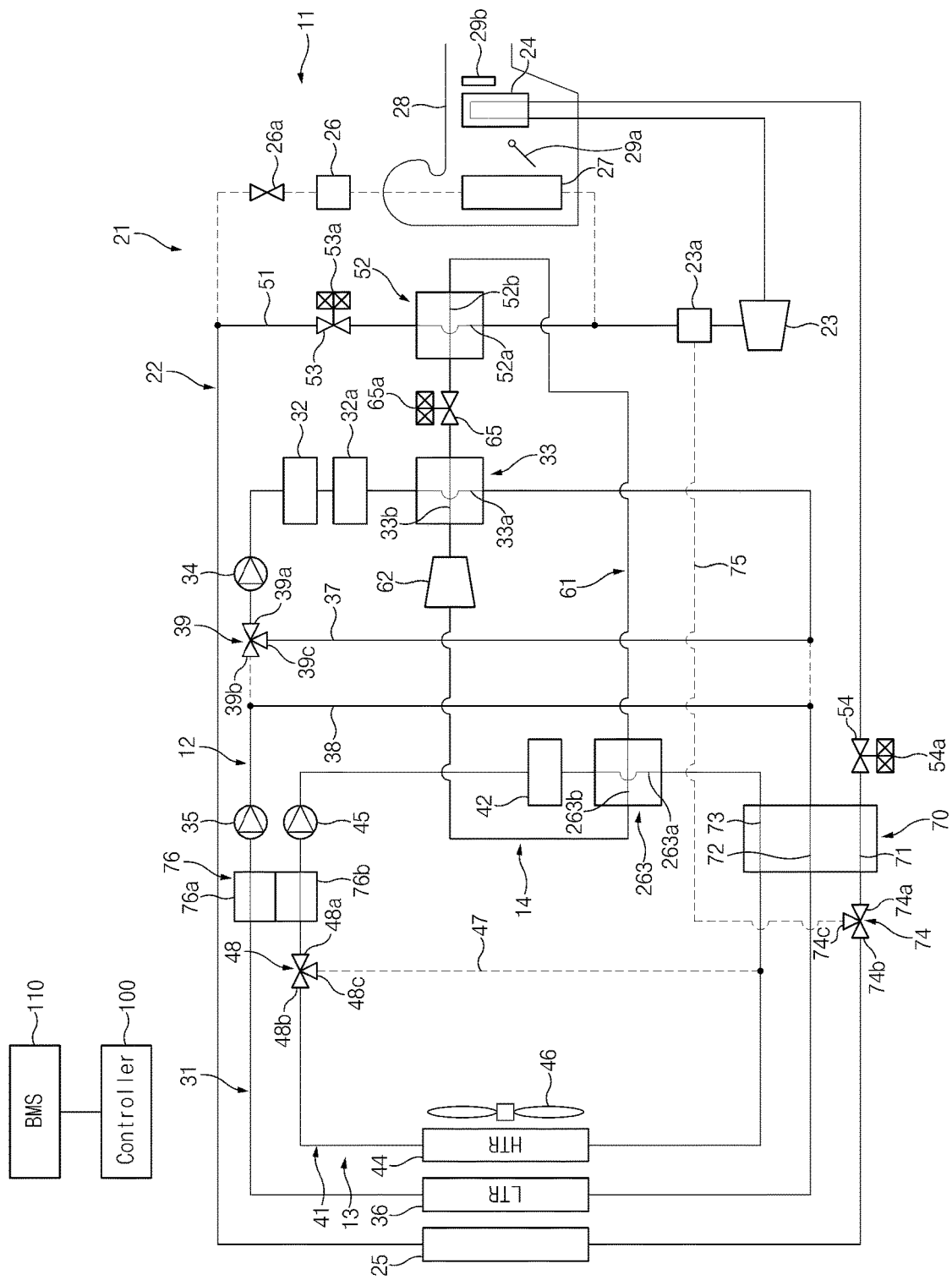
FIG. 19 illustrates a case in which a battery pack is cooled by a first refrigeration cycle of an HVAC subsystem, a second refrigeration cycle, a battery cooling subsystem, and a powertrain cooling subsystem when the HVAC subsystem does not operate in a cooling mode and a heating mode in the vehicle thermal management system of FIG. 15.

FIG. 19 shows that when the HVAC subsystem 11 does not operate in the cooling mode and the heating mode, the battery pack 32 may be cooled by the first refrigeration cycle 21 of the HVAC subsystem 11, the second refrigeration cycle 14, the battery cooling subsystem 12, and the powertrain cooling subsystem 13.

Referring to FIG. 19, as the shut-off valve 26a of the cooling-side expansion valve 26 is closed, the first refrigerant may not flow into the evaporator 27, and may only flow into the first chiller-side expansion valve 53 and the refrigerant chiller 52 through the branch conduit 51. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70 and the battery radiator 36 by the second battery-side pump 35. The second refrigerant in the condenser 263 may be cooled and condensed by the powertrain-side coolant circulating in the powertrain coolant loop 41. The first chiller-side expansion valve 53 may be opened to a predetermined degree. As the first refrigerant passes through the first passage 52a of the refrigerant chiller 52, the second refrigerant may exchange heat with the first refrigerant in the refrigerant chiller 52. Because the temperature of the second refrigerant passing through the second passage 52b of the refrigerant chiller 52 is higher than the temperature of the first refrigerant passing through the first passage 52a of the refrigerant chiller 52, the heat may be transferred from the second refrigerant to the first refrigerant, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The second refrigerant cooled and condensed by the refrigerant chiller 52 may cool the battery-side coolant in the battery chiller 33, and the cooled battery-side coolant may cool the battery pack 32.

Figure 20:
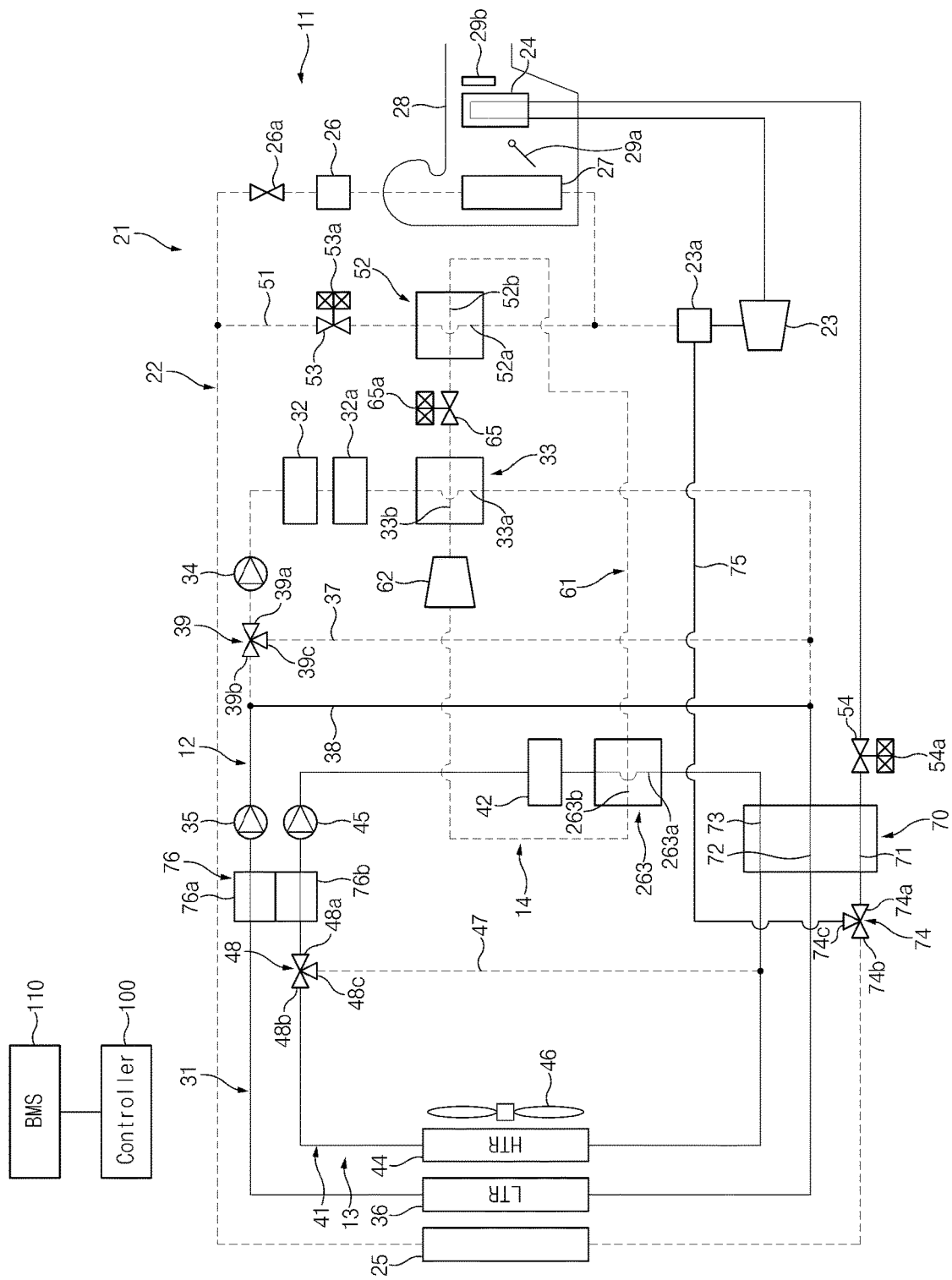
FIG. 20 illustrates a case in which a battery pack is not cooled when an HVAC subsystem operates in a heating mode in the vehicle thermal management system of FIG. 15.

FIG. 20 shows that when the HVAC subsystem 11 operates in the heating mode, the battery pack 32 may not be cooled.

Referring to FIG. 20, the three-way valve 74 of the HVAC subsystem 11 may be switched to open the third port 74c, and the opening amount of the heating-side expansion valve 54 may be adjusted to a predetermined degree. The first refrigerant may be compressed by the first compressor 23 in the first refrigeration cycle 21 of the HVAC subsystem 11, and the compressed first refrigerant may be condensed by the internal condenser 24. As the air passing through the internal condenser 24 is heated, the heating of the passenger compartment may be performed. As the opening amount of the heating-side expansion valve 54 is adjusted, the first refrigerant may be expanded by the heating-side expansion valve 54, and the expanded first refrigerant may be vaporized by the water-cooled heat exchanger 70. The vaporized first refrigerant may be directed into the first compressor 23 through the accumulator 23a. The three-way valve 39 of the battery cooling subsystem 12 may be switched to close all of the first port 39a, the second port 39b, and the third port 39c. As the first battery-side pump 34 is stopped, and the second battery-side pump 35 operates, the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70 and the battery radiator 36 by the second battery-side pump 35. As the powertrain-side pump 45 of the powertrain cooling subsystem 13 operates, the powertrain-side coolant may circulate through the powertrain coolant loop 41. As the second compressor 62 is stopped, the second refrigerant may not circulate through the second refrigerant loop 61 of the second refrigeration cycle 14.

Figure 21:
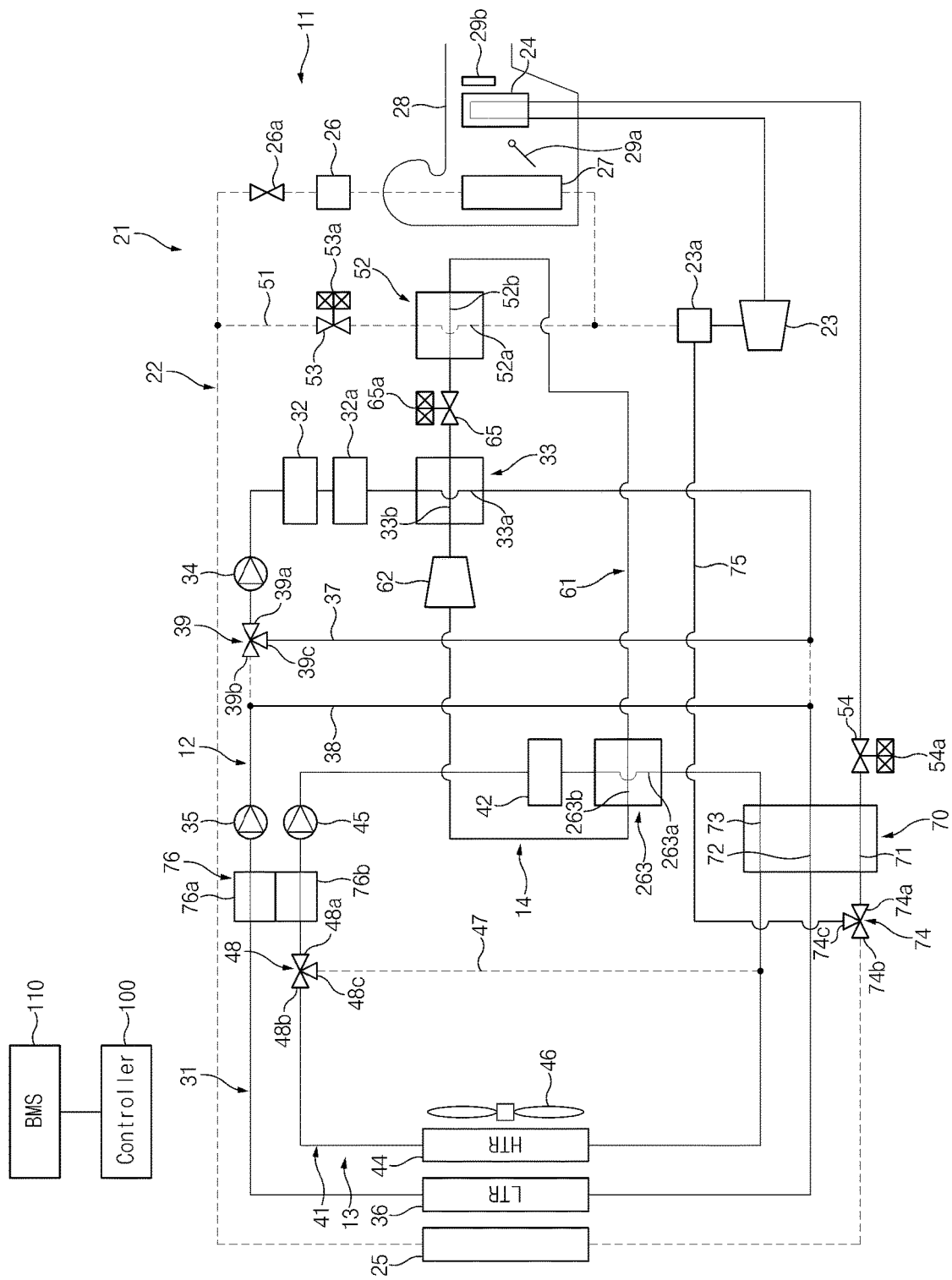
FIG. 21 illustrates a case in which a battery pack is cooled by a battery cooling subsystem, a second refrigeration cycle, and a powertrain cooling subsystem when an HVAC subsystem operates in a heating mode in the vehicle thermal management system of FIG. 15.

FIG. 21 shows that when the HVAC subsystem 11 operates in the heating mode, the battery pack 32 may be cooled by the battery cooling subsystem 12, the second refrigeration cycle 14, and the powertrain cooling subsystem 13.

Referring to FIG. 21, the three-way valve 74 of the HVAC subsystem 11 may be switched to open the third port 74c, and the opening amount of the heating-side expansion valve 54 may be adjusted to a predetermined degree. The first refrigerant may be compressed by the first compressor 23 in the first refrigeration cycle 21 of the HVAC subsystem 11, and the compressed first refrigerant may be condensed by the internal condenser 24. As the air passing through the internal condenser 24 is heated, the heating of the passenger compartment may be performed. As the opening amount of the heating-side expansion valve 54 is adjusted, the first refrigerant may be expanded by the heating-side expansion valve 54, and the expanded first refrigerant may be vaporized by the water-cooled heat exchanger 70. The vaporized first refrigerant may be directed into the first compressor 23 through the accumulator 23a. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70 and the battery radiator 36 by the second battery-side pump 35. As the powertrain-side pump 45 of the powertrain cooling subsystem 13 operates, the powertrain-side coolant may circulate through the powertrain coolant loop 41. The second refrigerant may be cooled and condensed in the condenser 263 by the powertrain-side coolant circulating through the powertrain coolant loop 41. The second refrigerant may be vaporized by the battery-side coolant passing through the first battery bypass conduit 37 in the battery chiller 33, and the battery-side coolant may be cooled by the second refrigerant in the battery chiller 33. The cooled battery-side coolant may cool the battery pack 32.

As described above, when the HVAC subsystem 11 operates in the heating mode, the water-cooled heat exchanger 70 is configured as an evaporator that vaporizes the first refrigerant. As the powertrain component 42 is located on the upstream side of the first passage 263a of the condenser 263, and the first passage 263a of the condenser 263 is located on the upstream side of the third passage 73 of the water-cooled heat exchanger 70, the powertrain-side coolant heated in the condenser 263 may be provided as a heat source for vaporizing the first refrigerant in the water-cooled heat exchanger 70. Accordingly, during the heating operation of the HVAC subsystem 11, the heat source for heating may be sufficiently secured.

FIGS. 22 to 28 illustrate a vehicle thermal management system according to another exemplary embodiment of the present disclosure.

Figure 22:
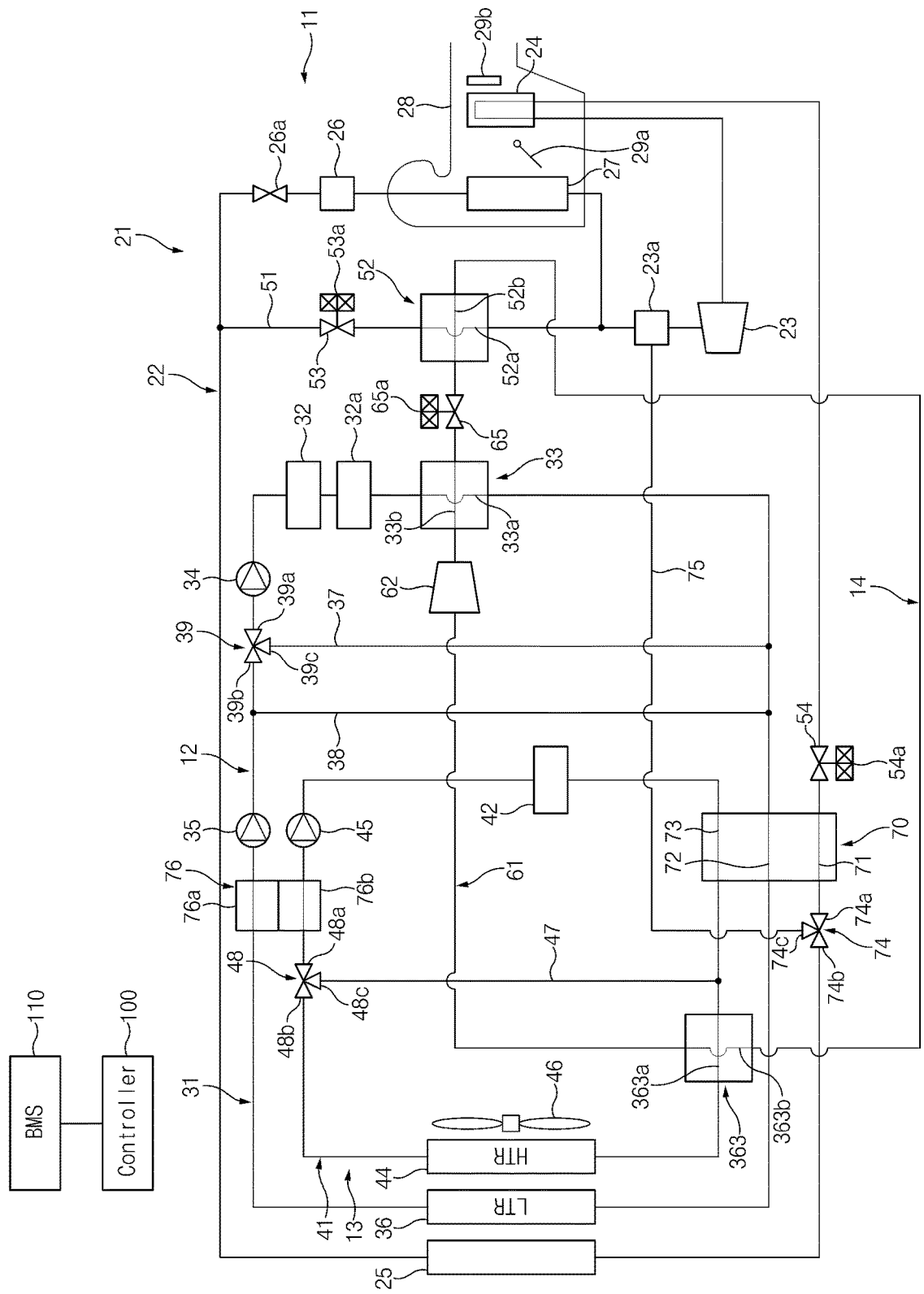
FIG. 22 illustrates a vehicle thermal management system according to another exemplary embodiment of the present disclosure.

Referring to FIG. 22, in a vehicle thermal management system according to another exemplary embodiment of the present disclosure, a condenser 363 of the second refrigeration cycle 14 may be located on the downstream side of the third passage 73 of the water-cooled heat exchanger 70 in the powertrain coolant loop 41. Because the third passage 73 of the water-cooled heat exchanger 70 is located on the upstream side of the condenser 363 of the second refrigeration cycle 14 in the powertrain coolant loop 41, condensation or evaporation (vaporization) of the first refrigerant by the water-cooled heat exchanger 70 may occur prior to condensation of the second refrigerant by the condenser 363. According to a predetermined exemplary embodiment of the present disclosure, the condenser 363 of the second refrigeration cycle 14 may be located between the powertrain radiator 44 and the third passage 73 of the water-cooled heat exchanger 70 in the powertrain coolant loop 41 of the powertrain cooling subsystem 13. The condenser 363 may include a first passage 363a fluidly connected to the powertrain coolant loop 41 of the powertrain cooling subsystem 13, and a second passage 363b fluidly connected to the second refrigerant loop 61 of the second refrigeration cycle 14. The first passage 363a may be located between the powertrain radiator 44 and the third passage 73 of the water-cooled heat exchanger 70 in the powertrain coolant loop 41 of the powertrain cooling subsystem 13, and the second passage 363b may be located on the downstream side of the second compressor 62 in the second refrigerant loop 61. The powertrain-side coolant may be received from the third passage 73 of the water-cooled heat exchanger 70 to first passage 363a of the condenser 363, and the second refrigerant may pass through the second passage 363b of the condenser 363 so that the second refrigerant may be cooled and condensed by the battery-side coolant in the condenser 363.

Figure 23:
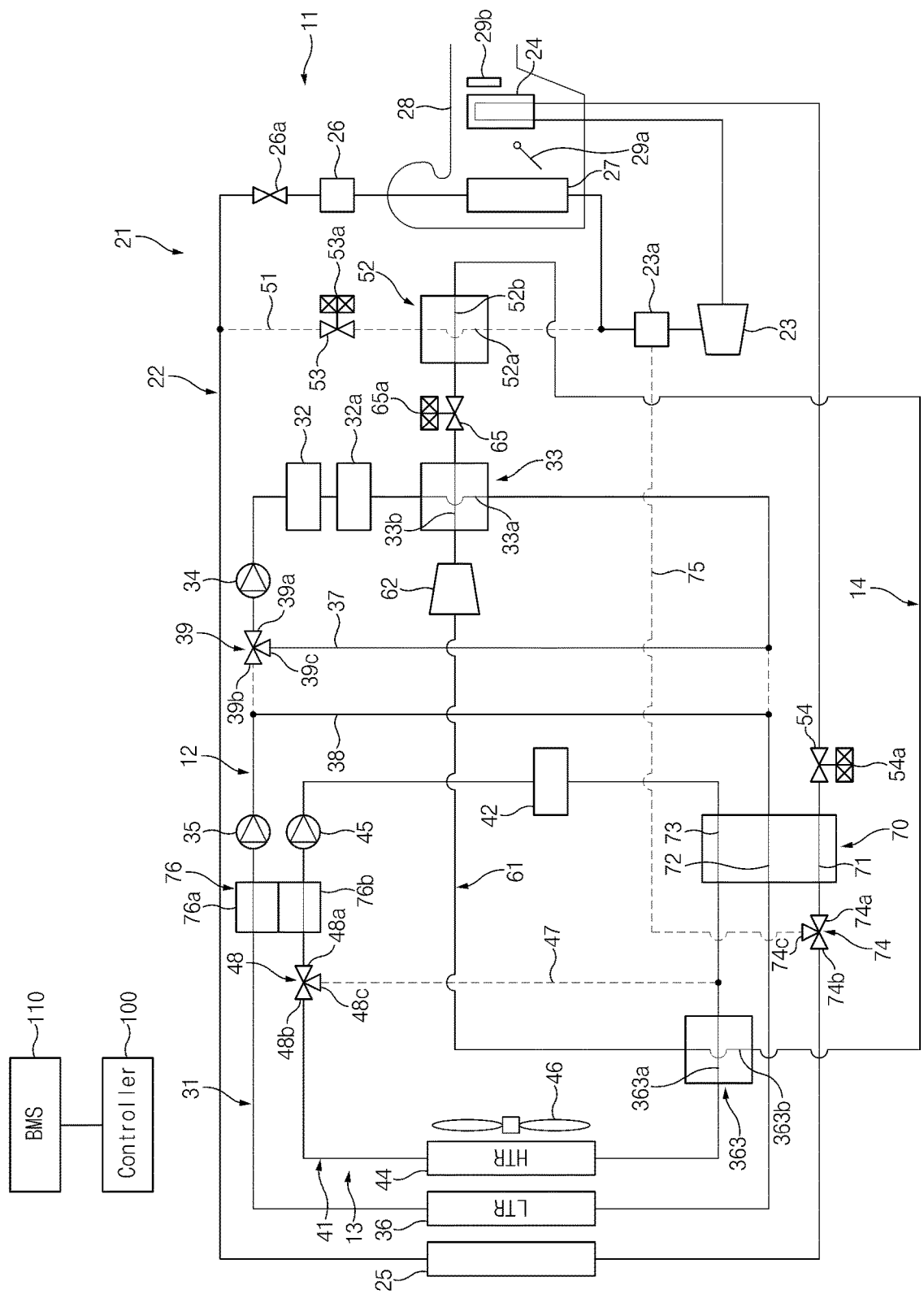
FIG. 23 illustrates a case in which a battery pack is cooled by a second refrigeration cycle, a battery cooling subsystem, and a powertrain cooling subsystem when an HVAC subsystem operates in a cooling mode in the vehicle thermal management system of FIG. 22.

FIG. 23 shows that when the HVAC subsystem 11 operates in the cooling mode, the battery pack 32 may be cooled by the second refrigeration cycle 14, the battery cooling subsystem 12, and the powertrain cooling subsystem 13, and the cooling of the battery pack 32 may be performed independently of the HVAC subsystem 11.

Referring to FIG. 23, the three-way valve 48 of the powertrain cooling subsystem 13 may be switched to close the third port 48c, and accordingly the powertrain-side coolant may circulate through the powertrain coolant loop 41. The three-way valve 74 of the HVAC subsystem 11 may be switched to close the third port 74c, and the opening amount of the heating-side expansion valve 54 may be completely opened to 100% so that the first refrigerant may not be expanded by the heating-side expansion valve 54. The first chiller-side expansion valve 53 may be closed, and accordingly the first refrigerant may not pass through the first passage 52a of the refrigerant chiller 52. Thus, the second refrigerant may not exchange heat with the first refrigerant in the refrigerant chiller 52. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the first passage 33a of the battery chiller 33 by the first battery-side pump 34. A remaining portion of the battery-side coolant may be directed toward the second battery bypass conduit 38 so that it may bypass the first battery-side pump 34, the battery pack 32, and the first passage 33a of the battery chiller 33, and may sequentially pass through the second passage 72 of the water-cooled heat exchanger 70 and the battery radiator 36 by the second battery-side pump 35. The condenser 363 may cool and condense the second refrigerant received from the second compressor 62 using the powertrain-side coolant received from the third passage 73 of the water-cooled heat exchanger 70. The second refrigerant cooled and condensed by the condenser 363 may be expanded by the second chiller-side expansion valve 65. As the expanded second refrigerant passes through the second passage 33b of the battery chiller 33, the second refrigerant may cool the battery-side coolant in the battery chiller 33, and the cooled battery-side coolant may cool the battery pack 32.

Figure 24:
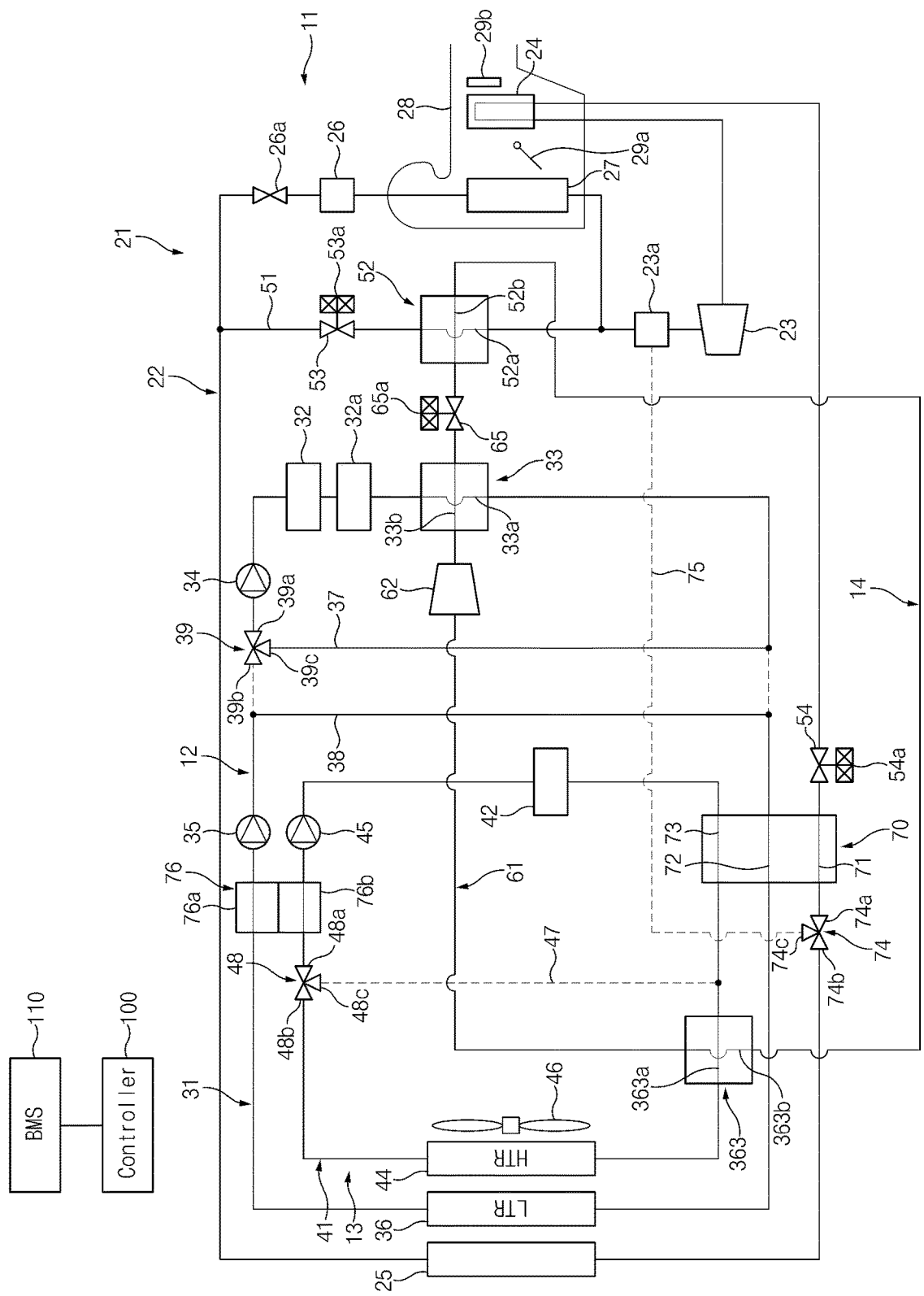
FIG. 24 illustrates a case in which a battery pack is cooled by a first refrigeration cycle of an HVAC subsystem, a second refrigeration cycle, a battery cooling subsystem, and a powertrain cooling subsystem when the HVAC subsystem operates in a cooling mode in the vehicle thermal management system of FIG. 22.

FIG. 24 shows that when the HVAC subsystem 11 operates in the cooling mode, the battery pack 32 may be cooled by the first refrigeration cycle 21 of the HVAC subsystem 11, the second refrigeration cycle 14, the battery cooling subsystem 12, and the powertrain cooling subsystem 13.

Referring to FIG. 24, the three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the first passage 33a of the battery chiller 33 by the first battery-side pump 34. A remaining portion of the battery-side coolant may be directed toward the second battery bypass conduit 38 so that it may bypass the first battery-side pump 34, the battery pack 32, and the first passage 33a of the battery chiller 33, and may sequentially pass through the second passage 72 of the water-cooled heat exchanger 70 and the battery radiator 36 by the second battery-side pump 35. The three-way valve 48 of the powertrain cooling subsystem 13 may be switched to close the third port 48c, and accordingly the powertrain-side coolant may circulate through the powertrain coolant loop 41. The condenser 363 may cool and condense the second refrigerant received from the second compressor 62 using the powertrain-side coolant received from the third passage 73 of the water-cooled heat exchanger 70. The three-way valve 74 of the HVAC subsystem 11 may be switched to close the third port 74c, and the opening amount of the heating-side expansion valve 54 may be completely opened to 100% so that the first refrigerant may not be expanded by the heating-side expansion valve 54. The first chiller-side expansion valve 53 may be opened to a predetermined degree. As the first refrigerant passes through the first passage 52a of the refrigerant chiller 52, the second refrigerant may exchange heat with the first refrigerant in the refrigerant chiller 52. Because the temperature of the second refrigerant passing through the second passage 52b of the refrigerant chiller 52 is higher than the temperature of the first refrigerant passing through the first passage 52a of the refrigerant chiller 52, the heat may be transferred from the second refrigerant to the first refrigerant, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The second refrigerant cooled and condensed by the refrigerant chiller 52 may be expanded by the second chiller-side expansion valve 65. As the expanded second refrigerant passes through the second passage 33b of the battery chiller 33, the second refrigerant may cool the battery-side coolant in the battery chiller 33, and the cooled battery-side coolant may cool the battery pack 32.

Referring to FIGS. 24 and 30, the first refrigerant may be compressed by the first compressor 23 in the first refrigeration cycle 21 of the HVAC subsystem 11. The compressed first refrigerant may be primarily condensed by the water-cooled heat exchanger 70, and be secondarily condensed by the external heat exchanger 25. The condensed first refrigerant may be expanded by the cooling-side expansion valve 26, and the expanded first refrigerant may be vaporized by the evaporator 27. The second refrigerant may be compressed by the second compressor 62 in the second refrigeration cycle 14. The compressed second refrigerant may be primarily condensed by the condenser 363, and be secondarily condensed by the refrigerant chiller 52. The condensed second refrigerant may be expanded by the second chiller-side expansion valve 65, and the expanded second refrigerant may be vaporized by the battery chiller 33. Accordingly, the first refrigerant may cool the second refrigerant through the refrigerant chiller 52, and the cooled second refrigerant may cool the battery-side coolant through the battery chiller 33. As the cooled battery-side coolant cools the battery pack 32, the battery-side coolant's performance may be significantly improved, and thus the cooling of the battery pack 32 may be significantly improved.

Figure 25:
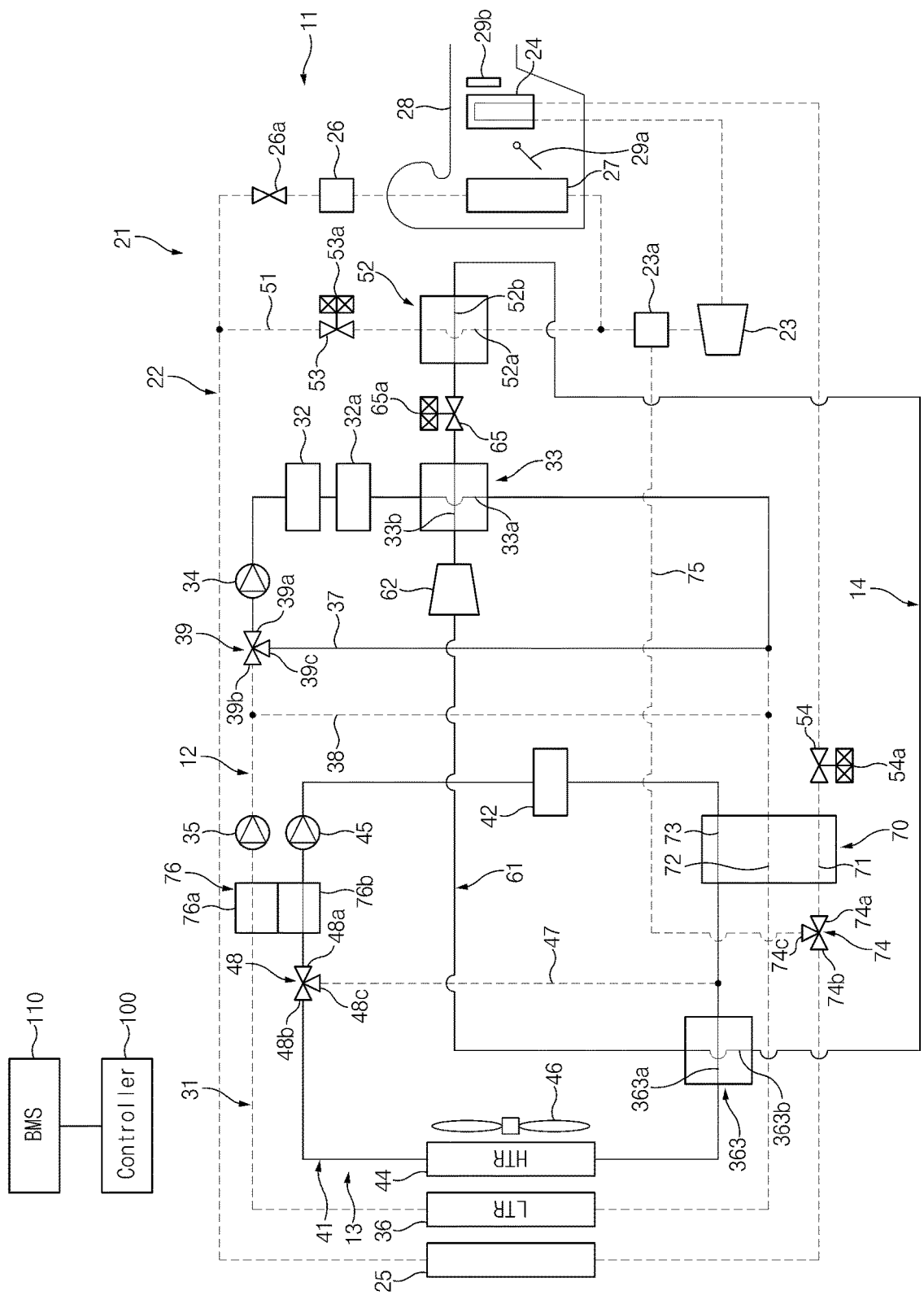
FIG. 25 illustrates a case in which a battery pack is cooled by a second refrigeration cycle, a battery cooling subsystem, and a powertrain cooling subsystem when a first compressor of an HVAC subsystem does not operate in the vehicle thermal management system of FIG. 22.

FIG. 25 shows that when the first compressor 23 of the HVAC subsystem 11 does not operate, the battery pack 32 may be cooled by the battery cooling subsystem 12, the second refrigeration cycle 14, and the powertrain cooling subsystem 13.

Referring to FIG. 25, the three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). As the first battery-side pump 34 operates, and the second battery-side pump 35 is stopped, the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the battery chiller 33 by the first battery-side pump 34. The three-way valve 48 of the powertrain cooling subsystem 13 may be switched to close the third port 48c, and accordingly the powertrain-side coolant may circulate through the powertrain coolant loop 41 by the powertrain-side pump 45. The condenser 363 may cool and condense the second refrigerant received from the second compressor 62 using the powertrain-side coolant received from the third passage 73 of the water-cooled heat exchanger 70. As the first compressor 23 of the HVAC subsystem 11 is stopped, the first refrigerant may not circulate through the first refrigerant loop 22 of the first refrigeration cycle 21. As the second compressor 62 of the second refrigeration cycle 14 operates, the second refrigerant may cool the battery-side coolant in the battery chiller 33, and the cooled battery-side coolant may cool the battery pack 32.

Figure 26:
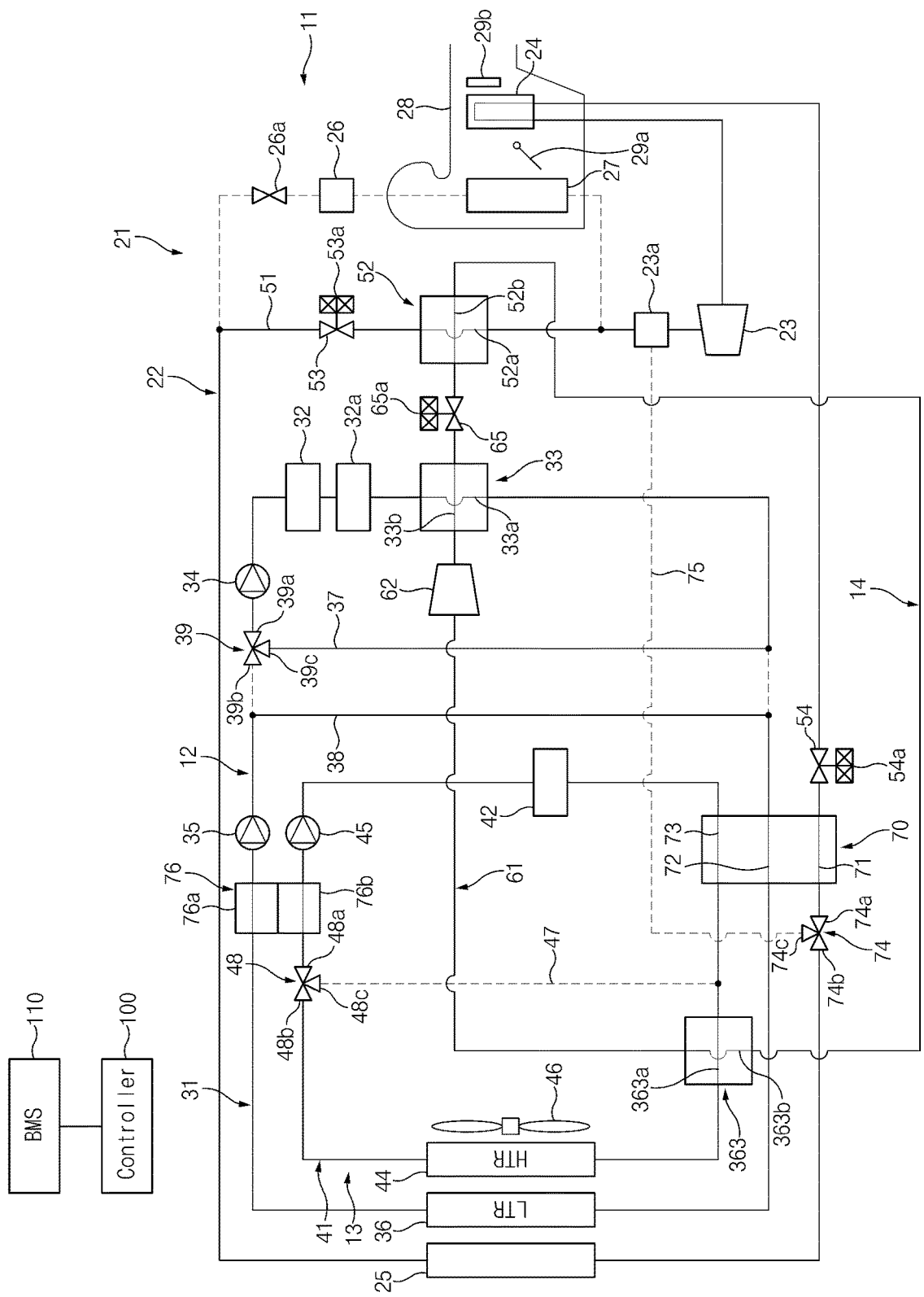
FIG. 26 illustrates a case in which a battery pack is cooled by a first refrigeration cycle of an HVAC subsystem, a second refrigeration cycle, a battery cooling subsystem, and a powertrain cooling subsystem when the HVAC subsystem does not operate in a cooling mode and a heating mode in the vehicle thermal management system of FIG. 22.

FIG. 26 shows that when the HVAC subsystem 11 does not operate in the cooling mode and the heating mode, the battery pack 32 may be cooled by the first refrigeration cycle 21 of the HVAC subsystem 11, the second refrigeration cycle 14, the battery cooling subsystem 12, and the powertrain cooling subsystem 13.

Referring to FIG. 26, as the shut-off valve 26a of the cooling-side expansion valve 26 is closed, the first refrigerant may not flow into the evaporator 27, and may only flow into the first chiller-side expansion valve 53 and the refrigerant chiller 52 through the branch conduit 51. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70 and the battery radiator 36 by the second battery-side pump 35. The condenser 363 may cool and condense the second refrigerant received from the second compressor 62 using the powertrain-side coolant received from the third passage 73 of the water-cooled heat exchanger 70. The first chiller-side expansion valve 53 may be opened to a predetermined degree. As the first refrigerant passes through the first passage 52a of the refrigerant chiller 52, the second refrigerant may exchange heat with the first refrigerant in the refrigerant chiller 52. Because the temperature of the second refrigerant passing through the second passage 52b of the refrigerant chiller 52 is higher than the temperature of the first refrigerant passing through the first passage 52a of the refrigerant chiller 52, the heat may be transferred from the second refrigerant to the first refrigerant, and accordingly the second refrigerant passing through the second passage 52b of the refrigerant chiller 52 may be cooled and condensed, and the first refrigerant passing through the first passage 52a of the refrigerant chiller 52 may be evaporated (vaporized). The second refrigerant cooled and condensed by the refrigerant chiller 52 may cool the battery-side coolant in the battery chiller 33, and the cooled battery-side coolant may cool the battery pack 32.

Figure 27:
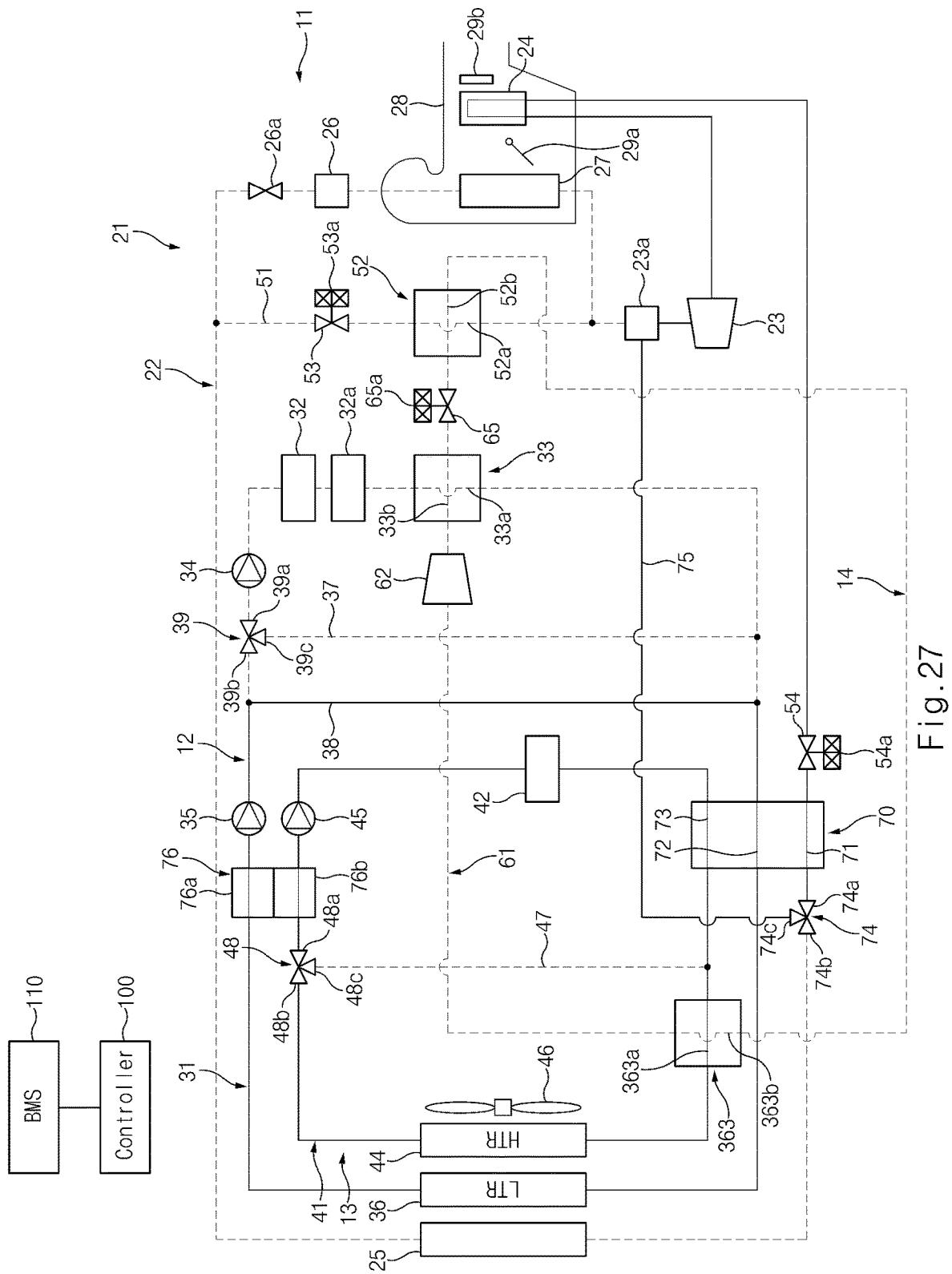
FIG. 27 illustrates a case in which a battery pack is not cooled when an HVAC subsystem operates in a heating mode in the vehicle thermal management system of FIG. 22.

FIG. 27 shows that when the HVAC subsystem 11 operates in the heating mode, the battery pack 32 may not be cooled.

Referring to FIG. 27, the three-way valve 74 of the HVAC subsystem 11 may be switched to open the third port 74c, and the opening amount of the heating-side expansion valve 54 may be adjusted to a predetermined degree. The first refrigerant may be compressed by the first compressor 23 in the first refrigeration cycle 21 of the HVAC subsystem 11, and the compressed first refrigerant may be condensed by the internal condenser 24. As the air passing through the internal condenser 24 is heated, the heating of the passenger compartment may be performed. As the opening amount of the heating-side expansion valve 54 is adjusted, the first refrigerant may be expanded by the heating-side expansion valve 54, and the expanded first refrigerant may be vaporized by the water-cooled heat exchanger 70. The vaporized first refrigerant may be directed into the first compressor 23 through the accumulator 23a. The three-way valve 39 of the battery cooling subsystem 12 may be switched to close all of the first port 39a, the second port 39b, and the third port 39c. As the first battery-side pump 34 is stopped, and the second battery-side pump 35 operates, the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70 and the battery radiator 36 by the second battery-side pump 35. As the powertrain-side pump 45 of the powertrain cooling subsystem 13 operates, the powertrain-side coolant may circulate through the powertrain coolant loop 41. As the second compressor 62 is stopped, the second refrigerant may not circulate through the second refrigerant loop 61 of the second refrigeration cycle 14.

Figure 28:
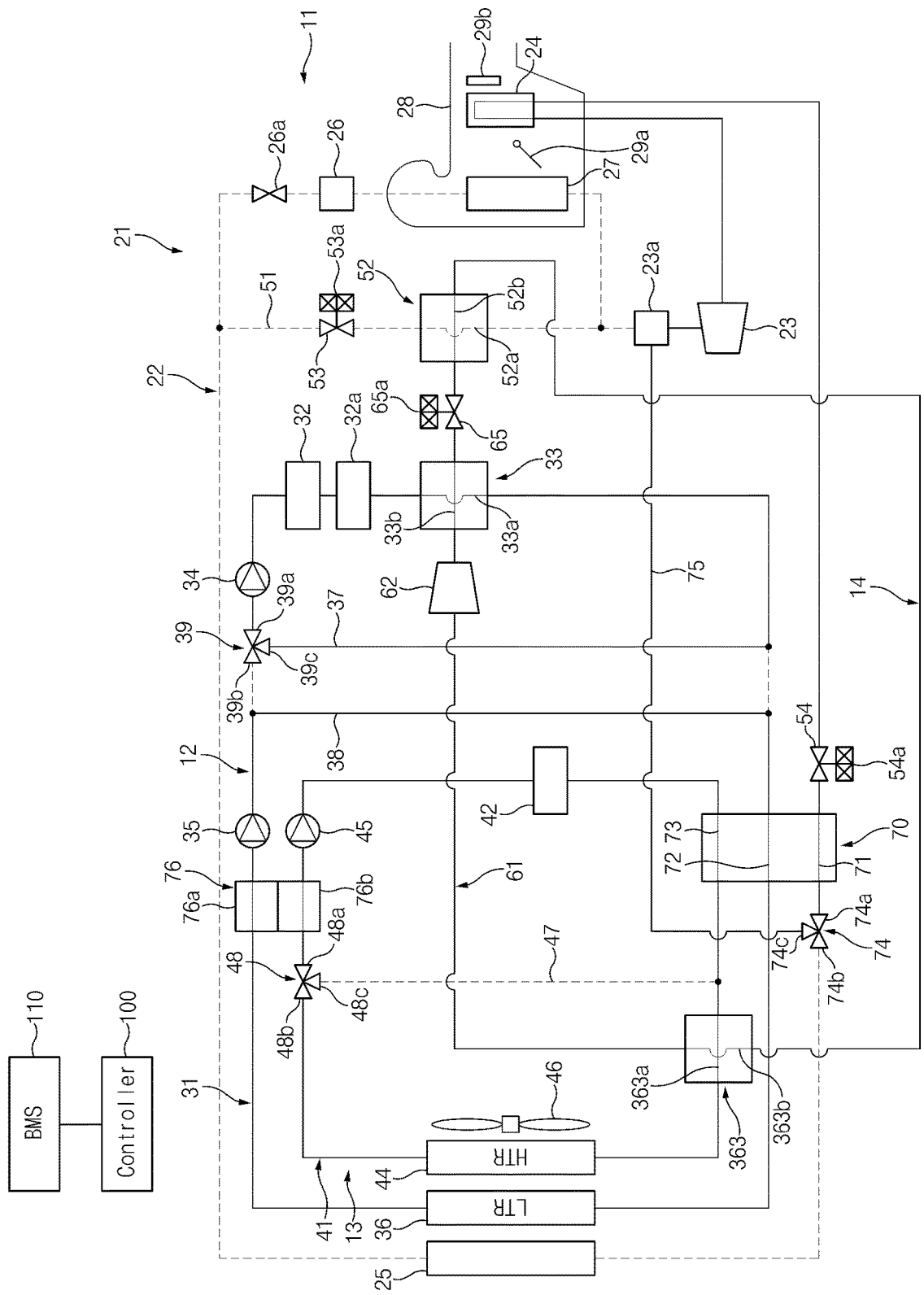
FIG. 28 illustrates a case in which a battery pack is cooled by a battery cooling subsystem, a second refrigeration cycle, and a powertrain cooling subsystem when an HVAC subsystem operates in a heating mode in the vehicle thermal management system of FIG. 22.

FIG. 28 shows that when the HVAC subsystem 11 operates in the heating mode, the battery pack 32 may be cooled by the battery cooling subsystem 12, the second refrigeration cycle 14, and the powertrain cooling subsystem 13.

Referring to FIG. 28, the three-way valve 74 of the HVAC subsystem 11 may be switched to open the third port 74c, and the opening amount of the heating-side expansion valve 54 may be adjusted to a predetermined degree. The first refrigerant may be compressed by the first compressor 23 in the first refrigeration cycle 21 of the HVAC subsystem 11, and the compressed first refrigerant may be condensed by the internal condenser 24. As the air passing through the internal condenser 24 is heated, the heating of the passenger compartment may be performed. As the opening amount of the heating-side expansion valve 54 is adjusted, the first refrigerant may be expanded by the heating-side expansion valve 54, and the expanded first refrigerant may be vaporized by the water-cooled heat exchanger 70. The vaporized first refrigerant may be directed into the first compressor 23 through the accumulator 23a. The three-way valve 39 of the battery cooling subsystem 12 may be switched to close the second port 39b and to allow the third port 39c to communicate with the first port 39a (that is, the three-way valve 39 is switched to open the outlet of the first battery bypass conduit 37). A portion of the battery-side coolant may be directed toward the first battery bypass conduit 37 so that it may bypass the second battery-side pump 35, the second passage 72 of the water-cooled heat exchanger 70, and the battery radiator 36, and may sequentially pass through the battery pack 32 and the battery chiller 33 by the first battery-side pump 34. A remaining portion of the battery-side coolant may be directed toward the second battery bypass conduit 38 so that it may bypass the first battery-side pump 34, the battery pack 32, and the battery chiller 33, and may sequentially pass through the second passage 72 of the water-cooled heat exchanger 70 and the battery radiator 36 by the second battery-side pump 35. As the powertrain-side pump 45 of the powertrain cooling subsystem 13 operates, the powertrain-side coolant may circulate through the powertrain coolant loop 41. The condenser 363 may cool and condense the second refrigerant received from the second compressor 62 using the powertrain-side coolant received from the third passage 73 of the water-cooled heat exchanger 70. The second refrigerant may be vaporized by the battery-side coolant passing through the first battery bypass conduit 37 in the battery chiller 33, and the battery-side coolant may be cooled by the second refrigerant in the battery chiller 33. The cooled battery-side coolant may cool the battery pack 32.

Figure 29:
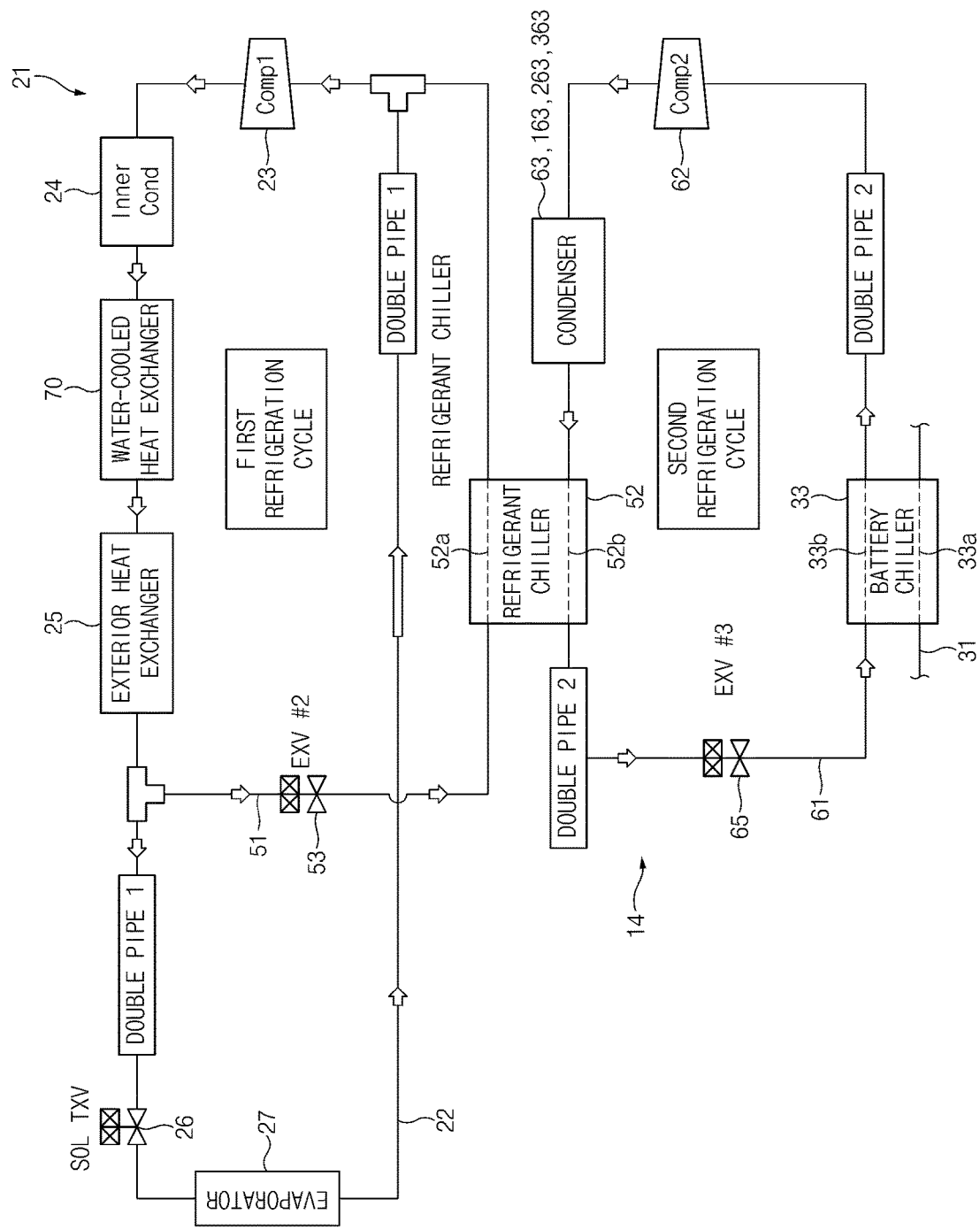
FIG. 29 illustrates a block diagram of a first refrigeration cycle and a second refrigeration cycle in a vehicle thermal management system according to an exemplary embodiment of the present disclosure.

Referring to FIG. 29, the first refrigeration cycle 21 may include the first compressor 23, the internal condenser 24, the water-cooled heat exchanger 70, the external heat exchanger 25, the cooling-side expansion valve 26, and the evaporator 27 in the first refrigerant loop 22 through which the first refrigerant circulates. The internal condenser 24 may be located on the downstream side of the first compressor 23, and the water-cooled heat exchanger 70 may be located on the downstream side of the internal condenser 24. The external heat exchanger 25 may be located on the downstream side of the water-cooled heat exchanger 70, and the cooling-side expansion valve 26 may be located on the downstream side of the external heat exchanger 25. The evaporator 27 may be located on the downstream side of the cooling-side expansion valve 26.

The second refrigeration cycle 14 may include the second compressor 62, the condenser 63, 163, 263, or 363, the refrigerant chiller 52, the second chiller-side expansion valve 65, and the battery chiller 33 in the second refrigerant loop 61 through which the second refrigerant circulates. The condenser 63, 163, 263, or 363 may be located on the downstream side of the second compressor 62, and the refrigerant chiller 52 may be located on the downstream side of the condenser 63, 163, 263, or 363. The second chiller-side expansion valve 65 may be located on the downstream side of the refrigerant chiller 52, and the battery chiller 33 may be located on the downstream side of the second chiller-side expansion valve 65.

The refrigerant chiller 52 may be disposed in the branch conduit 51 of the first refrigerant loop 22, and the first refrigeration cycle 21 may be thermally connected to the second refrigeration cycle 14 through the branch conduit 51 and the refrigerant chiller 52.

As set forth above, according to exemplary embodiments of the present disclosure, the second refrigeration cycle, which is configured independently of the first refrigeration cycle of the HVAC subsystem, may be configured to directly cool the battery-side coolant circulating in the battery coolant loop, efficiently responding to the cooling of the battery and the operation of the HVAC subsystem. That is, the coolant circulating in the battery coolant loop may be cooled by the first refrigeration cycle and/or the second refrigeration cycle, and thus the cooling of the battery pack may be improved.

The second refrigeration cycle may include the condenser configured to condense the second refrigerant by the battery-side coolant or the powertrain-side coolant, and thus the second refrigeration cycle may implement efficient packaging.

According to exemplary embodiments of the present disclosure, the second refrigeration cycle may be thermally connected to the first refrigeration cycle of the HVAC subsystem through the refrigerant chiller, and the second refrigeration cycle may be thermally connected to the battery coolant loop of the battery cooling subsystem through the battery chiller, and accordingly the first refrigeration cycle, the second refrigeration cycle, and the battery cooling subsystem may form a cascade refrigeration cycle. Thus, the operation of the HVAC subsystem and the cooling of the battery pack may be performed simultaneously or independently.

Furthermore, after the load of the HVAC subsystem is stabilized, the flow rate of the first refrigerant into the refrigerant chiller may be relatively increased, increasing the performance of the battery chiller. The second refrigerant may improve the cooling performance of the battery-side coolant circulating in the battery coolant loop through the refrigerant chiller and the battery chiller, and thus the cooling performance of the battery pack may be further improved.

Furthermore, the term related to a control device such as "controller", "control apparatus", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data non-transitory storage device that can store data which may be thereafter read by a computer system and store and execute program instructions which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data non-transitory storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by multiple control devices, or an integrated single control device.

In various exemplary embodiments of the present disclosure, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle thermal management system, comprising:
   a heating, ventilation, and air conditioning (HVAC) subsystem including a first compressor and a first refrigeration cycle including a first refrigerant loop fluidly connected to the first compressor and a branch conduit branching off from the first refrigerant loop;
   a battery cooling subsystem including a battery coolant loop fluidly connected to a battery pack;
   a powertrain cooling subsystem including a powertrain coolant loop fluidly connected to a powertrain component;
   a second refrigeration cycle including a second compressor, a condenser located on a downstream side of the second compressor, and a second refrigerant loop fluidly connected to the condenser;
   a refrigerant chiller mounted between a first refrigerant circulating in the branch conduit and a second refrigerant circulating in the second refrigerant loop and configured to transfer heat between the first refrigeration cycle and the second refrigeration cycle; and
   a battery chiller mounted between the second refrigeration cycle and the battery coolant loop and configured to transfer heat between the second refrigeration cycle and the battery coolant loop,
   wherein the condenser of the second refrigeration cycle is thermally connected to at least one of the battery coolant loop and the powertrain coolant loop.

2. The vehicle thermal management system of claim 1,
   wherein the first refrigeration cycle includes an internal condenser located on a downstream side of the first compressor, an external heat exchanger located on a downstream side of the internal condenser, a cooling-side expansion valve located on a downstream side of the external heat exchanger, and an evaporator located on a downstream side of the cooling-side expansion valve, and
   wherein the refrigerant chiller and the evaporator are connected in parallel between the external heat exchanger and the first compressor.

3. The vehicle thermal management system of claim 1,
   wherein the refrigerant chiller includes a first passage fluidly connected to the branch conduit, and a second passage fluidly connected to the second refrigerant loop.

4. The vehicle thermal management system of claim 3,
   wherein the first refrigeration cycle includes a first chiller-side expansion valve located on an upstream side of the first passage of the refrigerant chiller.

5. The vehicle thermal management system of claim 1, further including a water-cooled heat exchanger fluidically connected to the first refrigerant loop, the battery coolant loop and the powertrain coolant loop and configured to transfer heat among the first refrigerant loop of the HVAC subsystem, the battery coolant loop of the battery cooling subsystem, and the powertrain coolant loop of the powertrain cooling subsystem.

6. The vehicle thermal management system of claim 5,
   wherein the water-cooled heat exchanger includes a first passage fluidly connected to the first refrigerant loop, a second passage fluidly connected to the battery coolant loop, and a third passage fluidly connected to the powertrain coolant loop, and wherein the first refrigeration cycle includes a heating-side expansion valve located on an upstream side of the first passage of the water-cooled heat exchanger.

7. The vehicle thermal management system of claim 1, wherein the battery chiller includes a first passage fluidly connected to the battery coolant loop, and a second passage fluidly connected to the second refrigerant loop.

8. The vehicle thermal management system of claim 7, wherein the second refrigeration cycle includes a second chiller-side expansion valve located on an upstream side of the second passage of the battery chiller.

9. The vehicle thermal management system of claim 6, wherein the condenser includes a first passage fluidly connected to the battery coolant loop, and a second passage fluidly connected to the second refrigerant loop.

10. The vehicle thermal management system of claim 9, wherein the first passage of the condenser is located on an upstream side of the second passage of the water-cooled heat exchanger in the battery coolant loop.

11. The vehicle thermal management system of claim 9, wherein the battery cooling subsystem includes the battery chiller located on a downstream side of the battery pack, a battery radiator located on a downstream side of the battery chiller, a first battery bypass conduit allowing a battery-side coolant to bypass the battery radiator, a second battery bypass conduit allowing the battery-side coolant to bypass the battery pack and the battery chiller, and a three-way valve adjusting a flow direction of the battery-side coolant.

12. The vehicle thermal management system of claim 11, wherein the first passage of the condenser is fluidly connected to the second battery bypass conduit.

13. The vehicle thermal management system of claim 9, wherein the first passage of the condenser is located on a downstream side of the second passage of the water-cooled heat exchanger in the battery coolant loop.

14. The vehicle thermal management system of claim 11, wherein the first passage of the condenser is located between the battery radiator and the second passage of the water-cooled heat exchanger in the battery coolant loop.

15. The vehicle thermal management system of claim 6, wherein the condenser includes a first passage fluidly connected to the powertrain coolant loop, and a second passage fluidly connected to the second refrigerant loop.

16. The vehicle thermal management system of claim 15, wherein the first passage of the condenser is located on an upstream side of the third passage of the water-cooled heat exchanger in the powertrain coolant loop.

17. The vehicle thermal management system of claim 15, wherein the first passage of the condenser is located between the powertrain component and the third passage of the water-cooled heat exchanger in the powertrain coolant loop.

18. The vehicle thermal management system of claim 15, wherein the first passage of the condenser is located on a downstream side of the third passage of the water-cooled heat exchanger in the powertrain coolant loop.

19. The vehicle thermal management system of claim 15, wherein the first passage of the condenser is located between a powertrain radiator and the third passage of the water-cooled heat exchanger in the powertrain coolant loop.

* * * * *